United States Patent [19]
Hirai et al.

[11] Patent Number: 6,097,810
[45] Date of Patent: Aug. 1, 2000

[54] PHONE HOLDER

[75] Inventors: Hiroki Hirai; Masashi Sugimoto; Yuichiro Tsutsumi; Tetsuji Tanaka; Yasuhiro Hiura; Shigeki Sakai; Yoshito Sakai; Nori Inoue, all of Nagoya, Japan

[73] Assignees: Harness System Technologies Research, Ltd, Nagoya; Sumitomo Wiring Systems, Ltd., Mie; Sumitomo Electric Industries, Ltd., Osaka, all of Japan

[21] Appl. No.: 09/044,024

[22] Filed: Mar. 19, 1998

[30] Foreign Application Priority Data

Mar. 25, 1997 [JP] Japan .................................. 9-072112
Apr. 21, 1997 [JP] Japan .................................. 9-103116
Jun. 10, 1997 [JP] Japan .................................. 9-152223
Jul. 31, 1997 [JP] Japan .................................. 9-206110
Sep. 30, 1997 [JP] Japan .................................. 9-266780

[51] Int. Cl.⁷ .................................................. H04M 1/00
[52] U.S. Cl. .......................................... 379/446; 379/455
[58] Field of Search .................................... 379/446, 455, 379/449, 426, 454

[56] References Cited

U.S. PATENT DOCUMENTS

| 5,230,016 | 7/1993 | Yang . |
| 5,282,246 | 1/1994 | Yang . |
| 5,555,302 | 9/1996 | Wang ...................................... 379/446 |
| 5,708,707 | 1/1998 | Halttunen et al. ...................... 379/446 |

FOREIGN PATENT DOCUMENTS 05037619  2/1993  Japan .

*Primary Examiner*—Jack Chiang
*Attorney, Agent, or Firm*—Oliff & Berridge, PLC

[57] ABSTRACT

This invention relates to a phone holder. The phone holder includes a holder main body with an outer box. The holder main body is provided with movable members such as side walls which are movable in a direction orthogonal to a direction of inserting a mobile phone. The position of the movable members is adjusted by a position adjuster such as a screw shaft.

33 Claims, 63 Drawing Sheets

PHONE HOLDER

BACKGROUND OF THE INVENTION

1. Field of the Invention

This invention relates to a phone holder which is mounted in a passenger compartment of a vehicle to enable holding of a mobile phone.

2. Description of the Background Art

In recent years, as mobile phones become popular, various types of phone holders for use in e.g., a vehicle which enable use and holding of the mobile phone have been developed. One of such phone holders comprises a holder main body such as a base frame capable of holding a mobile phone, and a connector mounted on the holder main body or a vehicle body via a curl cord or its equivalent. A mobile phone is held by the phone holder in such a manner that it is connected to the connector when the mobile phone is positioned relative to the holder main body and held therein by an engaging means.

In the above phone holder, a connecting operation of the mobile phone to the connector and a positioning operation of the mobile phone relative to the holder main body are not feasible when a driver has to perform the above operations while driving. Further, while driving, a holding state of the mobile phone set in the phone holder is unstable due to a shaking of the vehicle and the like. Accordingly, it is possible that the phone may be disconnected from the connector or may come out of the holder main body.

To eliminate the above problems, there has been an idea of forming an inner contour of the holder main body substantially identical to an outer contour of the mobile phone to fittingly insert the mobile phone in the holder main body with almost no clearance between the phone and the holder main body. This arrangement is limited to holding of the mobile phone which is exactly shaped into the inner contour of the holder main body, and cannot be applied to holding of various types of mobile phones which are different in size and outer shape. Accordingly, the phone holder of the prior art cannot be mass produced and hold various types of mobile phones.

SUMMARY OF THE INVENTION

In view of the above problems residing in the prior art, it is an object of this invention to provide a phone holder that enables holding of a mobile phone with an easy operation in a stable state, and a method for positioning the mobile phone relative to an inner wall of the phone holder.

To accomplish the above objects, the phone holder according to this invention comprises: a holder main body formed with a hollow portion inside thereof with a phone insertion opening for inserting and setting the mobile phone therein; movable means movable toward and away from a plane parallel to a direction of inserting the mobile phone set in the holder main body in a direction orthogonal to the inserting direction of the mobile phone; and a position adjuster for adjusting a position of the movable member.

The above and other objects, features and advantages of the present invention will become more apparent upon a reading of the following detailed description and drawings.

DETAILED DESCRIPTION OF THE PREFERRED EMBODIMENTS OF THE INVENTION

Hereinafter, preferred embodiments of this invention is described with reference to the accompanying drawings.

Figure 1:
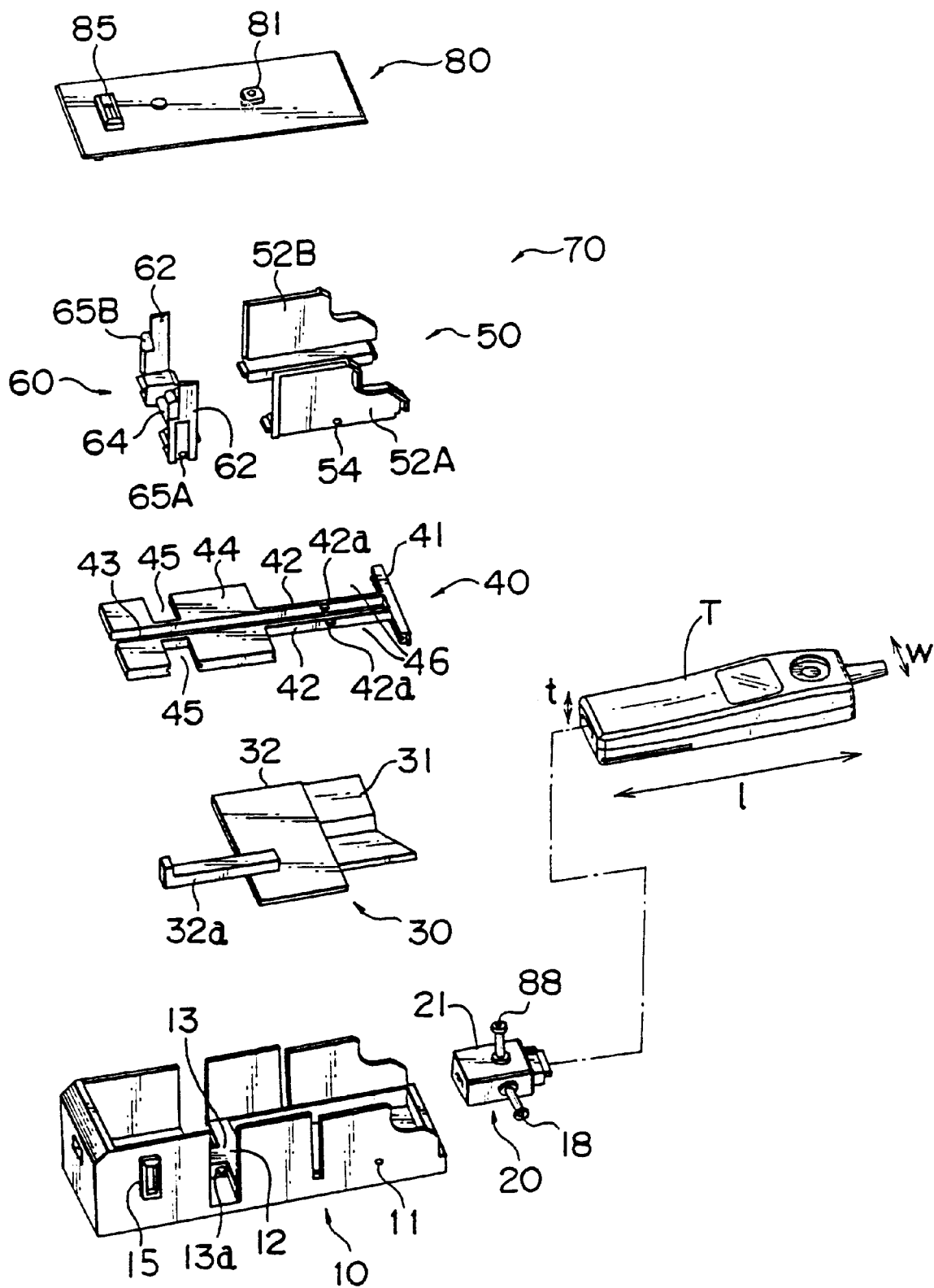
FIG. 1 is an exploded perspective view of a phone holder as a first embodiment according to this invention.
Figure 2:
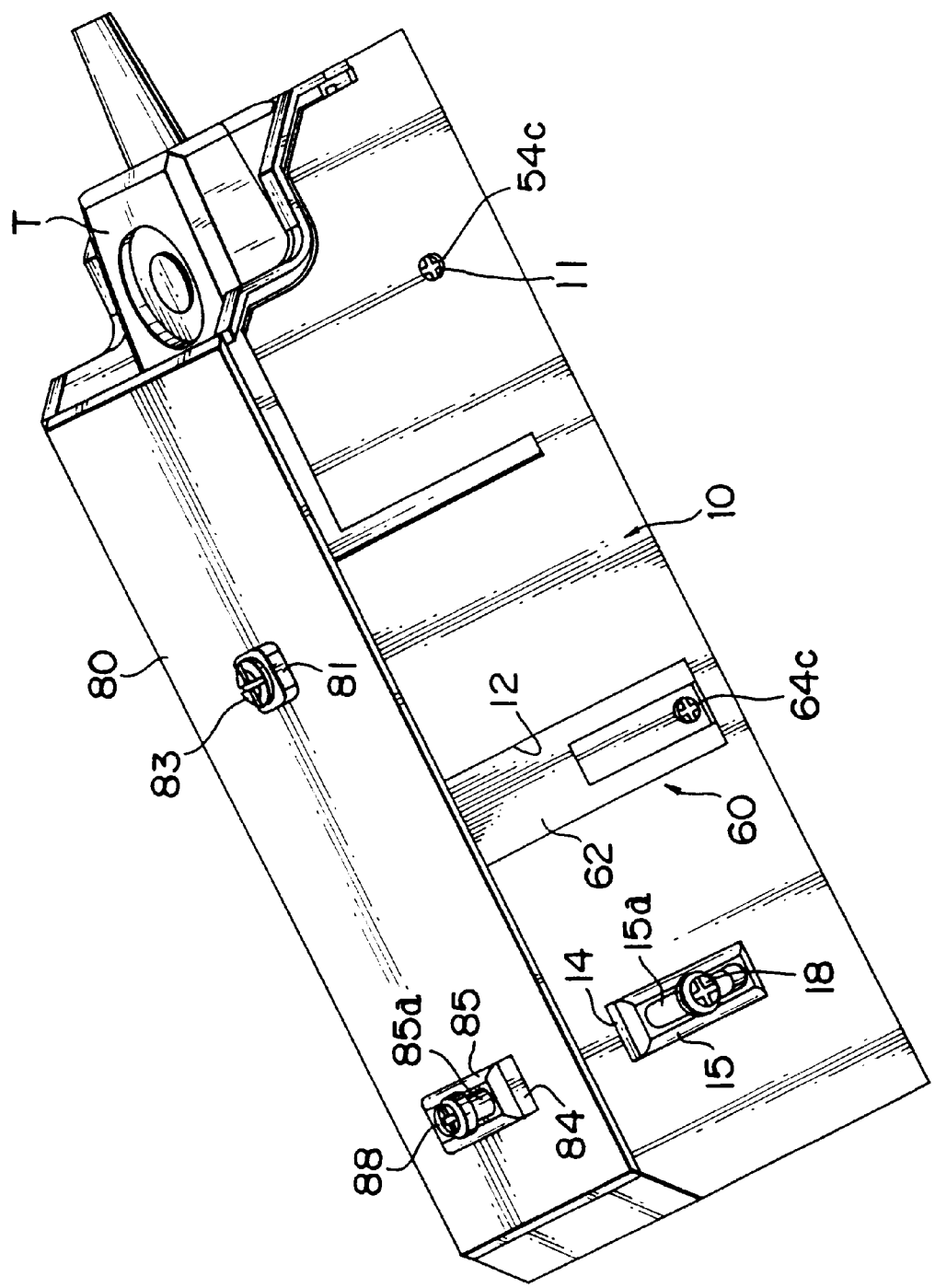
FIG. 2 is a perspective view of the first phone holder in an assembled state.

It should be noted that in general throughout the detailed description, a lengthwise direction of a mobile phone 1, a widthwise direction thereof w, and a thickness direction thereof τ are respectively defined, but not limited to, as a phone insertion direction, a transverse (widthwise) direction, and a thickness direction (see FIG. 1). However, for the purpose of easy understanding with clear and concise description and figures, one or more of the above defined directionalities may be referred to as different terminology.

[First Embodiment]

A first embodiment of this invention is described with reference to FIGS. 1 to 17.

A phone holder according to this embodiment comprises, as shown in FIG. 1, an outer box 10, a connector module 20, a phone ejector module 30, an inner bottom frame 40, an adjustment module 70 including a pair of inner walls 50, 60, and a ceiling wall 80.

The outer box 10 has, as shown in FIGS. 2 to 7, a hollow portion having an opening (phone insertion opening) at one end (right side in FIGS. 1 to 3, hereinafter referred to as a "phone entrance side") with its length and at its upper side. By mounting the ceiling wall 80 on the outer box 10 so as to close the upper side opening thereof, a holder main body according to this invention is formed. This holder main body is fixed in a proper position of a passenger compartment of a vehicle.

In each of the opposite side walls of the outer box 10 are formed a round through hole 11 and a notch 12 in this order from the phone entrance side. Each notch 12 is rectangular shaped and open upward and is formed in a position immediately before (right side in FIGS. 1 to 3) a position where the connector module 20, to be described later, is arranged. Where the notches 12 are formed, an upward projected portion 13 (see FIGS. 5 and 6) is formed in a middle of the bottom wall of the outer box 10 with respect to widthwise direction. A through hole 13a is formed in this projected portion 13 in such a manner as to extend therethrough along widthwise direction (transverse direction in FIG. 5).

Figure 9:
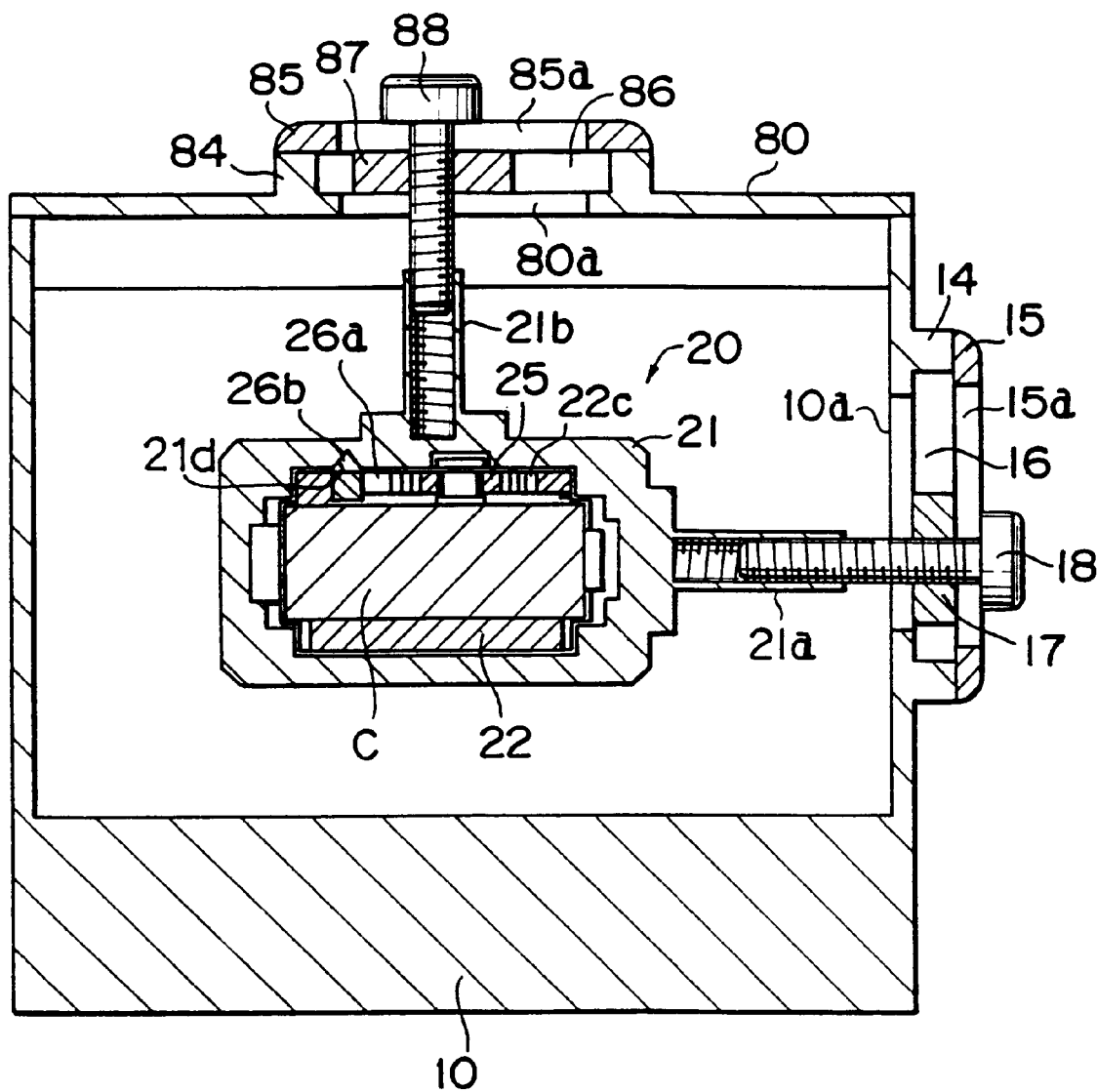
FIG. 9 is a cross sectional view of the first phone holder taken along the line 9—9 in FIG. 3.

A vertically extended long through hole 10a as shown in FIG. 9 is formed at a rear part of one side wall of the outer box 10. This through hole 10a is formed in a position at the side of the arrangement position of the connector module 20. On the outer side surface of the side wall of the outer box 10 where this through hole 10a is formed is provided a frame 14 which is so shaped as to enclose the hole 10a from four sides. A cover 15 is mounted on the frame 14 to close it. A vertically extended long through hole 15a is also formed in the cover 15. A nut 17 is accommodated in a space 16 defined by the frame 14 and the cover 15.

The nut 17 is held by the frame 14 from opposite sides along the length of the phone holder (depth direction of FIG. 9) and is held also by the outer surface of the side wall of the outer box 10 and the inner surface of the cover 15 from opposite sides along height direction of the frame 14 (transverse direction of FIG. 9). The nut 17 is unrotatably slidable only along vertical direction of the space 16 in a position where an internally threaded hole thereof is in conformity with the through holes 10a, 15a.

Similarly, a transversely extended long through hole 80a as shown in FIG. 9 is formed in the ceiling wall 80 above the arrangement position of the connector module 20. On the upper surface of the ceiling wall 80 is provided a frame 84 which is so shaped as to enclose the hole 80a from four sides. A cover 85 is mounted on the frame 84 to close it. A transversely extending long through hole 85a is also formed in the cover 85. A nut 87 of polygonal shape is accommodated in a space 86 defined by the frame 84 and the cover 85.

This nut 87 is held by the frame 84 from opposite sides along the length of the phone holder and is held also by the outer surface of the side wall of the outer box 10 and the inner surface of the cover 85 from opposite sides along vertical direction. The nut 87 is unrotatably slidable only along transverse direction of FIG. 9 in the space 86 in a position where an internally threaded hole thereof is in conformity with the through holes 80a, 85a.

The connector module 20 has a housing for holding a holder connector C which is connected to a phone connector of a mobile phone T. The housing has a double structure consisting of an outer housing 21 and an inner housing 22.

Figure 10:
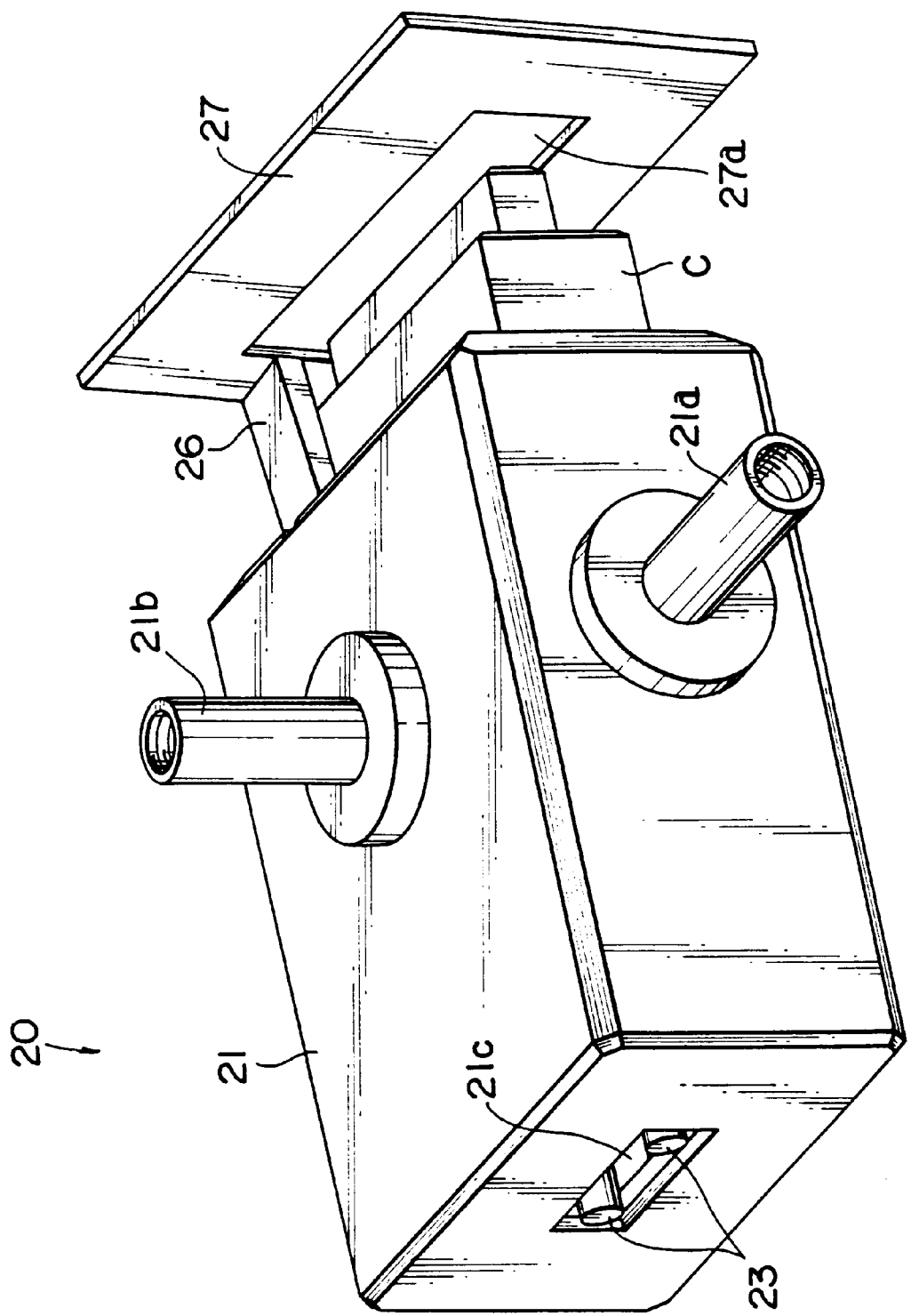
FIG. 10 is a perspective view of a connector module of the first phone holder.
Figure 11:
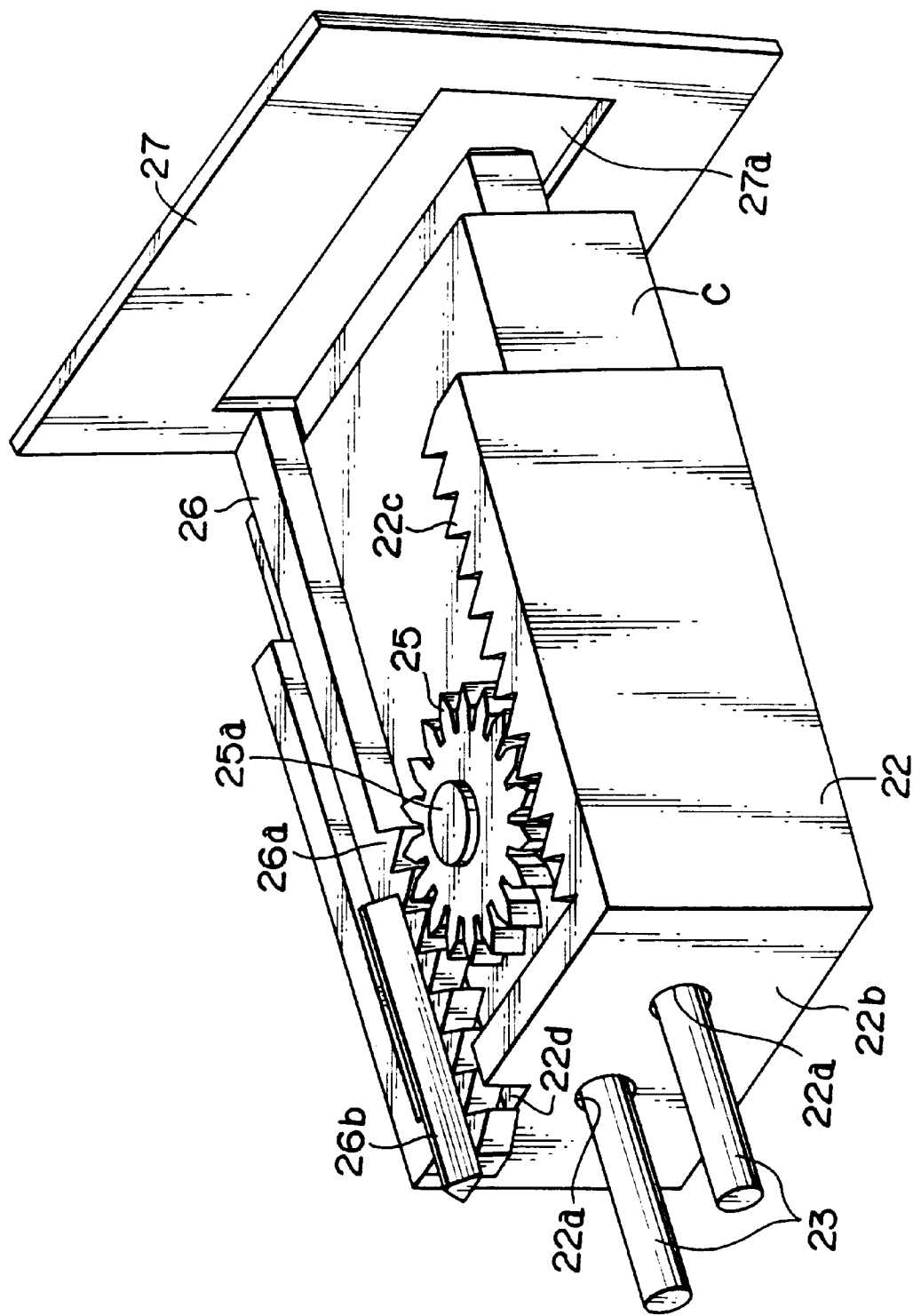
FIG. 11 is a perspective view of the connector module with an outer housing omitted.

As shown in FIGS. 9 and 10, a transversely extended cylindrical nut 21a is formed on one side surface of the outer housing 21 (at a side surface corresponding to the above-mentioned through long hole 10a) This nut 21a is open toward the through hole 10a. An end portion of a bolt 18 screwed to the nut 17 through the through hole 15a from the outside of the holder main body is screwed into the nut 21a. In other words, the outer housing 21 is coupled with one side wall of the outer box 10 via the transversely extending bolt 18, and the position thereof in the transverse direction is adjusted by manipulating the bolt 18.

Similarly, a vertically extended cylindrical nut 21b is formed on the upper surface of the outer housing 21. This nut 21b is open toward the through hole 80a formed in the ceiling wall 80. An end portion of a bolt 88 screwed to the nut 87 through the through hole 85a from the outside of the holder main body is screwed into the nut 21b. In other words, the outer housing 21 is coupled with the ceiling wall 80 via the vertically extending bolt 88, and the position thereof in the vertical direction is adjusted by manually rotating the bolt 88.

As shown in FIGS. 9, 11 to 13, the inner housing 22 is open forward (upward in FIGS. 12 and 13) and has a middle portion of its ceiling wall along transverse direction opened upward to slidably fit the holder connector C into the inner housing 22 along forward and backward directions (along phone inserting and ejecting directions).

A pair of left and right pins 23 project backward from the rear end surface (bottom end surface in FIGS. 12 and 13) of the holder connector C. The holder connector C is guided in inserting and ejecting directions of the mobile phone T by inserting these pins 23 into through holes 22a formed in a back wall 22b of the inner housing 22. Further, coil springs 24 are mounted on the respective pins 23, thereby biasing the holder connector C forward (upward in FIGS. 12 and 13) by bias forces of the coil springs 24.

Further, a through hole 21c is formed in the rear wall of the outer housing 21 in order to avoid interference with the pins 23, as shown in FIG. 10.

On the housing of the holder connector C a pinion 25 is mounted rotatably about a vertically extended rotatable shaft 25a. On the other hand, a rack 22c meshable with the pinion 25 is formed at one inner periphery of the ceiling wall of the inner housing 22. Accordingly, as the pinion 25 is rotated, the connector holder C slides along forward and backward directions with respect to the inner housing 22.

This connector module 20 is also provided with a driving force transmitter including an integral assembly of a coupling bar 26 and a contact plate 27. The coupling bar 26 extends along forward and backward directions and has a rack 26a and a guided portion 26b in the form of a triangular column at its rear half. While the rack 26a is in mesh with the pinion 25, the guided portion 26b is fitted in a V-shaped guide groove 21d (see FIG. 9) formed in the outer housing 21. Accordingly, the entire coupling bar 26 is slidably guided along forward and backward directions.

The contact plate 27 extends in a direction normal to the phone inserting direction and is integrally connected with the front end of the coupling bar 26 so as to be brought into contact with the rear end of the mobile phone T inserted into the holder main body. A rectangular opening 27a which permits the passage of the holder connector C is formed in the middle of the contact plate 27.

Figure 12:
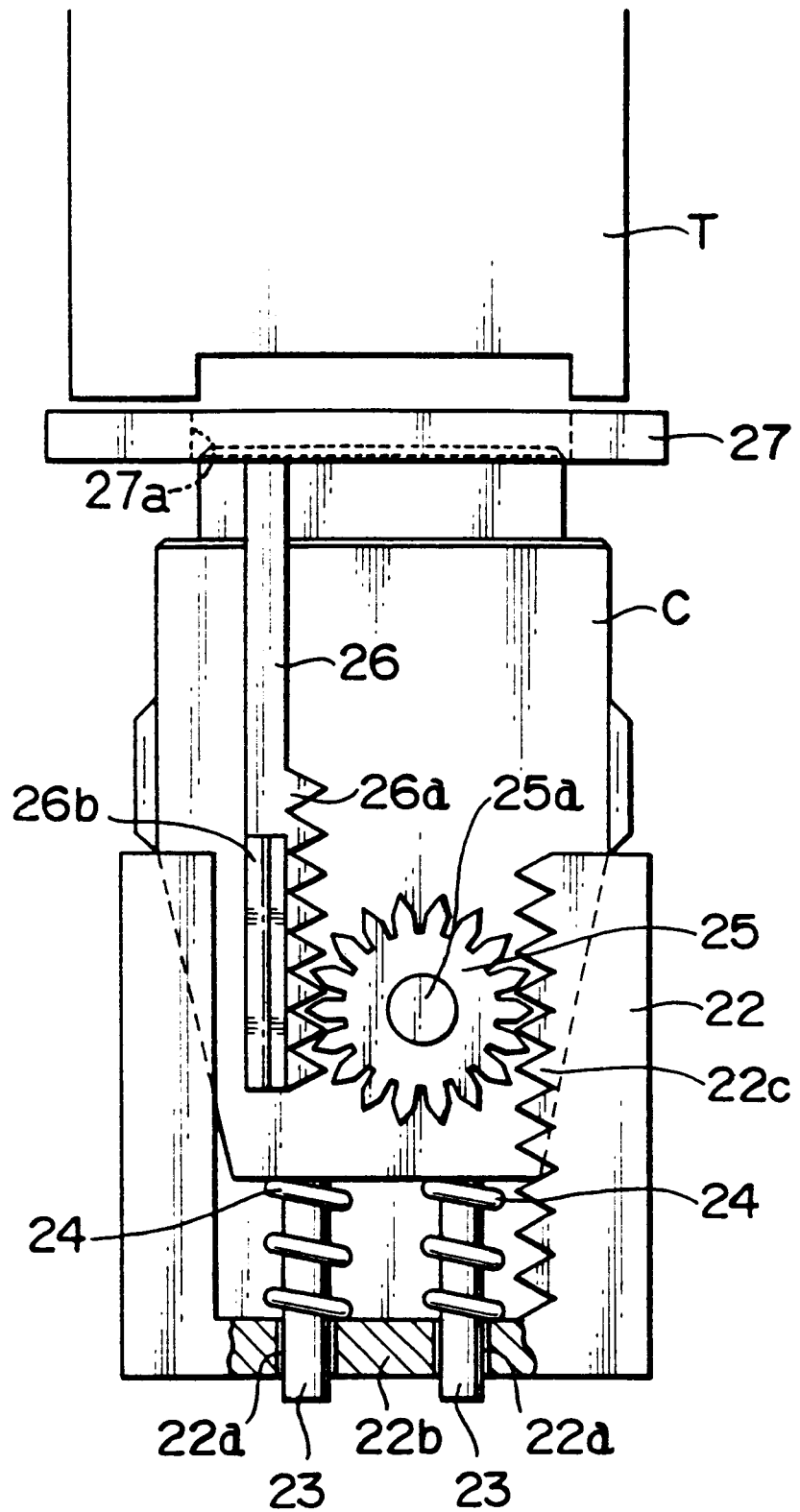
FIG. 12 is a plan view showing a state before a mobile phone is connected to a connector of the connector module.
Figure 13:
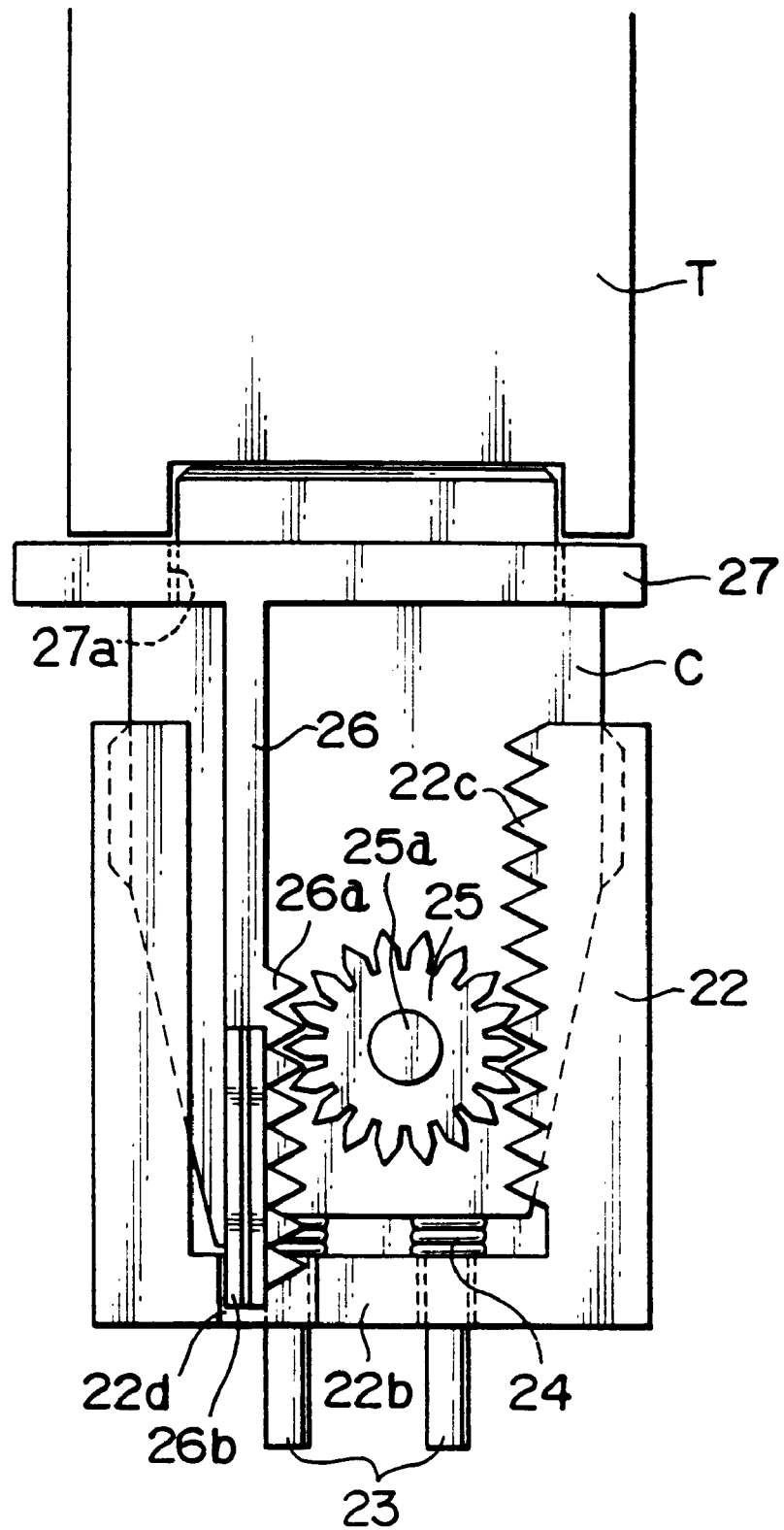
FIG. 13 is a plan view showing a state that the mobile phone has been connected to the connector of the connector module.

The slide stroke of the holder connector C is set such that the contact plate 27 is positioned more forward than the holder connector C in a state where the holder connector C is pushed to its foremost position by the bias forces of the coil springs 24 as shown in FIG. 12, and the connection of the holder connector C and the phone side connector of the mobile phone T is completed through the opening 27a of the contact plate 27 in a position slightly before a rearmost position where the holder connector C is retracted against the bias forces of the coil springs 24 as shown in FIG. 13.

Figure 14:
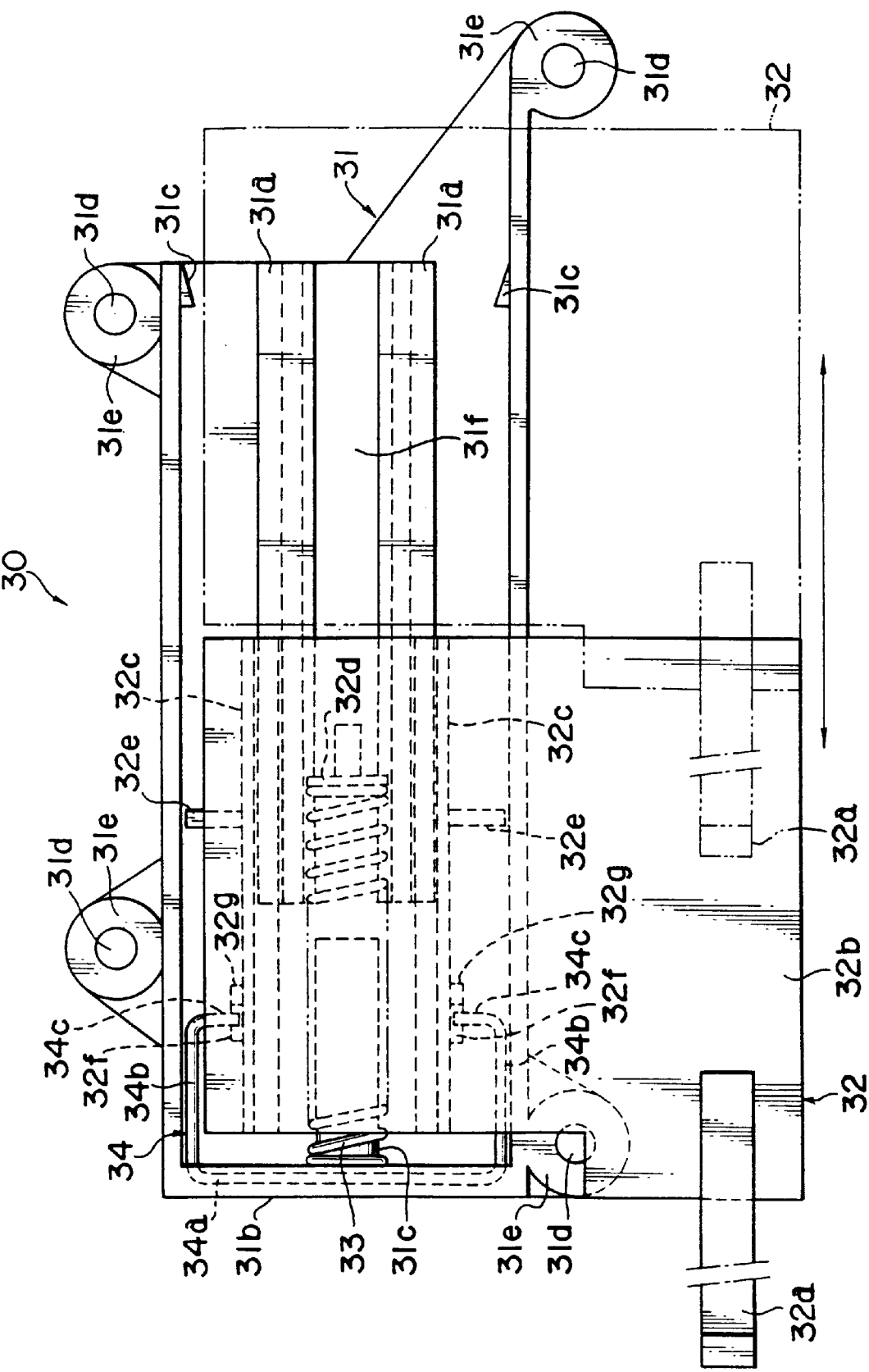
FIG. 14 is a plan view of a phone ejector module of the first phone holder.
Figure 15:
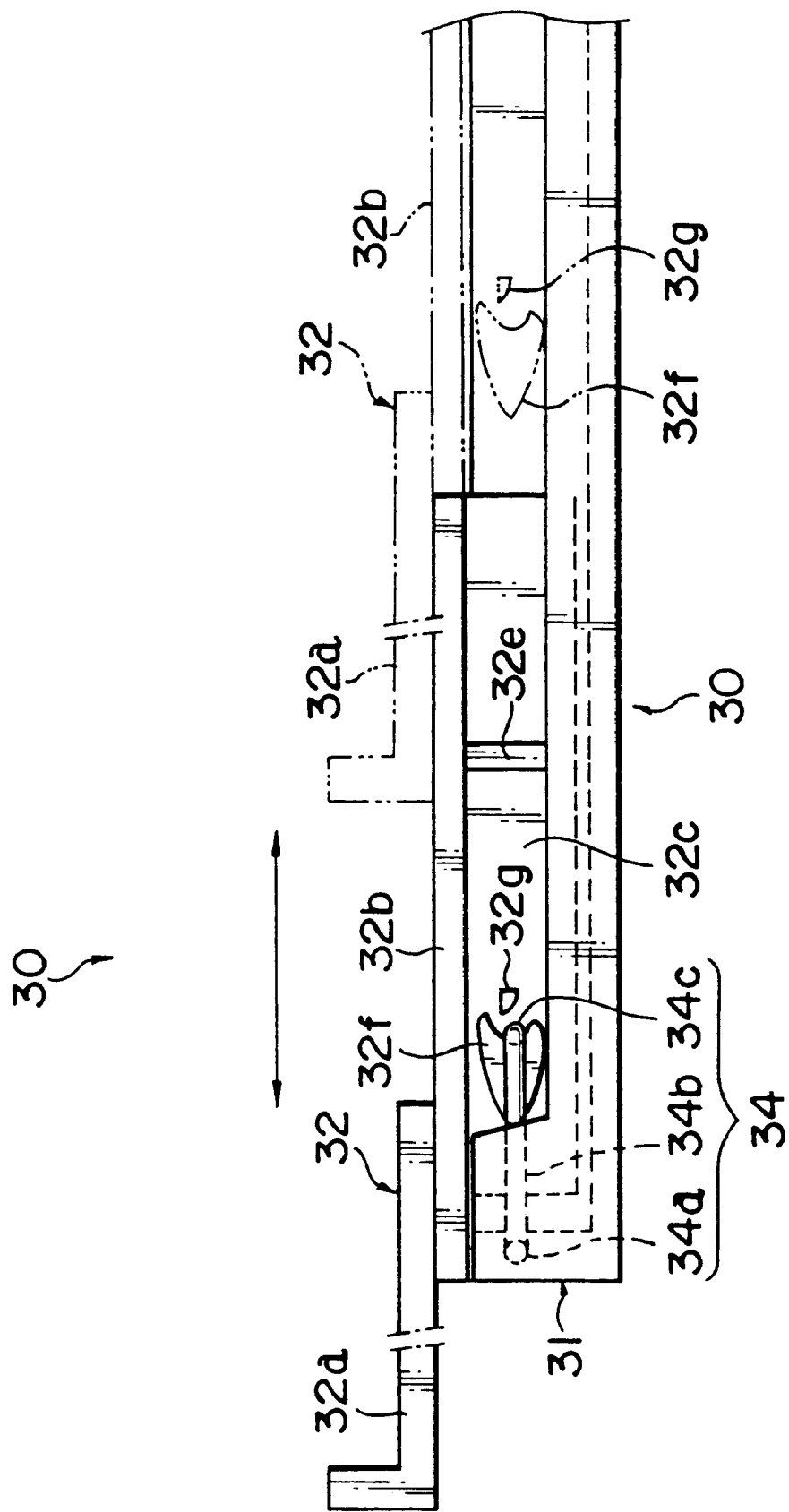
FIG. 15 is a side view of the phone ejector module.
Figure 16:
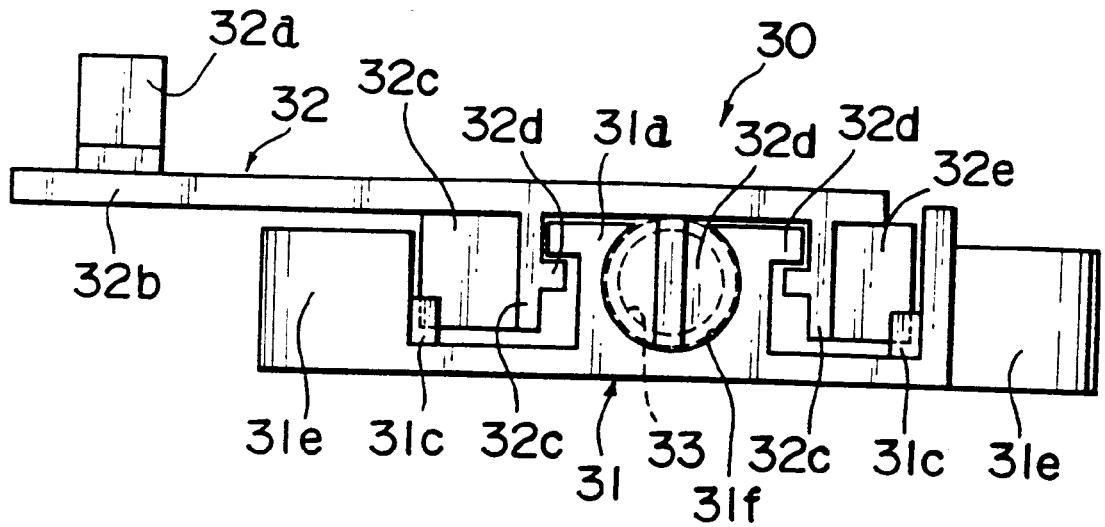
FIG. 16 is a front view of the phone ejector module.

The phone ejector module 30 is adapted to provide the mobile phone T with a pushing force (bias force) necessary to disengage the phone side connector of the mobile phone 6 from the holder connector C when the mobile phone T is ejected from the phone holder, and includes a base member 31 and a slider 32 as shown in FIGS. 14 to 16.

Cylindrical mount portions 31e each having a vertically extended bolt insertion hole 31d are provided in specified positions of the base member 31. By inserting bolts into the respective bolt insertion holes 31d and screwing the bolts into unillustrated internally threaded holes formed in the bottom wall of the outer box 10, the base member 31 is fixed to a suitable bottom portion of the outer box 10.

A rail 31a extending in the phone inserting direction (left-right direction of FIG. 14) is provided on the upper surface of the base member 31. This rail 31a has a substantially T-shaped cross section when viewed from front as shown in FIG. 16, and a groove 31f having a substantially circular cross section is so formed as to open upward.

The slider 32 has a horizontal main plate 32b, and a pair of left and right vertical walls 32c projecting from the lower surface of the main plate 32b. Both vertical walls 32c extend in the phone inserting direction, and elongated projections 32d project inward from the inner side surfaces of the vertical walls 32c. The slider 32 is slidably supported on the base member 31 (along phone inserting direction) by engaging the vertical walls 32c and the elongated projections 32d with an upper end portion of the rail 31a. An arm 32a which has a substantially L-shaped cross section when viewed along sideways direction and has a rear end projecting upward is fixed to the upper surface of the main plate 32b of the slider 32, and the rear end surface of the mobile phone T is brought into contact with the rear end of the arm 32a.

A rear wall 31b stands substantially upright at the rear end (left end in FIG. 14) of the base member 31, and a cylindrical spring support shaft 31c projects forward from a middle position of the rear wall 31b. A rear part of a coil spring 33 is mounted on this spring support shaft 31c, and a front part thereof is fitted into the groove 31f of the rail 31a. On the other hand, a spring support plate 32d is in contact with the lower surface of the slider 32 and is fitted in the groove 31f.

The coil spring 33 is held between the spring support plate 32d and the rear wall 31b, and the slider 32 is urged forward (to the right in FIGS. 14 and 15) by the bias force of the coil spring 33. Further, stoppers 31c project at the opposite ends of the rear part of the base member 31, whereas contact pieces 32e project outward from the vertical walls 32c of the slider 32. A position where the contact pieces 32e and the stoppers 31c are in contact with each other is a foremost end position (position shown by phantom line in FIG. 14) of the slider 32.

At the rear part of the base member 31 is provided a locking bar 34 for locking the slider 32. This locking bar 34 includes a base shaft 34a extending along transverse direction of the mobile phone T (top-bottom direction in FIG. 14), a pair of arms 34b extending forward from the opposite ends of the base shaft 34a, and locking portions 34c extending inward from the front ends of the respective arms 34b. The base shaft 34a is pivotally supported on the rear wall 31b. Further, a spacing between the leading ends of the locking portions 34c is set slightly larger than a spacing between the outer surfaces of the vertical walls 32c of the slider 32.

Figure 17:
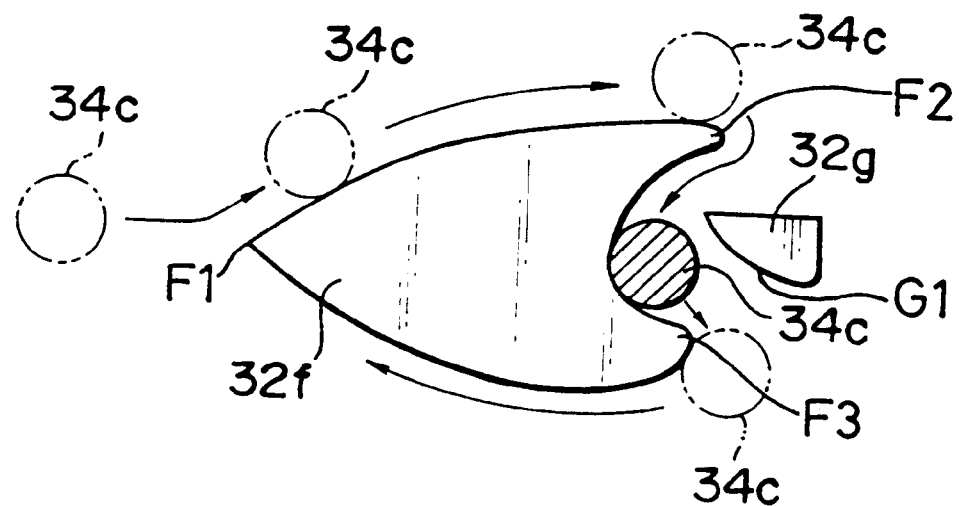
FIG. 17 is a side view of an engaging projection and a guide projection formed in a slider of the phone ejector module.
Figure 18:
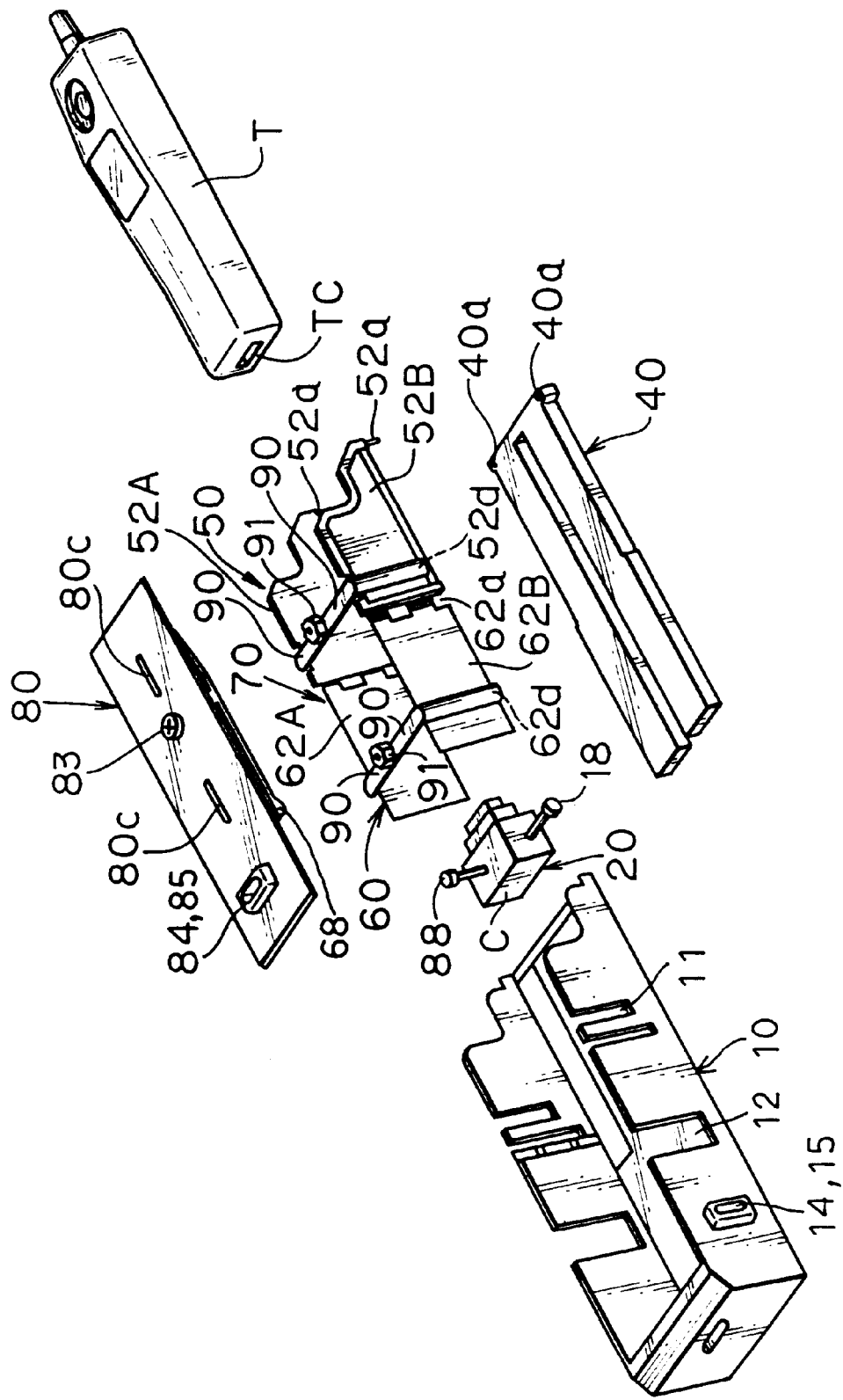
FIG. 18 is an exploded perspective view of a phone holder as a second embodiment according to this invention.
Figure 19:
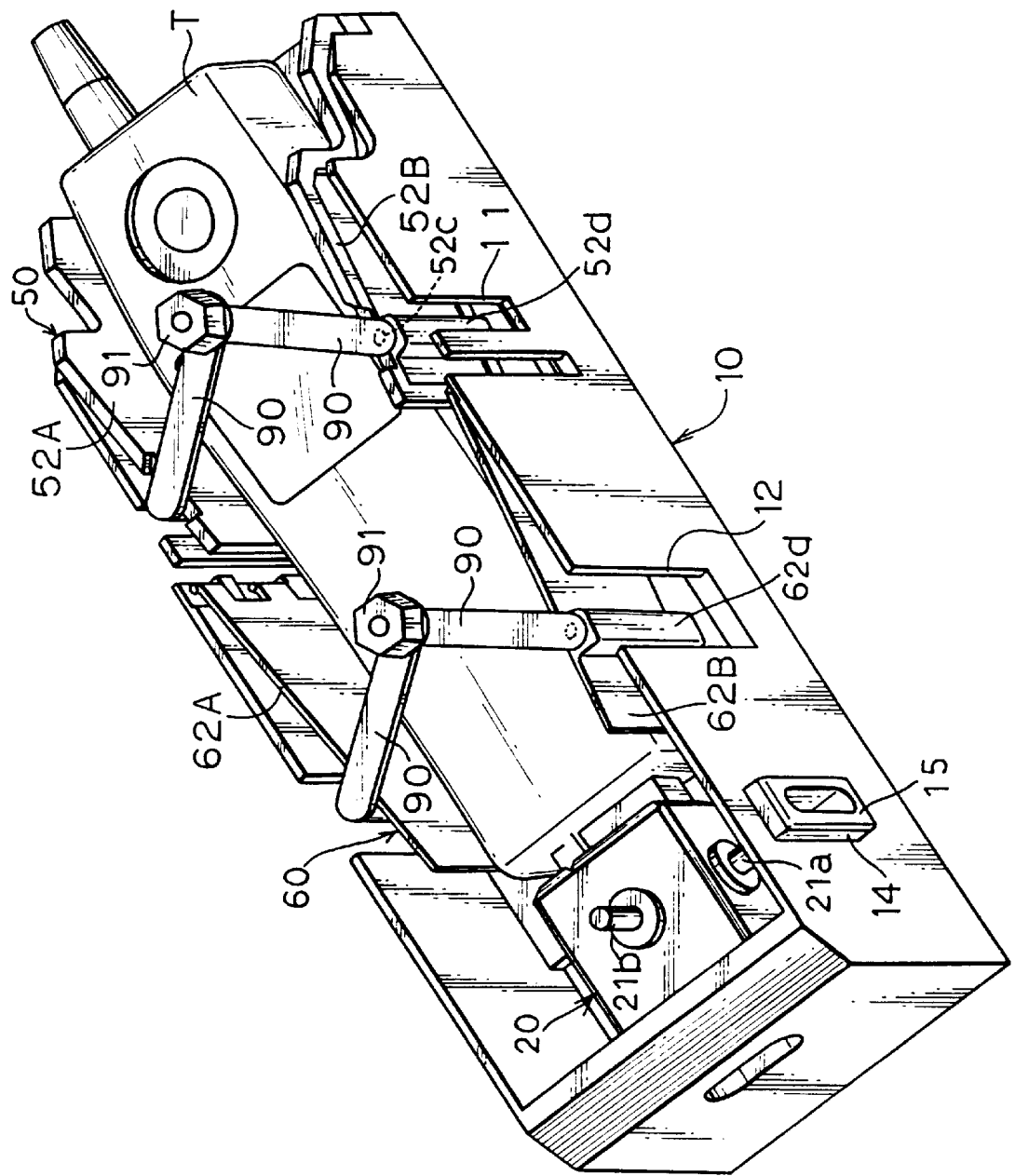
FIG. 19 is a perspective view of the second phone holder in an assembled state with a ceiling wall omitted when viewed from a rear side of the phone holder.
Figure 20:
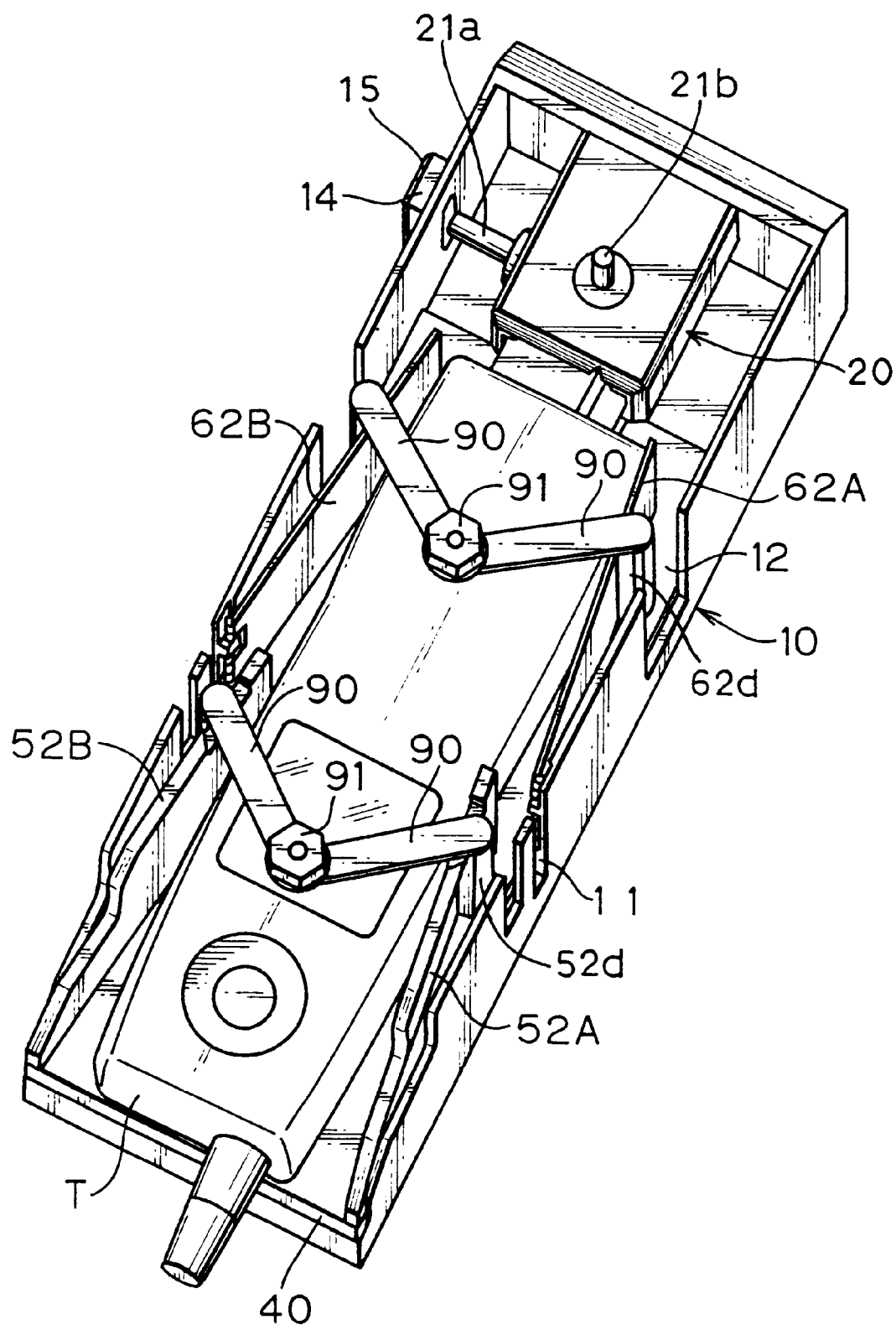
FIG. 20 is a perspective view of the second phone holder in the assembled state when viewed from a front side of the phone holder.

On the other hand, an engaging projection 32f and a guide projection 32g as shown in FIG. 17 are formed on the outer surface of a rear portion of each vertical wall 32c. Each engaging projection 32f has a single apex F1 substantially in the middle of its rear end (left end in FIG. 17) along vertical direction, and has two apexes F2, F3 at the opposite ends of its front end along vertical direction. The outer surface between the apices F2 and F3 is dented so that the engaging projection 32f has a substantially heart shape as a whole. On the lower surface of the guide projection 32g is formed a guide surface G1 which is inclined downward toward the front (toward the right side in FIG. 17).

As the rear end of the arm 32a is pushed by the mobile phone T being inserted into the holder main body and the slider 32 is retracted against the bias force of the coil spring 33, the locking portions 34c of the locking bar 34 move onto the upper surface of the engaging projections 32f of the slider 32 (see arrow of FIG. 17). When the locking portions 34c move beyond the apex F2 of the engaging projection 32f, the locking portions 34c enter the recesses between the apices F2 and F3 (position indicated by solid line in FIG. 17) by being subjected to the bias force of the coil spring 33. As a result, the slider 32 is locked in its locking position indicated by solid line in FIGS. 14 and 15. Further, by pushing the slider 32 from this position further to a rearmost end position, the locking portions 34c come downward out of the recesses (see arrows of FIG. 17) by being guided by the guide surfaces G1 of the guide projections 32g located before the recesses. As a result, the locking is released so that the slider 32 is pushed forward by the bias force of the coil spring 33.

Here, the locked position of the slider 32 is set at a position where the connection of the mobile phone T in contact with the arm 32a of the slider 32 and the holder connector C of the connector module 20 is completed. The rearmost end position of the slider 32 is set in such a position that the holder connector C connected with the mobile phone T is retracted to the rearmost end position shown in FIG. 13.

Referring back to FIG. 1, the inner bottom frame 40 is placed on the bottom wall of the outer box 10, and includes a single front frame 41 extending along transverse direction and a pair of left and right main frames 42, 42 each extending backward from a middle portion of the front frame 41. A space is defined between the main frames 42, 42 for allowing the passage of a projected portion at the rear end of the arm 32a of the slider 32 (see FIG. 4).

Through holes 42a extending along transverse direction are formed at front parts of the main frames 42. The positions of these through holes 42a are so set as to be aligned with the through holes 11 of the outer box 10. Support plates 44 bulge out from rear portions of the main frames 42; spaces 46 are defined between the support plates 44 and the front frame 41; and rectangular notches 45 open along sideways direction are formed in intermediate positions of the support plates 44 along forward and backward directions. These notches 45 have the same width as the notches 12 of the outer box 10 and are formed in positions in conformity with the notches 12.

An inner wall pair 50 is comprised of right and left side plates (or referred to as "movable members" of "movable means") 52A, 52B (see FIG. 4) arranged upright, and nut portions 53A, 53B having internally threaded through holes extending along the widthwise direction of the mobile phone T are formed at the bottom ends of the respective side plates 52A, 52B. The threads formed in the respective through holes are oriented in opposite directions (i.e., one is a right handed screw threaded, and the other is a left handed screw thread). A dimension of the respective nut portions 53A, 53B along forward and backward directions is set such that the nut portions 53A, 53B are substantially closely fitted in the spaces 46 of the inner bottom frame 40. As a result of this fitting, the respective side plates 52A, 52B are movably accommodated in the outer box 10 along the widthwise direction of the mobile phone T. Further, the internally threaded through holes are so positioned as to align with the through holes 42a, 11 in the transverse direction.

The positions of the side plates 52A, 52B are adjusted by a screw shaft 54 (or referred to as a "position adjuster"). A middle portion of the screw shaft 54 is insertable into the through hole 42a (see FIG. 4), and left and right portions thereof are formed into externally threaded portions 54a, 54b to be screwed into the respective nut portions 53A, 53B. An operable portion (operable member) 54c which is rotated by a driver or like tool is formed at one end surface of the screw shaft 54 (end surface facing the through hole 11). By rotating the screw shaft 54, the side plates 52A, 52B are simultaneously moved toward and away from each other.

Now, also referring back to FIG. 5, similar to the inner wall pair 50, an inner wall pair 60 is comprised of right and left side plates (or referred to as "movable members" of "movable means") 62A, 62B arranged upright, and nut portions 63A, 63B having internally threaded through holes extending along the transverse (widthwise) direction of the mobile phone T are formed at the bottom ends of the respective side plates 62A, 62B. The threads formed in the respective through holes are oriented in opposite directions (i.e., one is a right handed screw thread, and the other is a left handed screw thread). A dimension of the respective nut portions 63A, 63B and a dimension of the side plates 62A, 62B along forward and backward directions are set such that the nut portions 63A, 63B and the side plates 62A, 62B can be substantially closely fitted in the notches 45 of the inner bottom frame 40 and the notches 12 of the outer box 10. As a result of this fitting, the respective side plates 62A, 62B are movably set in the outer box 10 along the transverse direction of the mobile phone T. Further, the internally threaded through holes are so positioned as to align with the through hole 13a of the projected portion 13 of the outer box 10.

The positions of the side plates 62A, 62B are adjusted by a screw shaft 64 (or referred to as a "position adjuster"). Similar to the screw shaft 54, a middle portion of the screw shaft 64 is insertable into the through hole 13a, and left and right portions thereof are formed into externally threaded portions 64a, 64b to be screwed into the respective nut portions 63A, 63B. An operable portion (or operable member) 64c which is rotated by a driver or like tool is formed at one end surface of the screw shaft 64 (the same side as the operable portion 54c of the screw shaft 54). By rotating the screw shaft 64, the side plates 62A, 62B are simultaneously moved toward and away from each other. The side surfaces of the respective side plates 62A, 62B are formed into tapered surfaces (tapered portions) 62c which are more transversely spaced apart from the mobile phone T as approaching toward the phone entrance side, assuming the side surfaces of the mobile phone T are substantially parallel to the phone insertion direction.

Figure 6:
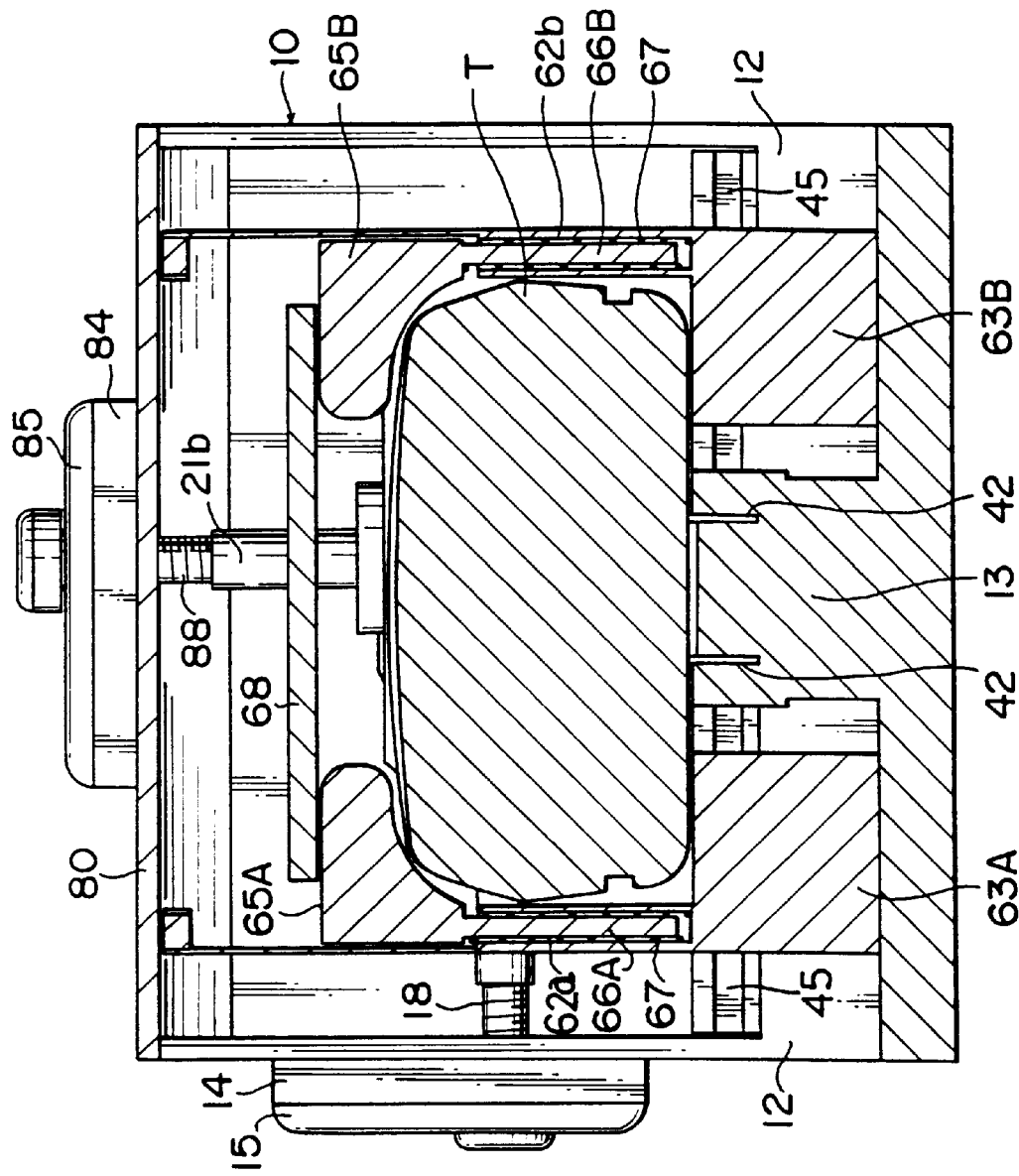
FIG. 6 is a cross sectional view of the first phone holder taken along the line 6—6 in FIG. 3.
Figure 7:
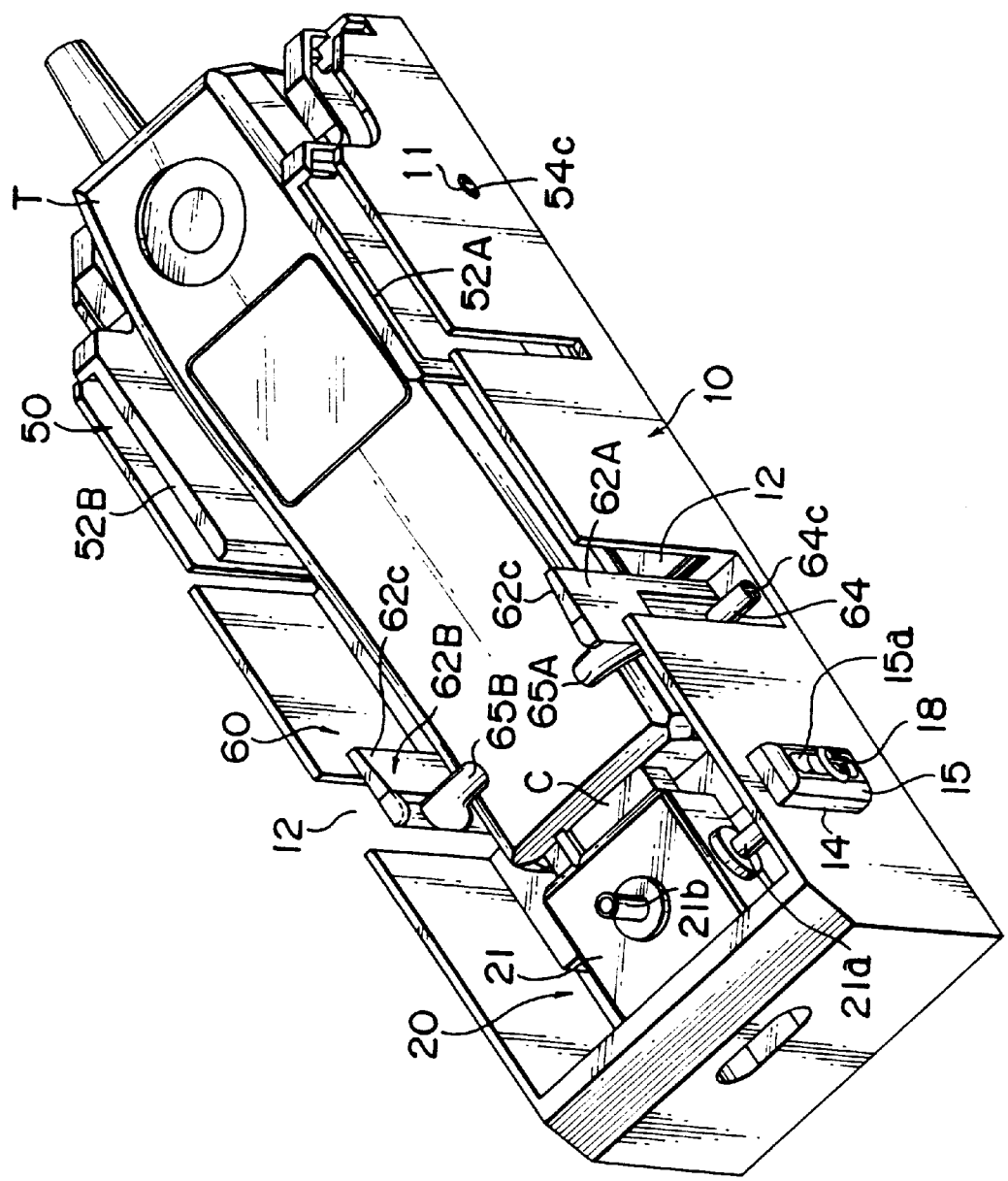
FIG. 7 is a perspective view of the first phone holder with a ceiling wall omitted.
Figure 8:
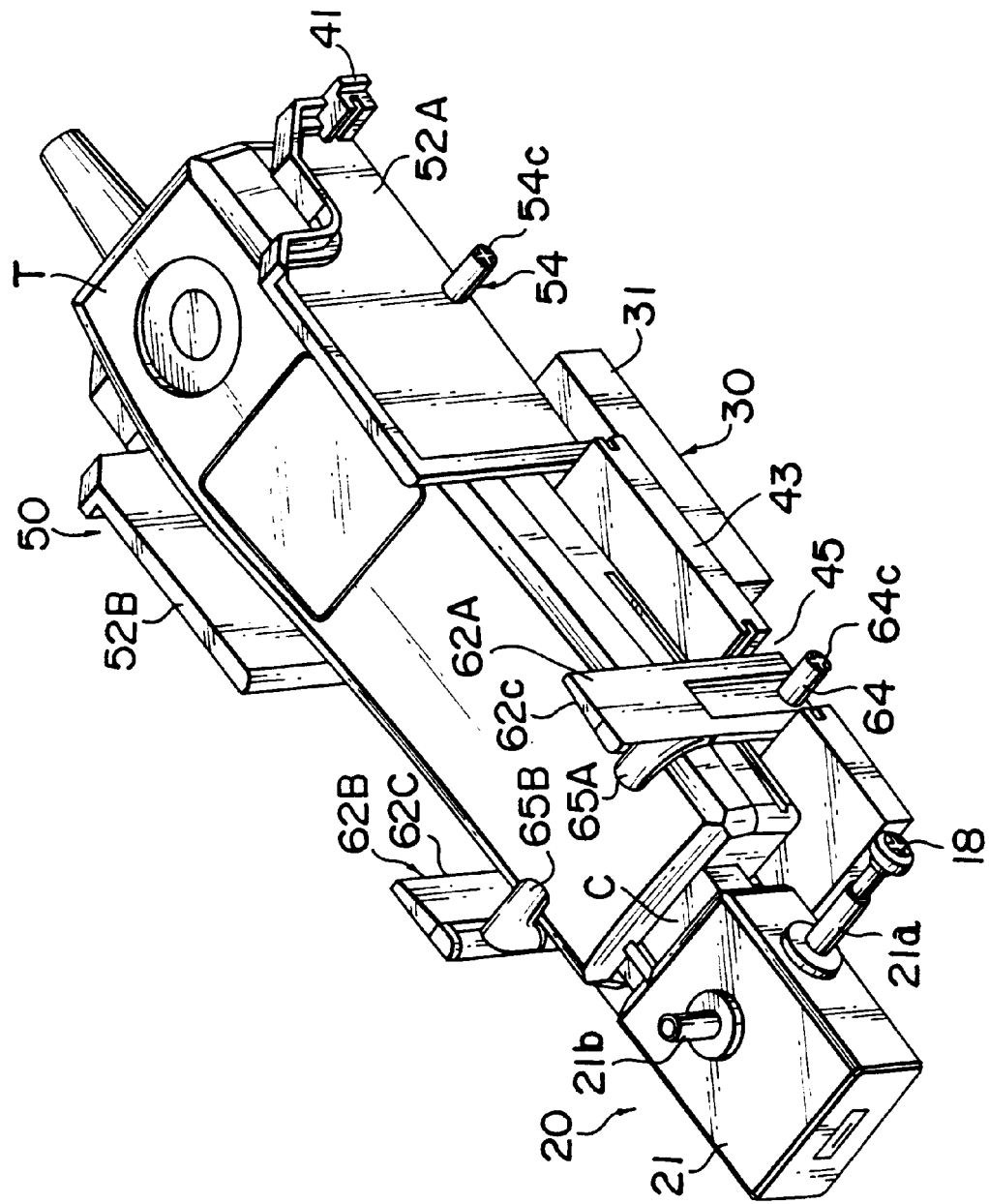
FIG. 8 is a perspective view of the first phone holder with the ceiling wall and an outer box omitted.

On the respective side plates 62A, 62B, restricting projections (or referred to as "sub movable members") 65A, 65B for restricting the position of the mobile phone T from above are movably provided along vertical direction. Specifically, tubular portions 62a, 62b which are open upward as shown in FIG. 6 are formed at rear portions of the respective side plates 62A, 62B, whereas columns 66A, 66B project downward from the respective restricting projections 65A, 65B. These columns 66A, 66B are fitted into the tubular portions 62a, 62b. The tubular portions 62a, 62b accommodate respective coil springs 67 surrounding the columns 66A, 66B. The respective restricting projections 65A, 65B are biased upward by the bias force of the coil springs 67. The inner surfaces of the restricting projections 65A, 65B are continuous with the inner surfaces of the side plates 62A, 62B and are so curved as to be brought into contact with part of the side surfaces and the upper surface of the mobile phone T (see FIGS. 5 and 6).

On the other hand, the ceiling wall 80 is coupled with an inner ceiling plate 68 for pressing the restricting projections 65A, 65B from above. This inner ceiling plate 68 extends along the phone inserting direction substantially in parallel with the ceiling wall 80 as shown also in FIG. 3, and a cylindrical nut 68a which is open upward is formed on its upper surface.

The ceiling wall 80 is formed with a round through hole 80c, and a frame 81 which is so shaped as to surround this through hole 80c is formed on the upper surface of the ceiling wall 80. A nut 82 is unrotatably accommodated in the frame 81, and an internally threaded hole of the nut 82 is in alignment with the through hole 80c and is exposed upward. A bolt 83 is screwed into the nut 82 and a bottom end portion thereof is screwed into the nut 68a, with the result that the ceiling wall 80 and the inner ceiling plate 68 are coupled one above the other by the bolt 83.

Next, the assembling of the phone holder, the adjustment of the respective parts and the action of the phone holder during the use after the adjustment are described.

1) The base member 31 of the ejector module 30 is secured to the bottom wall of the outer box 10 by bolts. The slider 32 is locked in the locking position shown by solid line in FIGS. 14 and 15. In other words, the locking portions 34c of the locking bar 34 of the base member 31 are engaged with the rear side recesses of the engaging projections 32f as shown by solid line in FIG. 17.

2) The screw shaft 54 is inserted into the through hole 42a of the inner bottom frame 40 for the centering. The internally threaded holes of the nuts 53A, 53B of the side plates 52A, 52B are screwed down the opposite externally threaded portions 54a, 54b of this screw shaft 54, and the side plates 52A, 52B are moved toward each other to a certain degree by turning the operable member 54c of the screw shaft 54 while the side plates 52A, 52B are oriented upright. At this time, the distance between the side plates 54A, 54B is set larger than the widthwise dimension of the mobile phone T.

3) The inner bottom frame 40 is secured to the bottom wall of the outer box 10. Thereby, the side plates 52A, 52B are accommodated in the outer box 10.

4) The screw shaft 64 is screwed into the through hole 13a formed in the projected portion 13 on the bottom wall of the outer box 10 for the centering. The internally threaded holes of the nuts 63A, 63B of the side plates 62A, 62B are screwed down the opposite externally threaded portions 64A, 64B of this screw shaft 64, and the side plates 62A, 62B are moved toward each other to a certain degree by turning the operable member 64c of the screw shaft 64 while the side plates 62A, 62B are oriented upright. At this time, the distance between the side plates 64A, 64B is set larger than the widthwise dimension of the mobile phone T.

5) In the state shown in FIG. 12, the holder connector C and the mobile phone T are connected through the opening 27a of the contact plate 27 while the contact plate 27 is pressed backward (downward in FIG. 12) at the rear end of the mobile phone T. During this connecting operation, the coupling bar 26 continuous with the contact plate 27 is retracted with respect to the inner housing 22, thereby rotating the connector side pinion 25 in mesh with the rack 26a of the coupling bar 26. As the pinion 25 is rotated, the holder connector C enters the inner housing 22 at half the speed of the retracting speed of the contact plate 27 (state of FIG. 12). In other words, the holder connector C and the mobile phone T are connected while the holder connector C is being retracted.

6) The mobile phone T is set in a specified position inside the outer box 10, i.e., a position where the rear end surface of the mobile phone T is in contact with the rear end of the arm 32a provided on the slider 32 of the ejector module 30.

7) The side plates 62a, 62B and 52A, 52B are moved further toward each other by tuning the screw shaft 64 (54), and stopped in positions where the inner surfaces of the side plates 62A, 62B (52A, 52B) come into contact with the opposite side surfaces of the mobile phone T. Thereby, the side plates 52A, 52B, 62A, 62B are fittingly brought into contact with the outer surface of the mobile phone T.

8) The ceiling wall 80 is mounted on the outer box 10 with the bolt 83 screwed into the nut 82 of the ceiling wall 80 and the bottom end portion of the bolt 83 screwed into the nut 68a of the inner ceiling plate 68. The inner ceiling plate 68 is lowered to a position where the lower surface thereof presses the restricting projections 65A, 65B down to bring them into contact with the outer surface of the mobile phone T, and the bolt 83 is screwed until the head thereof comes into contact with the upper surface of the frame 81 (state of FIG. 3). Thereby, the restricting projections 65A, 65B are fixedly positioned on the mobile phone T at such a height position that the inner surface thereof comes into contact with the outer surface of he mobile phone T.

9) The bolt 18 is screwed into the nut 17 located in the frame 14 and the cover 15 through the through long hole 15*a*, and the leading end thereof is screwed into the nut 21*a* of the connector module 20. The position of the connector module 20 is fixed along transverse direction by screwing the bolt 18 until the head thereof comes into contact with the outer surface of the cover 15 (position of FIG. 9).

10) Similar to 9), the bolt 88 is screwed into the nut 87 located in the frame 84 and the cover 85 through the through long hole 85*a*, and the leading end thereof is screwed into the nut 21*b* of the connector module 20. The position of the connector module 20 is fixed along vertical direction by screwing the bolt 88 until the head thereof comes into contact with the outer surface of the cover 85 (position of FIG. 9). In this way, when the connector module 20 along the vertical direction is positioned, the position adjustment is completed.

After the above adjustment, the mobile phone T is further pushed in the inserting direction and the slider 32 having the arm 32*a* in contact with the mobile phone T is further moved to the back against the bias force of the coil spring 33. Then, the locking portion 34*c* fitted in the recesses between the apices F2 and F3 of the engaging projections 32*f* come down out of the recesses by being guided by the guide projections 32*g*, thereby releasing the locking of the slider 32 by the locking portions 34*c*. As a result, the slider 32 advances by the bias force of the coil spring 33 and the mobile phone T is pushed toward the entrance side by the arm 32*a* of the slider 32.

During this operation, the holder connector C connected with the mobile phone T is also advanced in the inner housing 22. By the rotation of the pinion 25 provided on the holder connector C while being in mesh with the rack 22*c*, the coupling bar 26, having the rack 26*a* in mesh with the pinion 25, and the contact plate 27 continuous with the coupling bar 26 advance at the speed twice as fast as the advancing speed of the holder connector C. In other words, the ratio of advancing speed of the coupling member 26 to the advancing speed of the holder connector C (pinion shaft 25*a*) is 2:0. As a result, the mobile phone T is disconnected from the holder connector C by being pushed by the contact plate 27 (state of FIG. 12). In this way, the mobile phone T can be easily taken out of the phone holder after being disconnected as above.

In the case that the mobile phone T is desired to be set in the phone holder again, it may be inserted into the phone holder along the side plates 52A, 52B and further along the side plates 62A, 62B. By inserting the mobile phone T, the arm 32*a* in contact with the rear end of the mobile phone T and the entire slider 32 are retracted on the base member 31 against the bias force of the coil spring 33 and the locking portions 34*c* of the locking bar 34 of the base member 31 move over the apex F2 (see FIGS. 15 and 17) of the engaging projections 32*f* and are fitted into the recesses located below the apex F2. As a result, the slider 32 is locked with the base member 31.

On the other hand, in the connector module 20, the contact plate 27 is retracted by being pushed by the rear end of the mobile phone T, and the connector holder C is connected with the phone side connector while being retracted at half the speed of the retracting speed of the contact plate 27.

In inserting the mobile phone T in the phone holder, the side plates 52A, 52B, 62A, 62B, and the restricting projections 65A, 65B in the holder main body are positioned substantially in contact with the outer surface of the mobile phone T. Accordingly, the mobile phone T is securely guided to the connecting position with the holder connector C along these side plates and the restricting projections, thereby facilitating the positioning operation of the mobile phone T. After the positioning, the mobile phone T is held in the phone holder in a stable state.

Note that, in this embodiment, all the members (or elements) movable to hold the sides of the mobile phone T are referred to as "movable means" in the broadest sense. The movable means include basically movable members and sub movable members; the former moves along transverse direction of the mobile phone T; and the latter moves along the direction orthogonal to the transverse direction.

As mentioned above, according to this embodiment, the position of movable members such as the side plates 52*a*, 52B, 62A, 62B, and sub movable members such as the restricting projections 65A, 65B are adjusted in advance in conformity with the size and the outer shape of the mobile phone T to be mounted in the phone holder. Accordingly, the inserting and ejecting operation of the mobile phone T in and out of the phone holder can be facilitated, and the mobile phone T can be held in the phone holder in a stable state.

Further, in this embodiment, the inner surface of the side plates 62A, 62B is formed into the tapered surface 62*c* which is more transversely spaced apart from the mobile phone T as approaching toward the phone entrance side (phone insertion opening), assuming that the side surfaces of the mobile phone T are substantially parallel to the phone insertion direction. Thereby, the mobile phone T can be smoothly guided along the tapered surface 62*c* of the side plates 62A, 62B.

The following is some of the altered forms of this first embodiment.

(1) The inner surfaces of the side plates 62A, 62B, the inner surface of the side plates 52A, 52B, and the inner surface of the restricting projections 65A, 65B may be made of an elastic material. For example, a layer of a rubber material or a sponge member is attached to the inner surface of the side plate main body. In this altered form, the respective inner surfaces of the side plates can be closely fitted to the mobile phone T without damaging the mobile phone T to securely hold the mobile phone T in the phone holder. This altered form is applicable to a second embodiment to be described in the following section.

(2) The arrangement position and the number of the movable means are not limited to the embodiment. For instance, one of the inner wall pairs 50, 60 may be omitted. On the other hand, one or more inner wall pairs may be added. The arrangement in which the movable means is provided at the inner wall pair 60 next to the holder connector C in the phone ejecting direction is advantageous in securely guiding the mobile phone T to the connectable position with the holder connector C.

(3) In the first embodiment, as long as the thickness of the mobile phone T to be inserted in the phone holder does not so greatly differ from the thickness of the phone holder (vertical direction in FIG. 3), the restricting projections 65A, 65B may be omitted. In place of the restricting projections 65A, 65B, the lower surface of the inner ceiling plate 68 may be directly brought into contact with the mobile phone T to function the inner ceiling plate 68 as the sub movable member.

However, the arrangement in the above embodiment in which the sub movable members (restricting projections 65A, 65B) are provided in addition to the movable members (side plates 62A, 62B)provided next to the holder connector C in the phone ejecting direction is advantageous in that the mobile phone T can be securely guided to the holder connector C.

(4) In this embodiment, the common screw shaft 64 (54) simultaneously adjusts the position of the side plates 62A, 62B (52A, 52B). The position adjuster may be individually provided for each side plate. However, the common position adjuster such as the screw shaft 64 (54). as shown in the embodiment, is advantageous in facilitating the position adjustment.

(5) In the embodiment, the side plates (movable members 62A, 62B, 52A, 52B) are provided at opposite lateral sides of the mobile phone T. The movable member may be provided at one of the opposite sides. In this case, the position of the mobile phone T is adjusted by bringing the mobile phone T into pressing contact with the opposite inner side wall of the holder main body, while pushing the mobile phone T along the movable side wall. However, the arrangement that the movable member is provided at both sides of the mobile phone T, as in the embodiment, is advantageous in desirably setting the insertion position of the mobile phone T. In this case, even if the arrangement position of the holder connector C is fixed, the insertion position of the mobile phone T can be adjusted to such a position as to guide the mobile phone T to the holder connector C.

[Second Embodiment]

A second embodiment according to this invention is described with reference to FIG. 18 to 23. It should be noted that elements in this embodiment which are identical to those in the first embodiment are indicated at the same reference numerals as those in the first embodiment. Likewise, elements in the preferred embodiments following the second embodiment which are also identical to those in the first embodiment are indicated at the same reference numerals as those in the first embodiment.

In this embodiment, hinge projections 52a, 52a are respectively formed at lower lead ends of side plates 52A, 52B of an inner wall pair 50 disposed on the side of a phone insertion opening of an outer box 10. The hinge projections 52a, 52a are respectively fitted in hinge holes 40a, 40a formed in upper lead ends of an inner bottom frame 40 to pivotally support the side plates 52A, 52B on the outer box 10 to swing in widthwise direction of a mobile phone T.

Figure 23A:
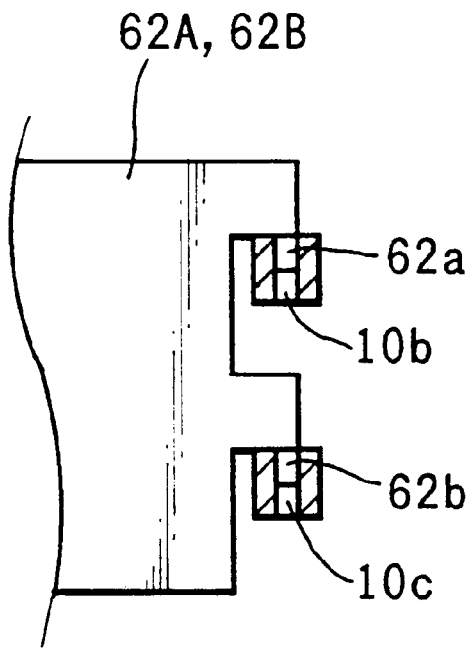
FIG. 23A is a cross sectional view of a hinge member of a side plate of the second phone holder.

Similar to the inner wall pair 50, hinge shafts 62a, 62b are respectively formed at lead ends of side plates 62A, 62B of an inner wall pair 60 disposed on the side of a holder connector C in the outer box 10. As shown in FIG. 23A in detail, the hinge shafts 62a, 62b extend vertically downward. By fitting the respective hinge shafts 62a, 62b in vertical hinge holes 10b, 10c formed in an inner surface of the outer box 10, the respective side plates 62A, 62B are pivotally supported on the outer box 10 to swing in the widthwise direction of the mobile phone T.

Figure 21:
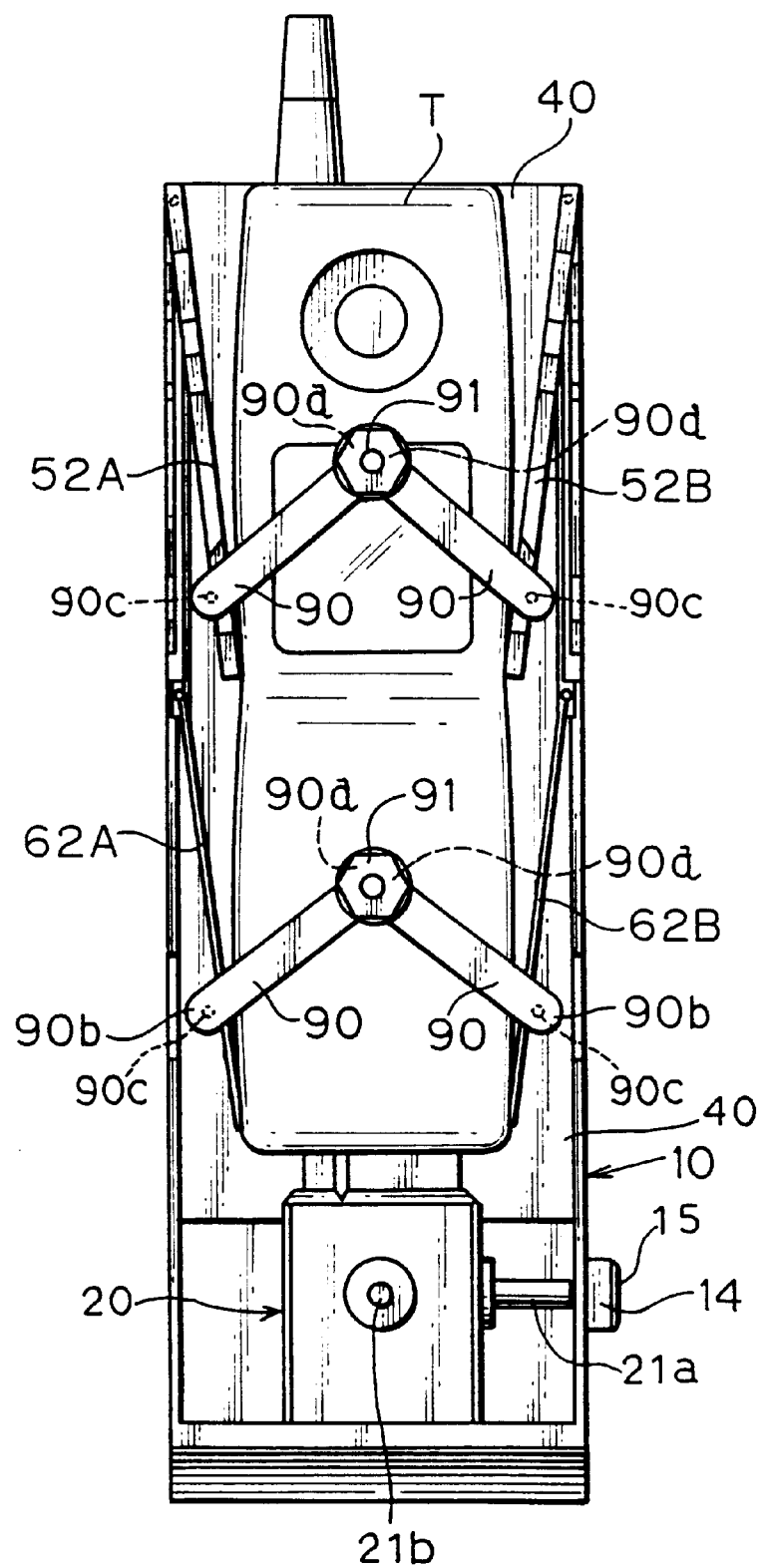
FIG. 21 is a plan view of the second phone holder.
Figure 22:
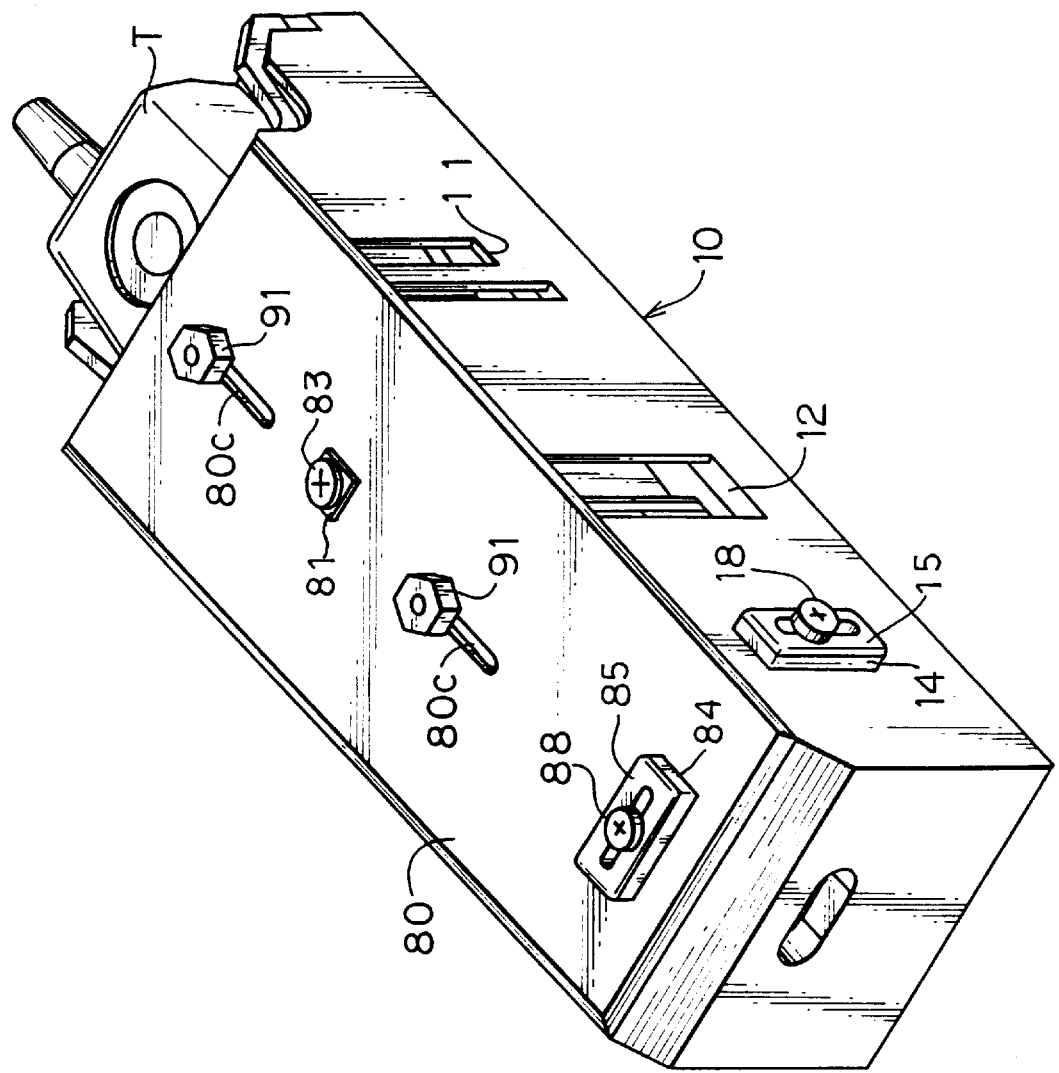
FIG. 22 is a perspective view of the second phone holder in an assembled state with the ceiling wall mounted when viewed from the rear side of the phone holder.

In this embodiment, as shown in FIG. 21, a pair of V-shaped link members 90, 90 are provided as a position adjuster to adjust the angle defined by the side plates 52A, 52B and the side plates 62A, 62B, respectively. The angle of the link members 90, 90 is adjusted by fastening or loosening the respective one ends 90a, 90a thereof by fastening means such as a bolt and a nut.

Figure 23B:
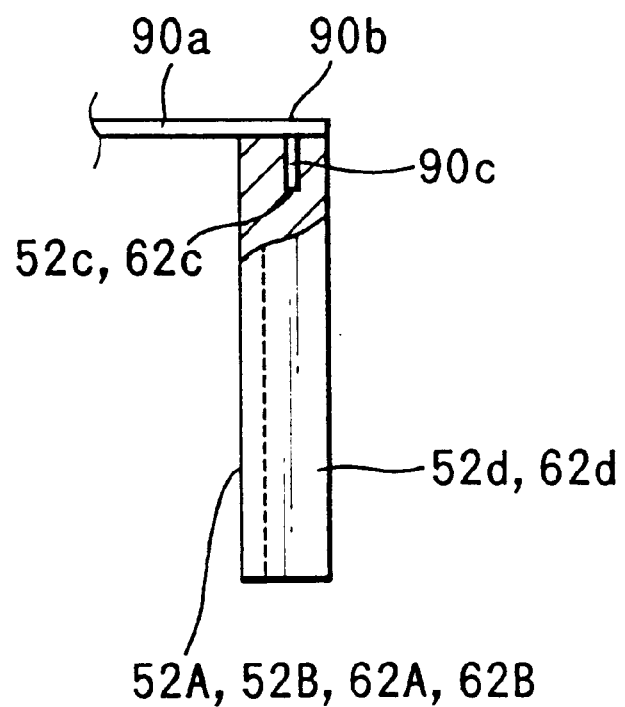
FIG. 23B is a cross sectional view of a hinge member of a link member of the second phone holder.

As shown in FIG. 23B in detail, shafts 90c (in the drawing, only one shaft 90c is shown) vertically extending downward are formed at the respective opposite ends 90b, 90b of the link members 90, 90. A bulged portion (tubular portion) 52d (62d) having a hole 52c (62c) therein to receive the shaft 90c (90c) from above is formed at the respective outer surfaces on the rear sides of the side plates 52A ,52B (the side plates 62A, 62B). By fittingly inserting the shafts 90c in the holes 52c (62c), the link members 90, 90 (90, 90) are connected to the side plates 52A, 52B (62A, 62B) to pivotally swing the same about at the connected rear ends thereof. By fastening or loosening the fastening means 91 (bolt and nut) to adjust the angle of the link members 90, 90, the side plates 52A, 52B, and the side plates 62A, 62B are simultaneously moved toward and away from each other.

As the side plates 52A, 52B and the side plates 62A, 62B are moved, these plates are inclined with respect to the inner surface of the outer box 10 to form a tapered surface (tapered portion) thereon. In accordance with the angle adjustment of the link members 90, 90, the side plates 52A, 52B and the side plates 62A, 62B are simultaneously moved toward and away from each other to simultaneously vary the inclination of the tapered surface.

Notches 11, 12 are formed in the outer box at the position corresponding to the bulged portions 52d, 62d to avoid a contact of the outer wall of the bulged portions 52d, 62d formed with the holes 52c, 62c with the inner surface of the outer box 10.

The bolt portions of the fastening means 91 pass through long holes 80c, 80c of a ceiling wall 80 respectively. By fastening or loosening the nut portions of the fastening means 91 from the outer side of the ceiling wall 80, the V-shaped angular position of the link member pairs 90, 90 is adjusted.

Next, the assembling of the phone holder, the adjustment of the respective parts and the action of the phone holder during the use after the adjustment are described.

First, the inner bottom frame 40 is secured to the bottom wall of the outer box 10. Then, while fitting the hinge projections 52a, 52a of the side plates 52A, 52B in the hinge holes 40a, 40a of the inner bottom frame 40, the hinge shafts 10b, 10b of the outer box 10 are fitted in the hinge holes 62a, 62a of the side plates 62A, 62B.

While fitting the shafts 90c, 90c of the opposite ends 90b, 90b of the link members 90, 90 in the respective holes 52c (62c) of the side plates 52A, 52B (62A, 62B), the lower bolt portions of the fastening means 91 is fitted in holes in the one ends 90a, 90a of the link members 90, 90.

A bolt 83 is screwed into a nut 82 of the ceiling wall 80, and the lower end thereof is screwed into a nut 68a of an inner ceiling plate 68.

A bolt 18 is screwed into a nut 17 in a frame 14 and a cover 15 through a through long hole 15a, and the lead end of the bolt 18 is screwed into a nut 21a of a connector module 20 until the head thereof comes into contact with the outer surface of the cover 15. Thereby, the connector module 20 is secured in the holder main body along transverse direction.

Similarly, a bolt 88 is screwed into a nut 87 in a frame 84 and a cover 85 through a through long hole 85a, and a lead end of the bolt 88 is screwed into a nut 21b of the connector module 20 until the head thereof comes into contact with the upper surface of the cover 85. Thereby, the connector module 20 is secured in the holder main body along vertical direction.

In this state, the ceiling wall 80 is mounted on the outer box 10 to close the upper side opening thereof, and the upper bolt portions of the fastening means 91 of the link member pairs 90, 90 are respectively fitted in the long holes 80c, 80c of the ceiling wall 80, and the nut portions of the fastening means 91 are fastened by a small amount from the outer side of the ceiling wall 80.

In this state, when the mobile phone T is inserted in the outer box 10 for position adjustment, the fastening means 91 of the link member pair 90 on the side of the side plates 52A, 52B is in a halfway fastened state, and accordingly is allowed to move along the long hole 80c of the ceiling wall 80 to finally adjust the V-shaped angular position of this link member pair 90. Accompanied with the angular adjustment of this link member pair 90, the side plates 52A, 52B pivotally swing about the hinge projections 52a in the hinge holes 40a to form the tapered surface. At the stage where the inner surfaces of the side plates 52A, 52B start to come into contact with the side surfaces of the mobile phone T (the stage where the side plates 52A, 52B nip the mobile phone T), the fastening operation of the fastening means 91 is stopped, and then, the nut portion of the fastening means 91 is fastened to hinder a further movement of the fastening means 91.

Similarly, as the mobile phone T is further being inserted, the fastening means 91 of the link member pair 90 of the side plates 62A, 62B is moved along the long hole 80c of the ceiling wall 80 to adjust the angular position of the link member pair 90. Accompanied with the positional adjustment of this link member pair 90, the side plates 62A, 62B pivotally swing about the hinge shafts 62a, 62b in the hinge holes 10b, 10c to form the tapered surface. At the stage where the inner surfaces of the side plates 62A, 62B start to come into contact with the side surfaces of the mobile phone T (the stage where the side plates 62A, 62B nip the mobile phone T), the movement of the fastening means 91 is stopped, and then, the nut portion of the fastening means 91 is fastened to hinder a further movement of the fastening means 91.

Figure 3:
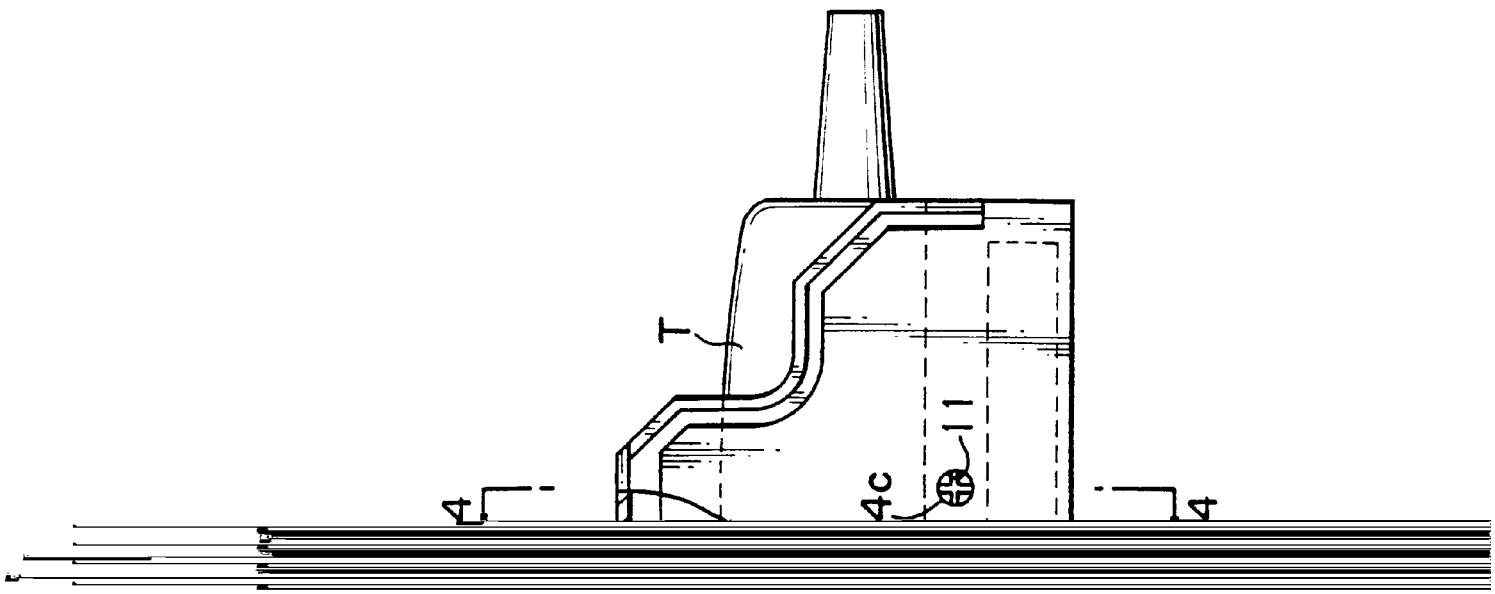
FIG. 3 is a partially cross sectional side view of the first phone holder.
Figure 4:
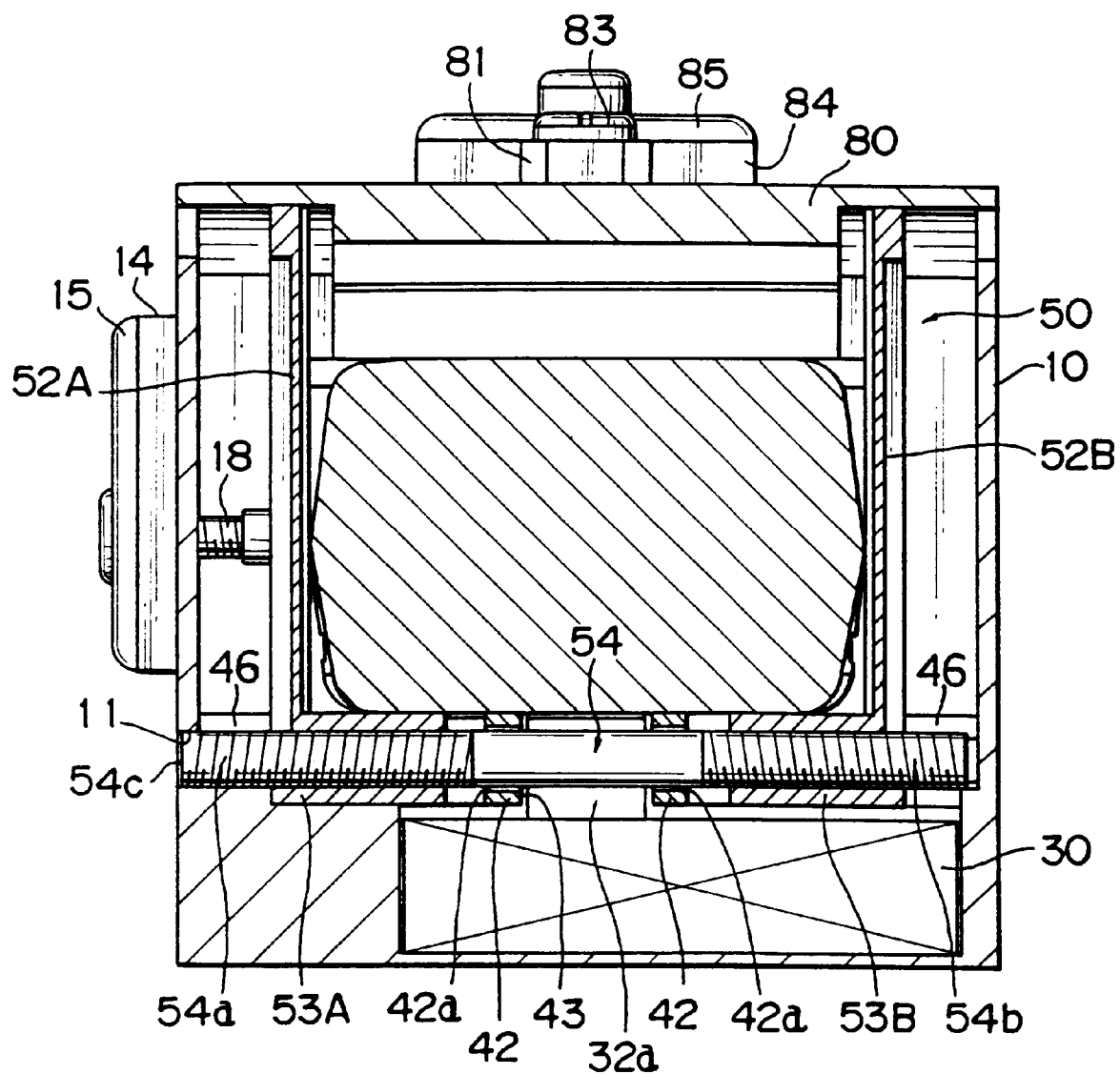
FIG. 4 is a cross sectional view of the first phone holder taken along the line 4—4 in FIG. 3.
Figure 5:
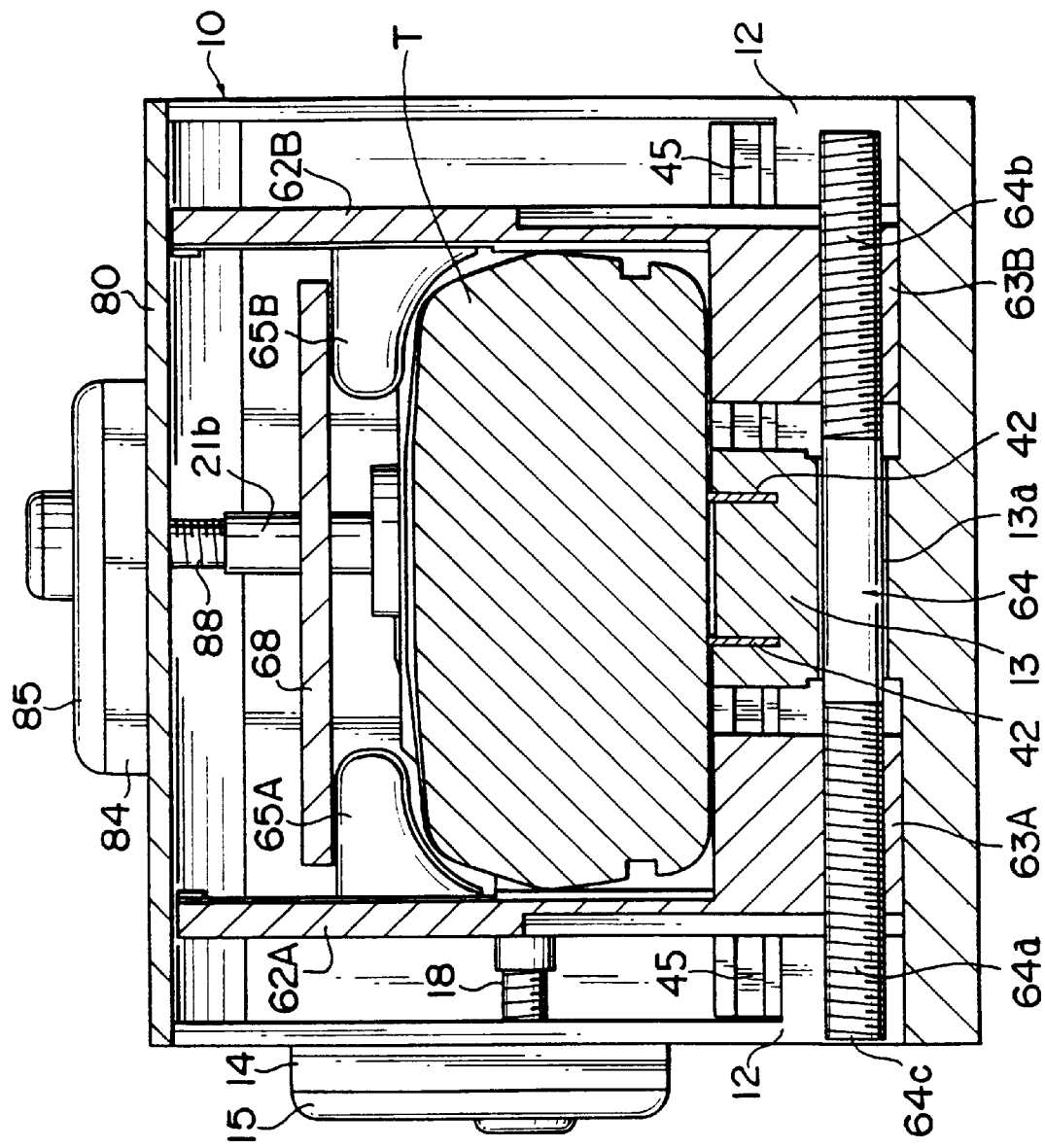
FIG. 5 is a cross sectional view of the first phone holder taken along the line 5—5 in FIG. 3.

Further, by fastening or loosening the bolt 83, the bolt 83 is screwed into the inner ceiling plate 68 to such a state as to bring the lower surface of the inner ceiling plate 68 into contact with the outer surface of the mobile phone T (the state of FIG. 3).

Thereafter, when the mobile phone T is further pushed in the phone inserting direction, a phone connector TC of the mobile phone T is connected with the holder connector (of the outer box 10. At this time, in the case where the phone connector TC of the mobile phone T cannot be connected with the holder connector C because the position of the phone connector TC and the holder connector C does not coincide, the bolt 18 is turned from outside of the outer box 10 to adjust the position of an outer housing 21 of the holder connector C along transverse direction, while turning the bolt 88 to adjust the position of an outer housing 21 of the holder connector C along vertical direction. Then, the connector C is adjusted to such a position as to connect the phone connector TC of the mobile phone T with the holder connector C of the phone holder.

As mentioned above, according to this embodiment, the position of the side plates 52A, 52B, 62A, 62B, the inner ceiling plate 68, the holder connector C is adjusted in advance in conformity with the size and the outer shape of the mobile phone T to be mounted in the phone holder. Accordingly, the inserting and ejecting operation of the mobile phone T in and out of the phone holder after the adjustment can be facilitated, and the mobile phone T can be held in the phone holder in a stable state.

Further, in this embodiment, the inner surface of the side plates 52A, 52B, 62A, 62B is formed into the tapered portion which is more transversely spaced apart from the mobile phone T as approaching toward the phone entrance side, assuming that the side surfaces of the mobile phone T are substantially parallel to the phone insertion direction.

Thereby, the mobile phone T can be smoothly guided along the tapered portions of the side plates 52A 52B, 62A, 62B.

Further, the pairs of V-shaped link members are provided on the upper side opening of the outer box 10 to adjust the angular position of the side plates 52A, 52B, 62A, 62B merely with a one-directional operation (fastening or loosening of the fastening means 91 from above the ceiling wall 80) to improve the operability of the positional adjustment.

[Third Embodiment]

Next, a third embodiment of this invention is described with reference to FIGS. 24 to 38.

Figure 35:
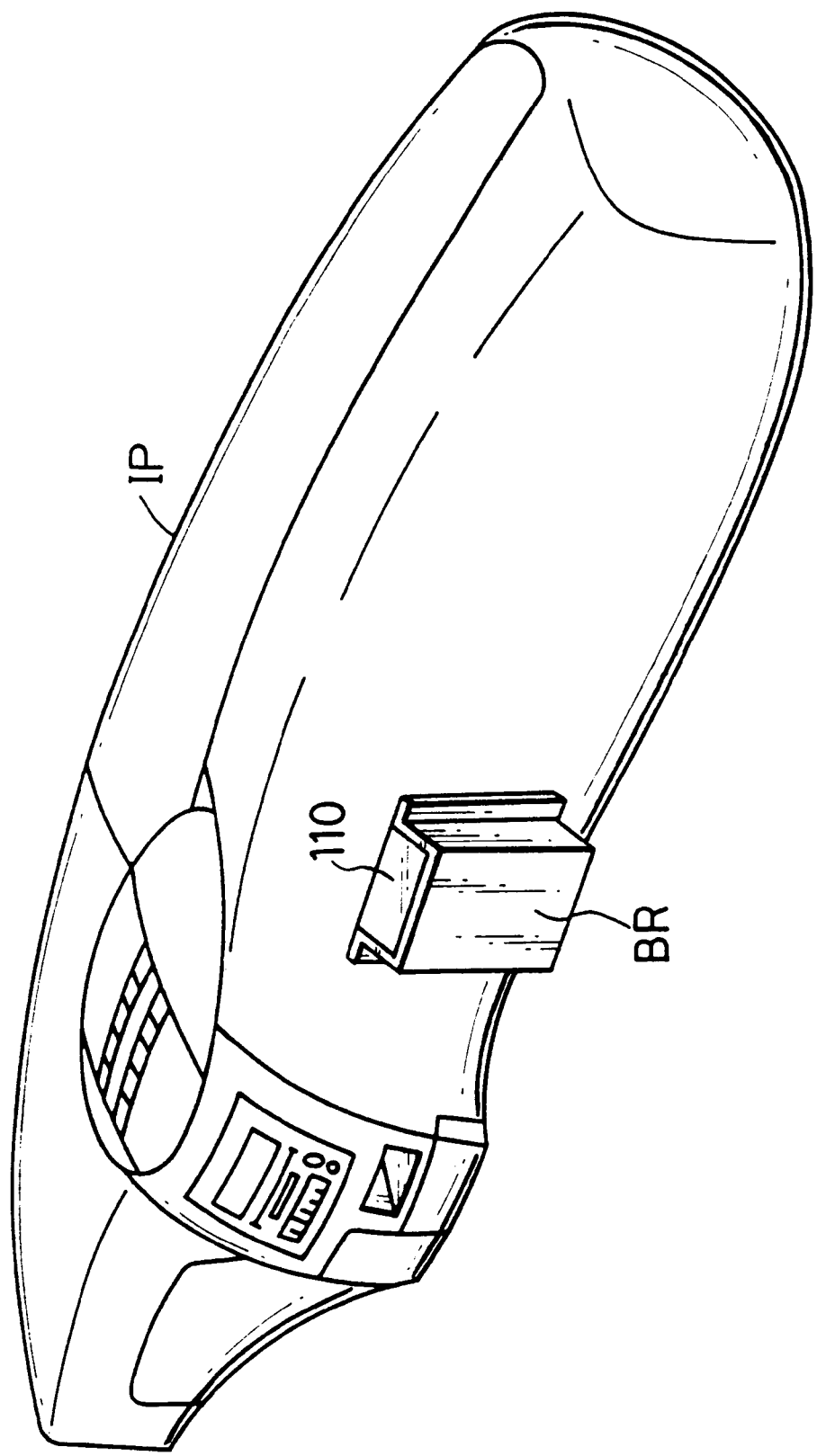
FIG. 35 is a perspective view showing how the third phone holder is installed in a vehicle.

Referring to FIG. 35, IP is an instrumental panel disposed in a front side of a passenger compartment of a vehicle. A holder main body 110 of a phone holder in the third embodiment is mounted at a suitable position on a front surface of the instrumental panel IP via a bracket BR.

Figure 24:
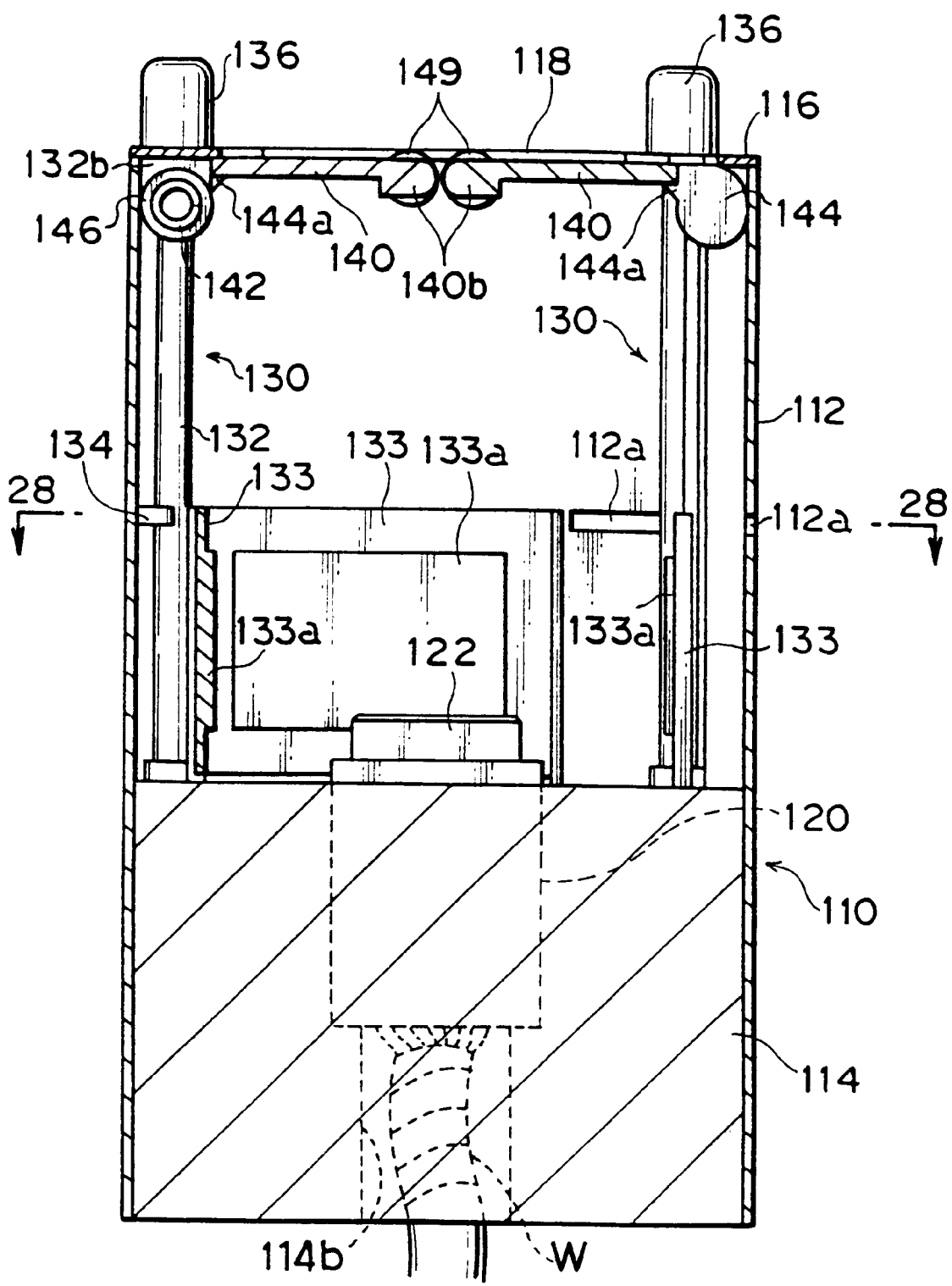
FIG. 24 is a cross sectional front view of a phone holder as a third embodiment according to this invention.
Figure 25:
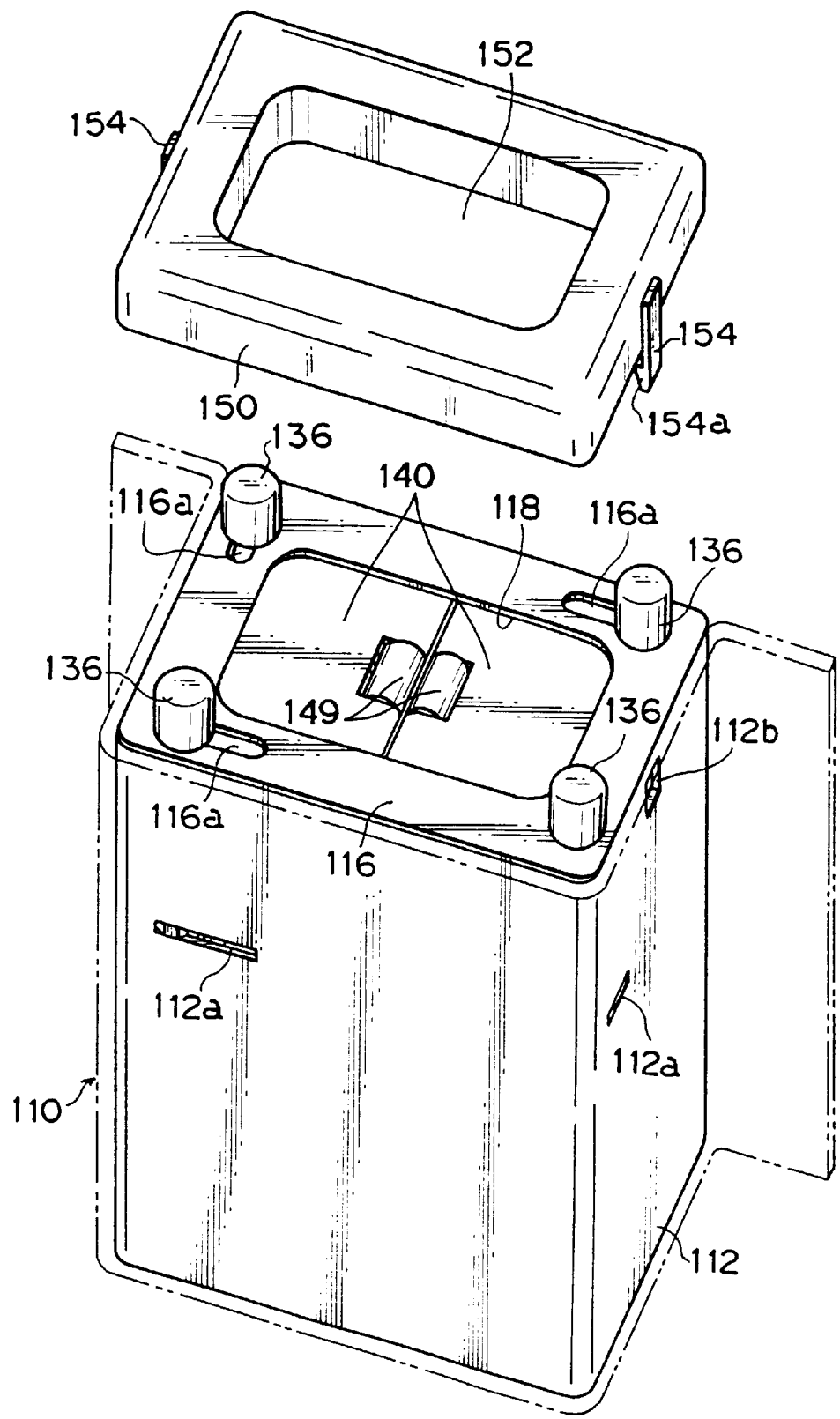
FIG. 25 is a perspective view of the third phone holder in a state that a cover is removed from a main body of the phone holder.

As shown in FIG. 24, the holder main body 110 has a side wall 112, a bottom block 114, and a ceiling plate 116. As shown in FIG. 25, the holder main body 110 is mounted on the instrumental panel IP in such a state that three sides of the side wall 112 are covered by the bracket BR. The holder main body 110 is mounted in a state that the side surfaces of the holder main body 110 are covered with the bracket BR and a top and a bottom surface (opposite end surfaces in longitudinal direction) thereof are formed with an opening to insert and eject a mobile phone T through the top opening and to draw a cord for a holder connector into the holder main body 110 through the bottom opening.

The side wall 112 has a substantially rectangular column having a hollow portion with an opening at opposite ends along longitudinal direction (vertical direction in FIG. 25). The bottom block 114 is fitted in the lower end opening to close it and secured therein. The ceiling plate 116 is securely mounted on the upper end opening of the side wall 112, and is formed with a through hole 118 in such a shape as to pass the mobile phone T along longitudinal direction. In other words, the holder main body 110 has a hollow portion opened upward to insertably fit the mobile phone T along longitudinal direction through the through hole (phone insertion opening) 118.

The bottom block 114 is formed with a recess to hold a holder connector 120. The holder connector 120 includes a connecting portion 122 and is fixed on the bottom block 114 in a state that the connecting portion 122 faces upward. A cord W is drawn from the holder connector 120 downward through a through hole 114b of the bottom block 114. A mobile phone T is connected to a circuit in a vehicle body via the holder connector 120 of the phone holder, a phone connector (not shown) of the mobile phone T, and the cord W in a state that the connecting portion 122 is connected with the phone connector provided in a rear end (lower end in FIG. 33) of the mobile phone T.

Specifically, the holder connector 120 is secured in the holder main body 110 at the rear position along the phone inserting direction and is connectable with the mobile phone T as the mobile phone T being inserted.

A plurality (four in this embodiment) phone guide members 130 are provided in the holder main body 110. These phone guide members 130 guide the mobile phone T to the connectable position with the holder connector 120 as the mobile phone T being inserted in the holder main body 110, and are arranged at such positions as to surround the mobile phone T from four directions, fore and aft and sideways directions.

Figure 27:
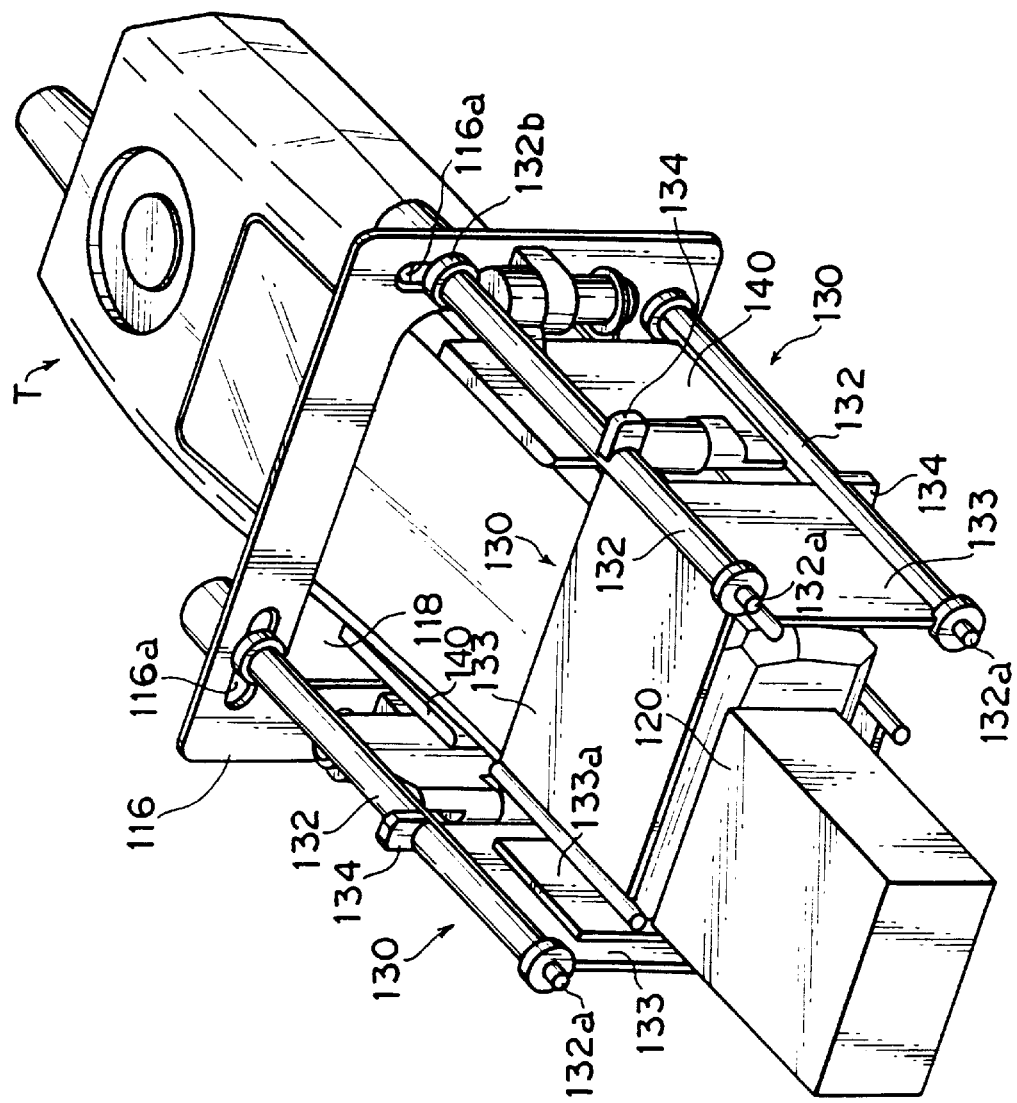
FIG. 27 is a perspective view of an inner structure of the third phone holder.
Figure 28:
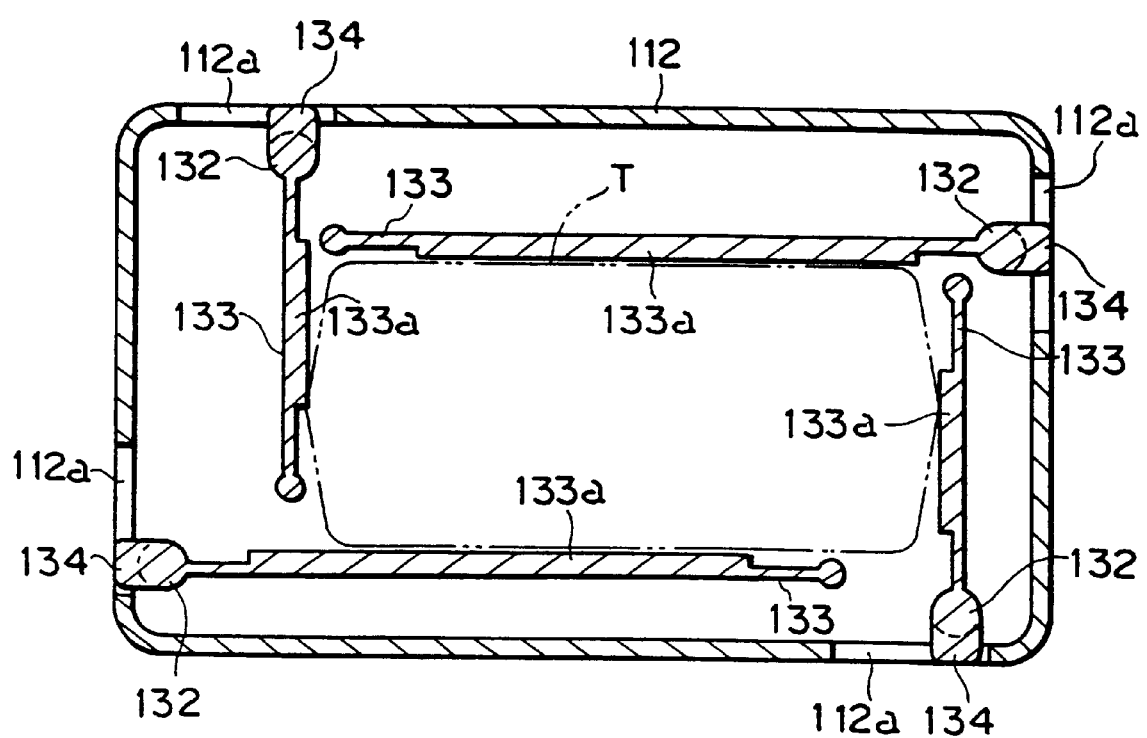
FIG. 28 is a cross sectional view of the third phone holder taken along the line 28—28 in FIG. 24.
Figure 33:
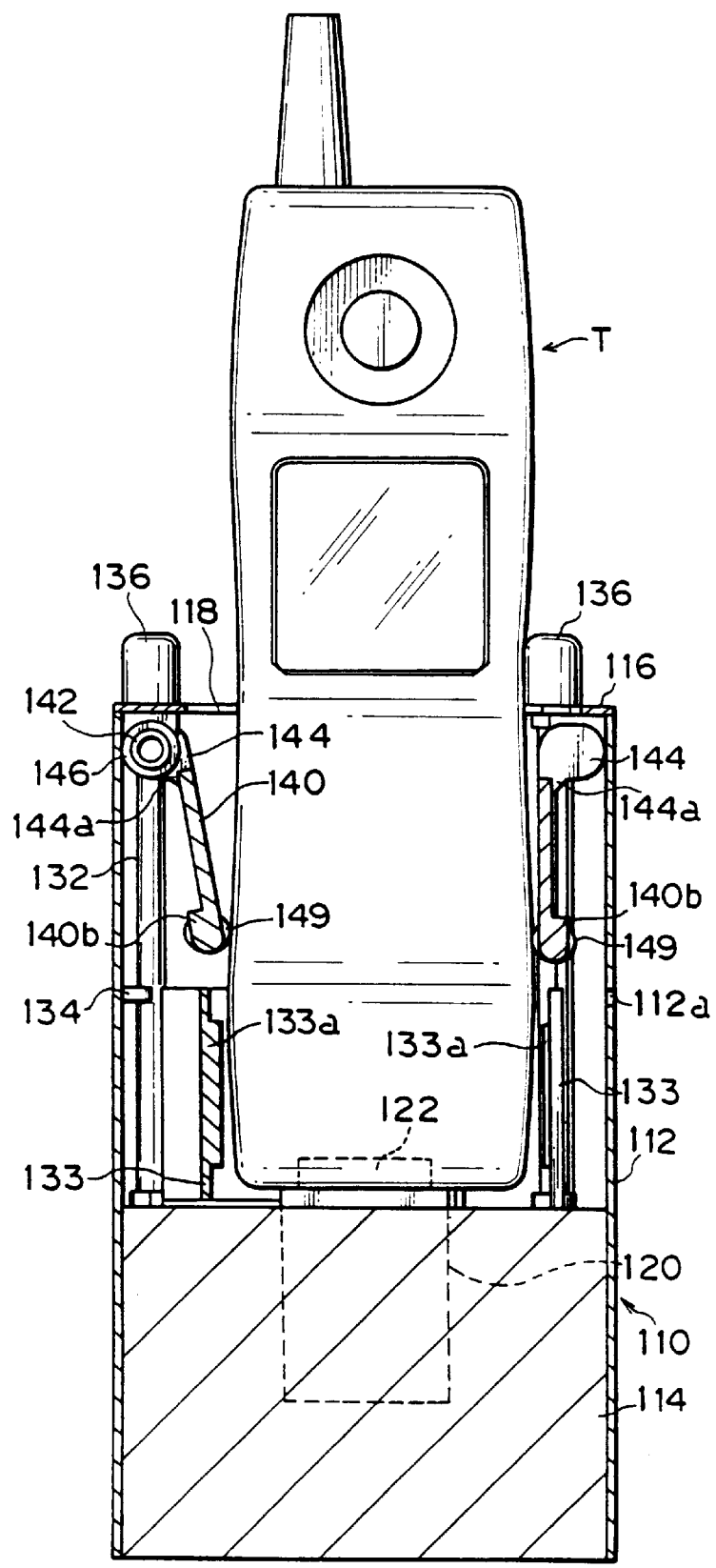
FIG. 33 is a cross sectional front view showing a state that a mobile phone is inserted in the third phone holder.
Figure 34:
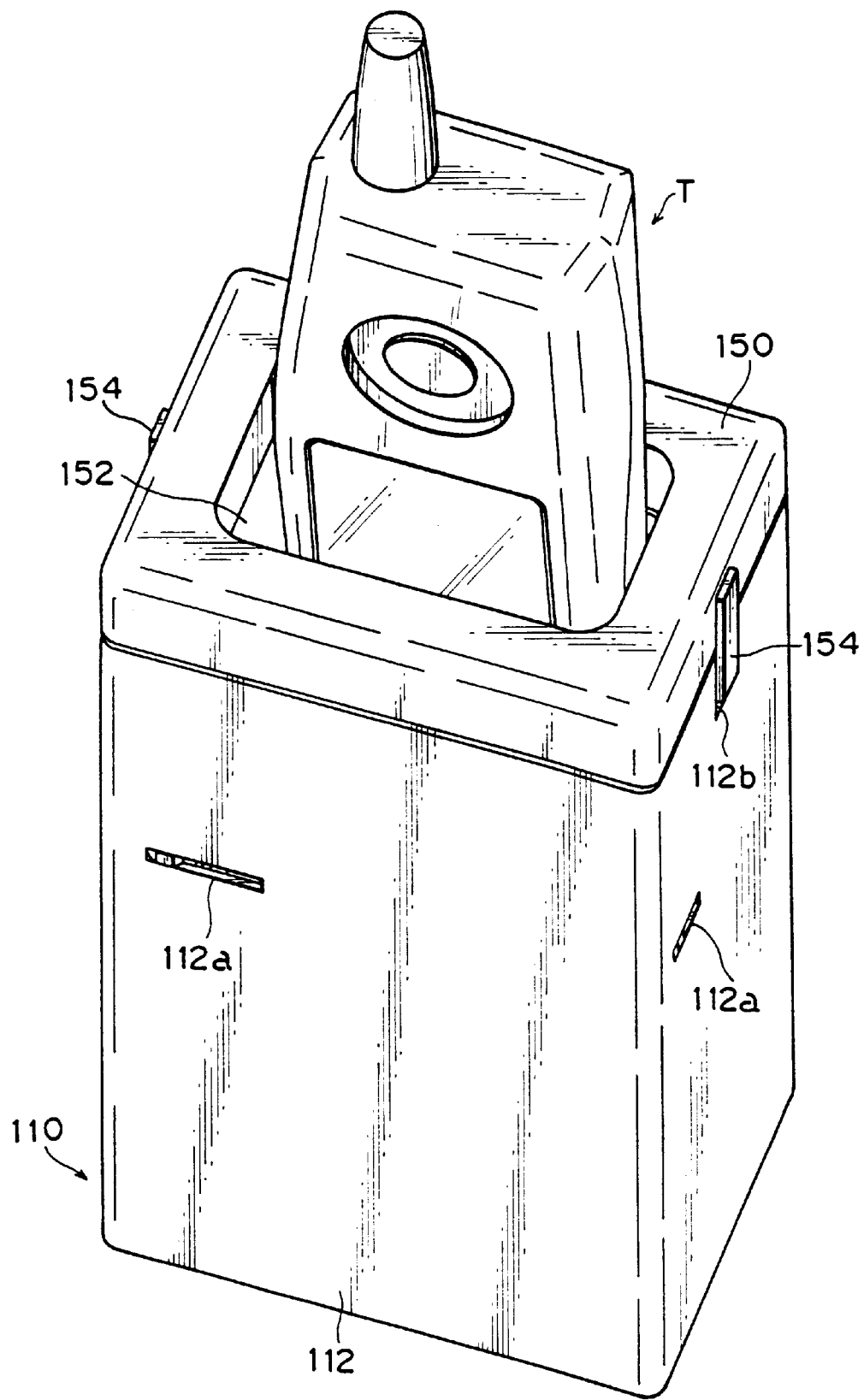
FIG. 34 is a perspective view showing a state that the mobile phone is inserted in the third phone holder.

Each of the phone guide members 130 has a main shaft 132 along vertical direction (see FIG. 33). A guide wall 133 extends at a lower half of each main shaft 132 along one direction, and a guiding projection 134 is formed substantially in the middle of the length of each main shaft 132 in such a manner as to protrude in the direction opposite to the extending direction of the guide wall 133. The guide walls 133 as a whole have such a shape as to enclose the mobile phone T from four sides as shown in FIGS. 27 and 28, and each of the guide walls 133 is formed with a stepped portion 133a of a relatively large area which is capable of coming into contact with the outer surface of the mobile phone T.

Figure 26:
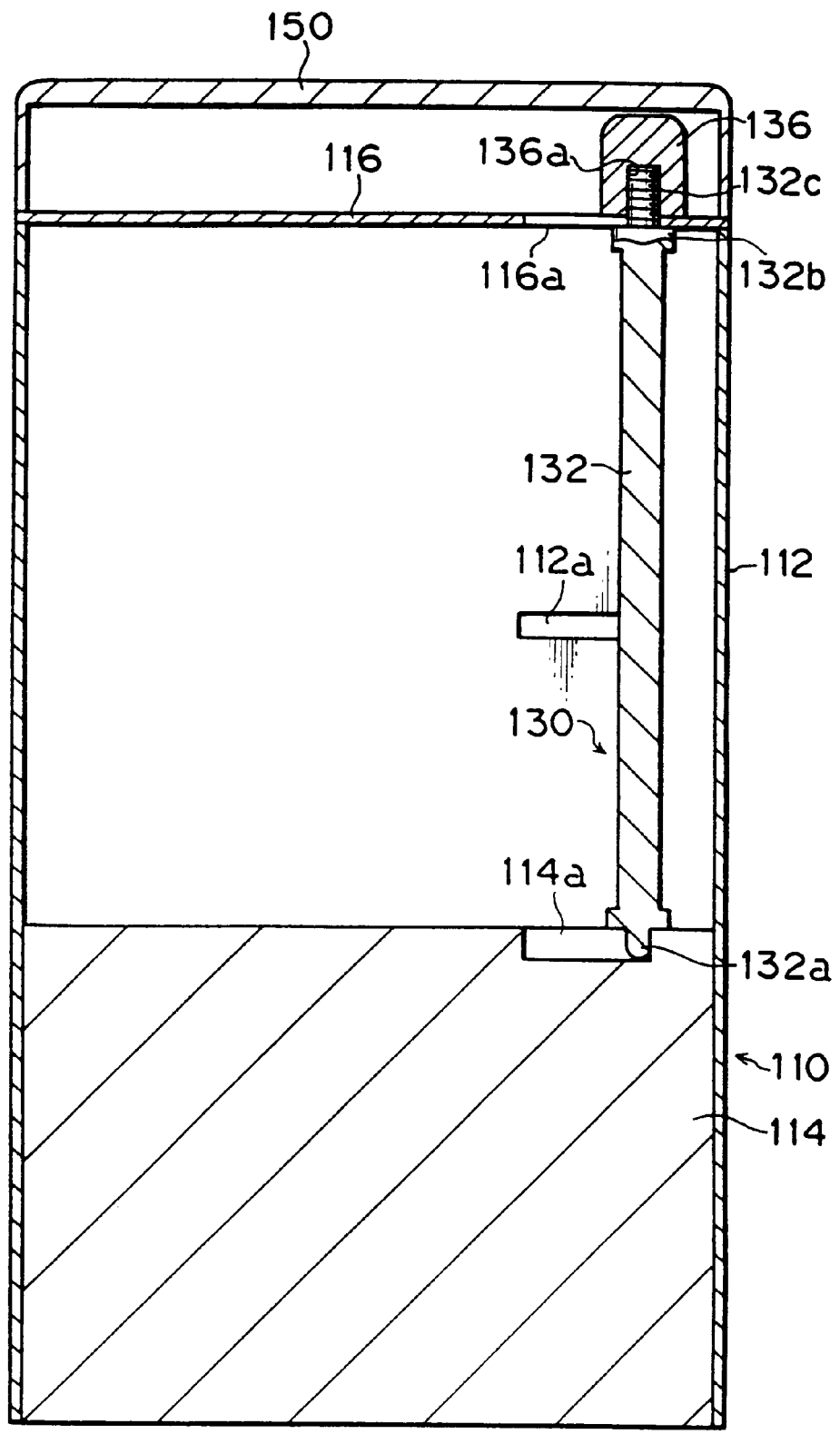
FIG. 26 is a cross sectional front view of a mounting structure of a phone guide member in the third phone holder.

As shown in FIG. 26, a guiding projection 132a projecting downward is formed at a lower end of the main shaft 132, and an externally threaded portion 132c projecting upward is formed at an upper end 132b of the main shaft 132. At four corners of the upper surface of the bottom block 114, there are formed four guide grooves 114a respectively extending in such a direction as to move the phone guide member 130 toward and away from the mobile phone T (in a horizontal direction normal to the corresponding guide wall 133, i.e., forward and backward directions or sideways directions).

The ceiling plate 116 is formed with four through long holes (or simply referred to as "slits") 116a having substantially the same shape as the guide grooves 114a formed along a periphery of the through hole (opening) 118 at a position above the guide grooves 114a.

The side wall 112 is formed with through long holes 112a extending in the same direction as the guide grooves 114a. By fitting the guiding projections 132a of the main shafts 132 in the guide grooves 114a, inserting the externally threaded portions 132c into the through long holes (slits) 116a from below, and inserting the guiding projections 134 in the through long holes 112a from inward, the phone guide members 130 are mounted in the holder main body 110 to be slidable along longitudinal direction of the guide grooves 114a and the slits 112a, 116a.

Each of the phone guide members 130 has a cap (or referred to as an "operable member") 136 which is mounted at a lead end of the externally threaded portion 132c (a portion protruding outward of the ceiling plate 116). Each cap 136 is formed with a threaded hole 136a opened downward to be engaged with the corresponding externally threaded portion 132c. The cap 136 is screwed down until the lower end thereof comes into pressing contact with the upper surface of the ceiling plate 116. Thereby, the phone guide members 130 are secured in the holder main body 110 at a desired position in a state that the ceiling plate 116 is sandwiched between the lower surface of the cap 136 and the upper surface of the upper end 132b of the main shaft 132 (state of FIG. 26).

Figure 29:
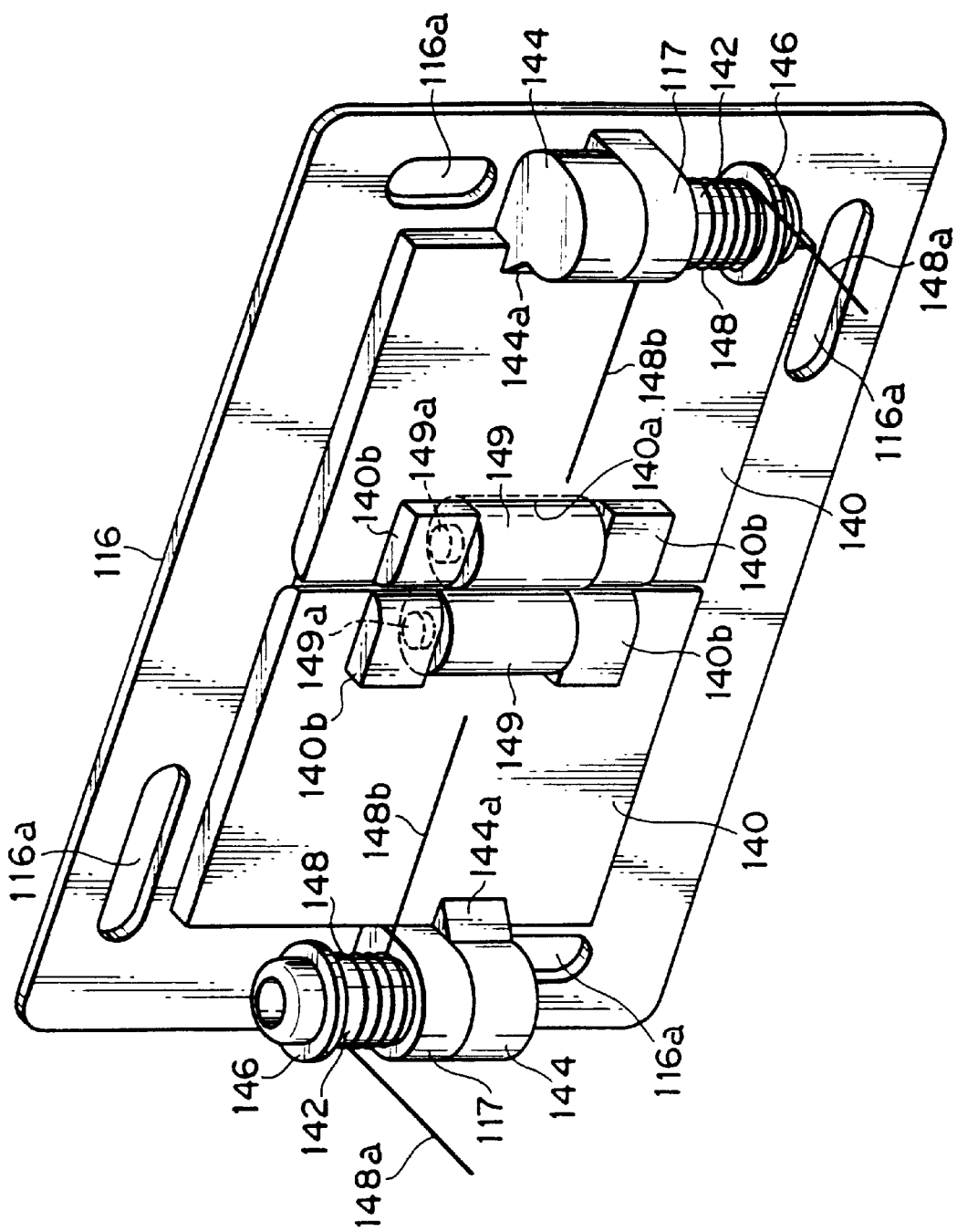
FIG. 29 is a perspective view of a mounting structure of lids in the third phone holder.
Figure 30:
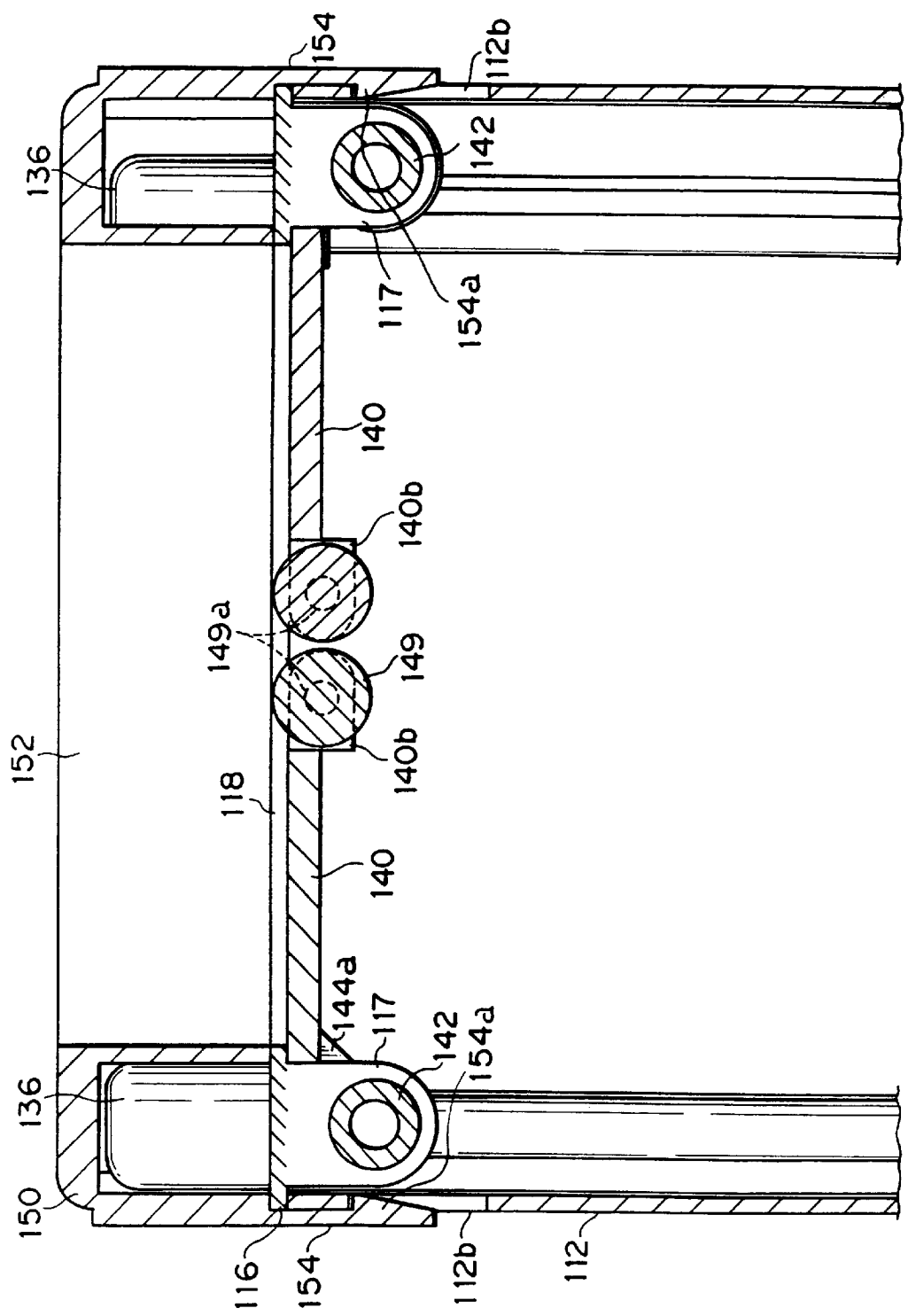
FIG. 30 is a cross sectional front view of the mounting structure of the lids.
Figure 31:
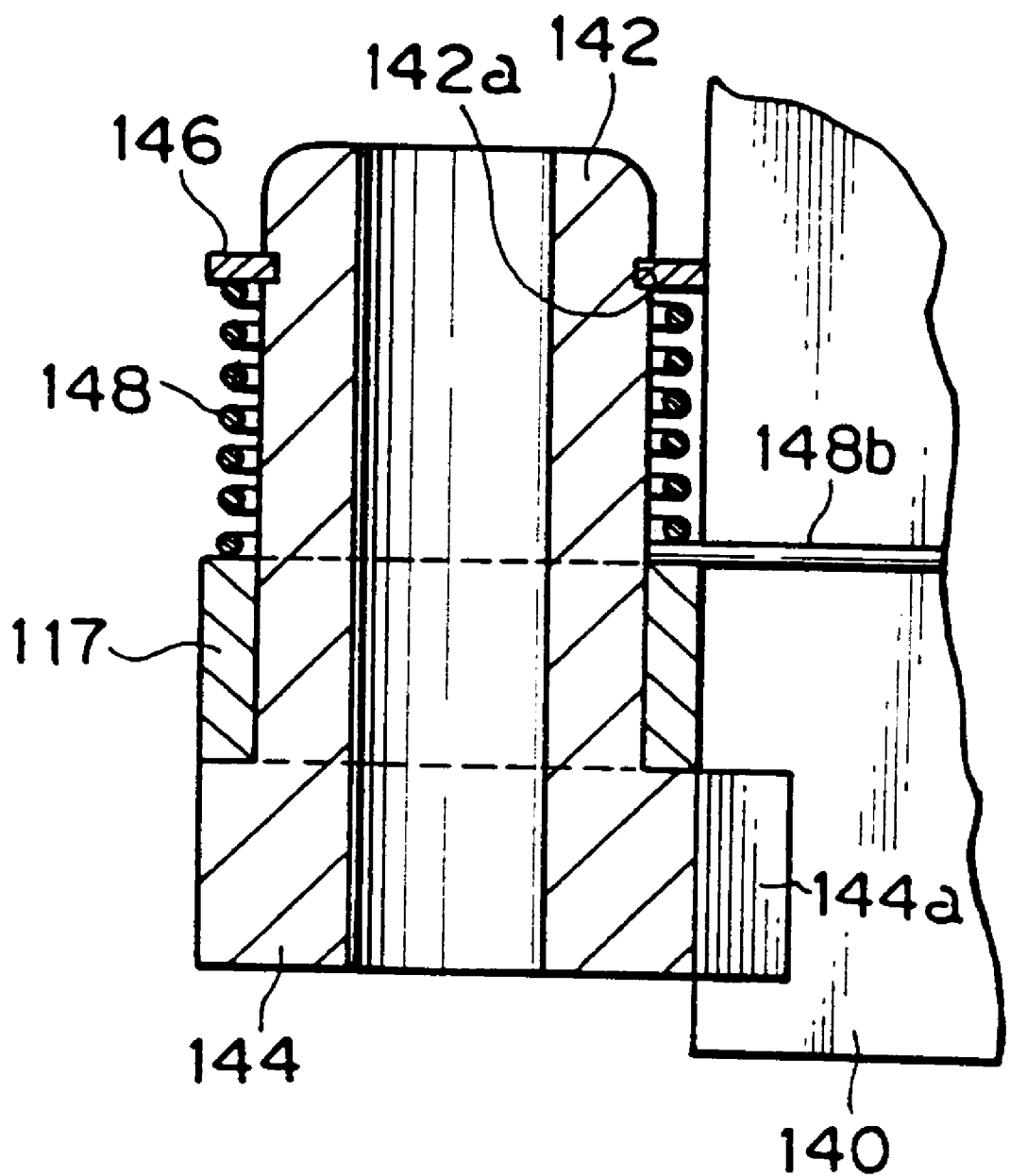
FIG. 31 is a cross sectional bottom view of essential part of the mounting structure of the lids.
Figure 32:
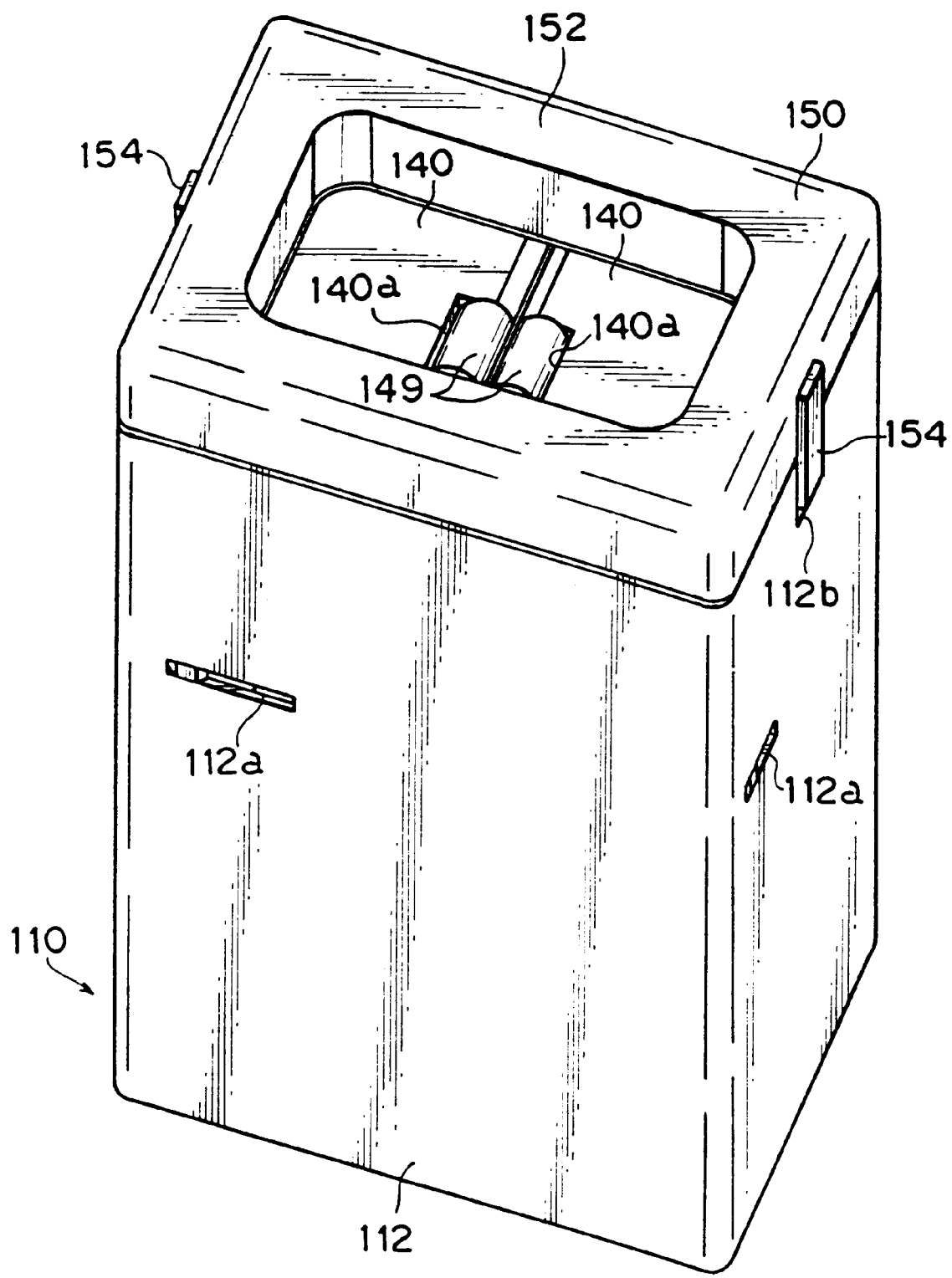
FIG. 32 is a perspective view of the third phone holder in a state that a cover is mounted on a holder main body.

A pair of left and right lids 140 to open and close the opening 118 are mounted on the ceiling plate 116. As shown in FIGS. 29 to 31, D-shaped ring support members 117 are attached to left and right sides of the ceiling plate 116 at the backside surface thereof (front side surface in FIG. 29). A pivot shaft 142 is inserted in the D-shaped ring support member 117 to rotatably support the pivot shafts 142 on the ceiling plate 116.

A large diametrical portion 144 having an outer diameter larger than an inner diameter of the ring support member 117 is provided at one end of each of the pivot shafts 142, and a stopper ring 146 is secured to the opposite end thereof. At an outer circumference of the large diametrical portion 144 is formed a projection 144a projecting radially outward. Left and right ends of the lids 140 are secured by the projections 144a.

With this arrangement, each of the lids 140 swings about the pivot shaft 142 to changeably set to a closed position shown in FIGS. 29 and 30 (position to close the opening 118 where the outer peripheries of the lids 140 come into fitting contact with the periphery of the opening 118) and to an opened position shown in FIG. 33 where the lids 140 are opened inward toward the holder main body 110, i.e., downward in FIG. 33.

A torsional spring 148 is provided around the pivot shaft 142 between the ring support member 117 and the stopper ring 146. This torsional spring 148 is set in a compressed state along the axial direction of the pivot shaft 142 in a state that it is sandwiched between the ring support member 117 and the stopper ring 146, and is held at such a position as to render a side surface of the support member 117 in pressing contact with the large diametrical portion 144 due to a bias force of the spring 148 exerted in the axial direction. An one end 148a of the torsional spring 148 extends inward toward the holder main body 110 and comes into contact with the inner side of the side wall 112, and the opposite end 148b thereof extends toward a center position along transverse direction of the holder main body 110 and comes into contact with a backside surface of the lid 140. By a bias force exerted in the spiral direction of the torsional spring 148, the lids 140 are biased in a direction toward the closed position and are set in the closed position when the mobile phone T is not inserted.

A roller 149, a rotatable member, is provided at a free end of each of the lids 140. Specifically, a substantially U-shaped notch 140a is formed in the free end of each of the lids 140, and a shaft support member 140b of a large thickness is formed at opposite ends in such a state the roller 149 is interposed therebetween. A shaft 149a is inserted through the roller 149 in the axial direction in such a state that the opposite ends thereof project by a certain length. By fitting the projections of the shaft 149a in recesses (not shown) formed in the shaft support members 140b, the roller 149 is rotatable about the axis of the shaft 149a. An outer circumference of the roller 149 is slightly bulged out of the free end of the lid 140 along transverse direction to slidably guide the mobile phone T.

The lids 140 mentioned above are provided to close the opening 118 when the mobile phone T is not inserted and to prevent intrusion of foreign matters such as dusts into the holder main body 110 through the opening 118. The lids 140 may be omitted in this embodiment.

A cover 150 is detachably mounted on the outer side (upper side) of the ceiling plate 116 to cover the caps 136. The cover 150 has a through opening 152 formed into such a shape as to be substantially identical to the shape of the opening 118 of the ceiling plate 116, and is mounted along the periphery of the opening 118.

A flexible piece 154 extends from left and right ends of the cover 150 toward the holder main body 110 (along the phone inserting direction, downward in FIG. 30), and an inward projecting locking portion 154a is formed at an end of the flexible piece 154. On the other hand, the side wall 112 is formed with a through hole 112b to receive the locking portion 154a. By fittingly inserting the locking portions 154a in the through holes 112b, the cover 150 is mounted on the ceiling plate 116 in a locked state.

Next, the position adjustment of the phone holder before use and an operation of the phone holder during the use after the adjustment are described.

1) At a stage before the phone holder is used, the guide walls 133 of the phone guide members 130 are set to an outermost position, i.e., a position farthest away from the mobile phone T to be inserted. The cover 150 is removed from the holder main body 110.

2) Then, the mobile phone T is inserted for position adjustment in such a manner that the tail end of the mobile phone T is pressed against the lids 140 at the closed position to open the lids 140 by the pressing force greater than the bias force of the torsional spring 148. In this way, after the mobile phone T is inserted in the holder main body 110 through the opening 118, the position of the phone guide members 130 along the widthwise direction and the thickness direction of the mobile phone T (i.e., direction orthogonal to the phone inserting direction) is adjusted in such a manner as to connect the phone connector with the holder connector 120.

3) While nipping the cap 136, the user moves the phone guide members 130 inward to set the phone guide members 130 at a guide position where the stepped portions 133*a* of the phone guide members 130 come into contact with or close contact with the outer surface of the mobile phone T. At this position, the cap 136 is turned to fasten the same to bring the lower surface of the cap 136 into pressing contact with the upper surface of the ceiling plate 116. Thus, when the ceiling plate 116 is sandwiched between the caps 136 and the upper ends 132*b* of the main shafts 132, the phone guide members 130 are secured to the guide position suitable to the shape of the mobile phone T (position adjustment of the phone guide members is completed).

4) After the position of the phone guide members 130 is adjusted, when the mobile phone T is inserted for actual use, the mobile phone T is smoothly guided in the holder main body 110 as being guided along the guide walls 133, and merely inserting the mobile phone T along the guide walls 133 automatically connects the phone connector with the holder connector 120. Moreover, after the insertion, the mobile phone T is stably held in the holder main body 110 because the mobile phone T is closely encased by the guide walls 133.

In this embodiment, all of the caps (operable members) 136 are arranged along the periphery of the opening 118 (the phone insertion opening), and are set in a state freely operable in the passenger compartment. Accordingly, the user can operate the caps 136 to adjust the position of the phone guide members 130 in a state that the holder main body 110 is installed in the passenger compartment, resulting in an improvement of the operability of the position adjustment.

Further, after the position adjustment, the cover 150 is mounted to close the operable members 136, thereby keeping the external appearance of the phone holder in a sophisticated shape. Further, the through hole (opening) 152 of the cover 150 functions as a guide member for guiding the insertion of the mobile phone T.

Since all of the through long holes 114*a* are formed along the periphery of the opening 118, the operable members 136 are arranged in a concentrated small area on the ceiling plate 116 efficiently despite the plural number of the through holes 114*a* (four in this embodiment).

In this embodiment, preferably, the stepped portion 133*a* may be formed of an elastic material such as a rubber material. Thereby, the mobile phone T can be pressed against the elastic stepped portions 133*a* to a limit of the elastic deformation of the stepped portions 133*a*, thereby enhancing the holding ability of the phone holder.

Preferably, the surface of the stepped portion 133*a* may be coated with a fluorocarbon resin or its equivalent to decrease a frictional force between the surface of the stepped portion 133*a* and the outer surface of the mobile phone T. Thereby, a frictional force generated between these members during insertion and ejection of the mobile phone T can be lessened to perform an inserting and ejecting operation more smoothly.

Figure 36:
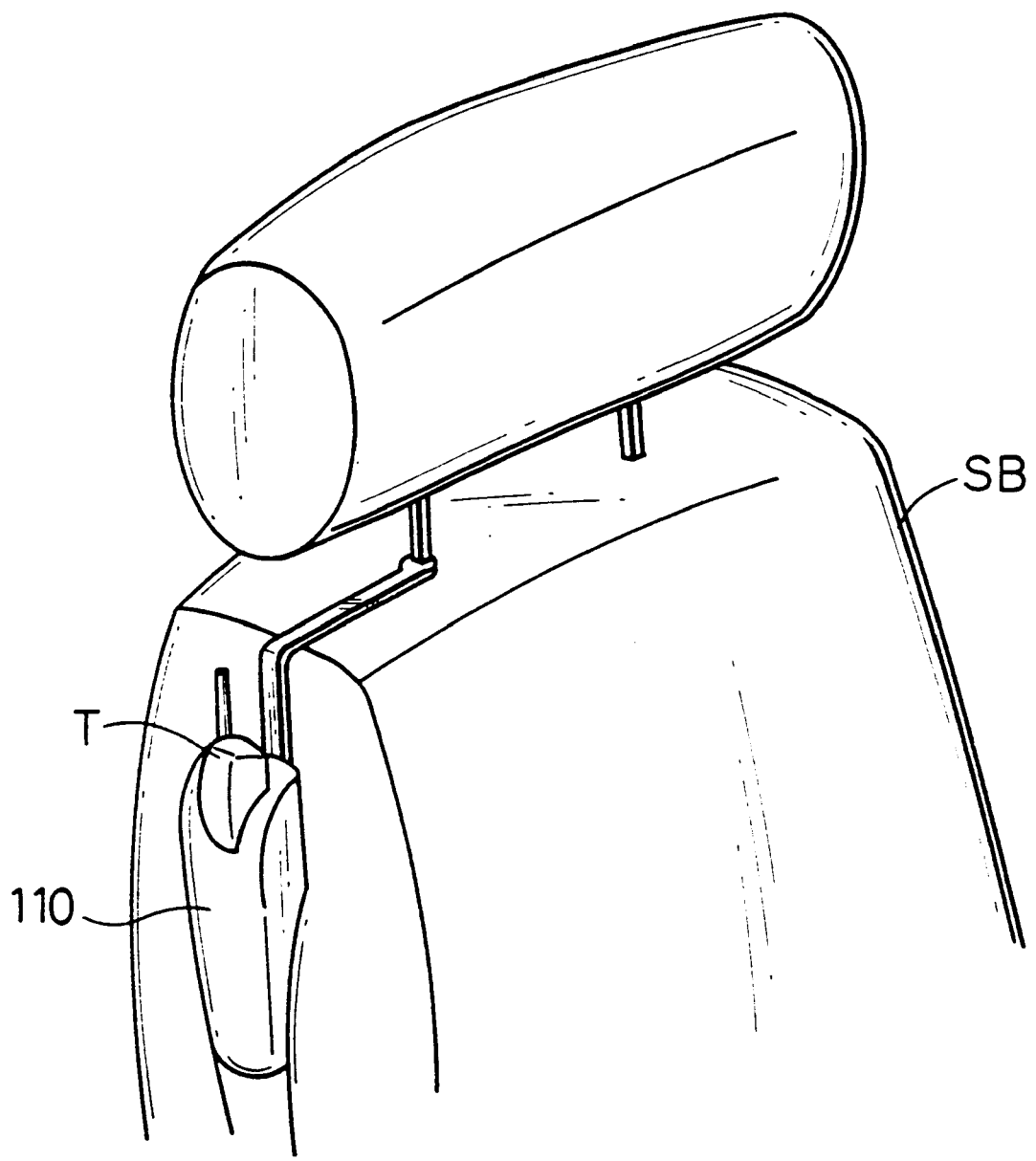
FIG. 36 is a perspective view of an altered form of installing the third phone holder in the vehicle.
Figure 37:
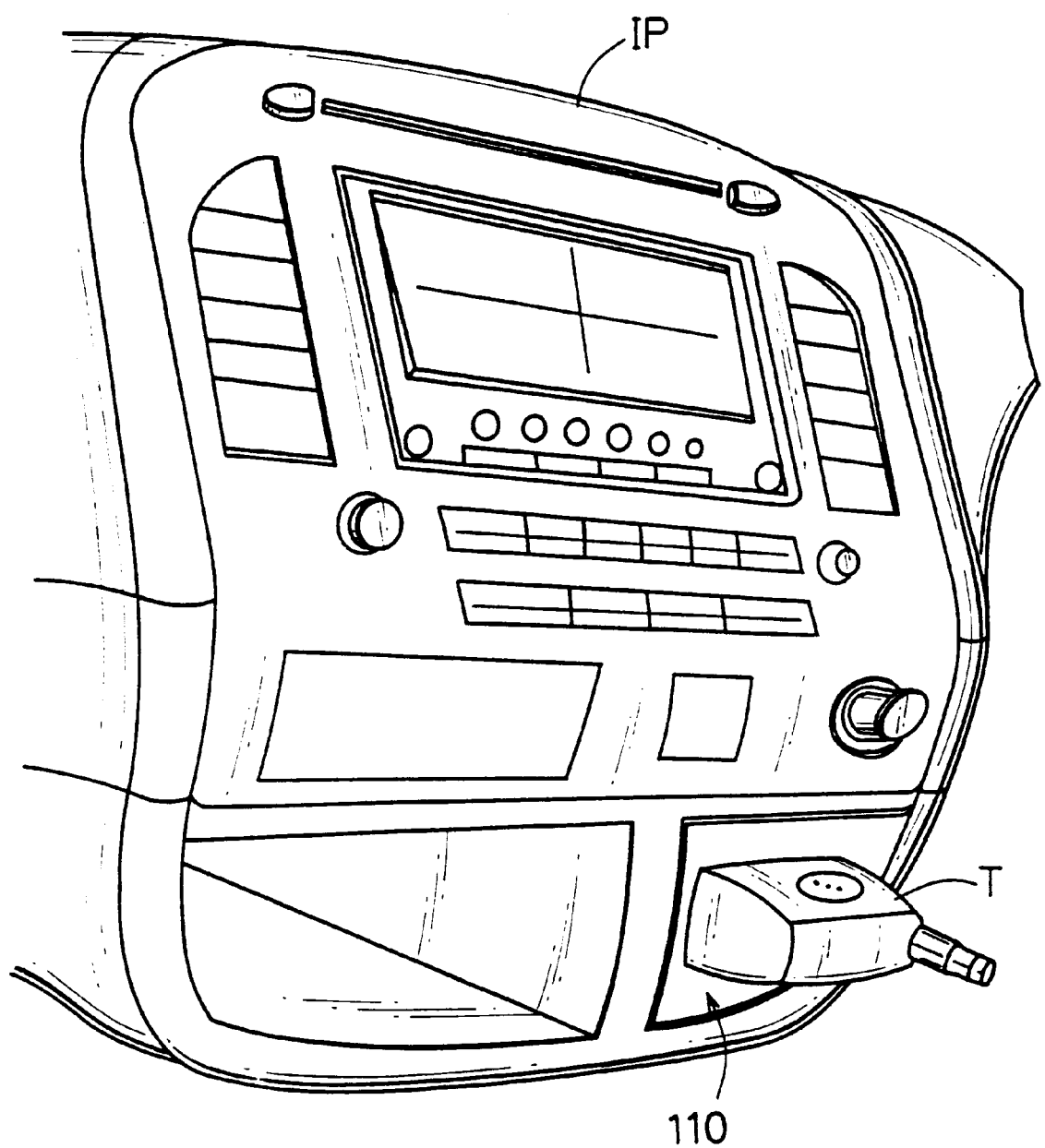
FIG. 37 is a perspective view of another altered form of installing the third phone holder in the vehicle.

The manner as to how the phone holder is installed in a passenger compartment of a vehicle is not limited to the above one shown in the third embodiment. As an altered form, as shown in FIG. 36, the phone holder may be installed on a side surface of a backseat SB in the vehicle body. Alternatively, as shown in FIG. 37, the phone holder may be mounted on the instrumental panel IP to insertably set the mobile phone T horizontally through an opening opened in the front side of the instrumental panel IP.

In either case, as long as the operable members such as the caps 136 are arranged along the periphery of the opening 118, the position of the phone guide members can be adjusted easily in the installed state of the phone holder.

Figure 38:
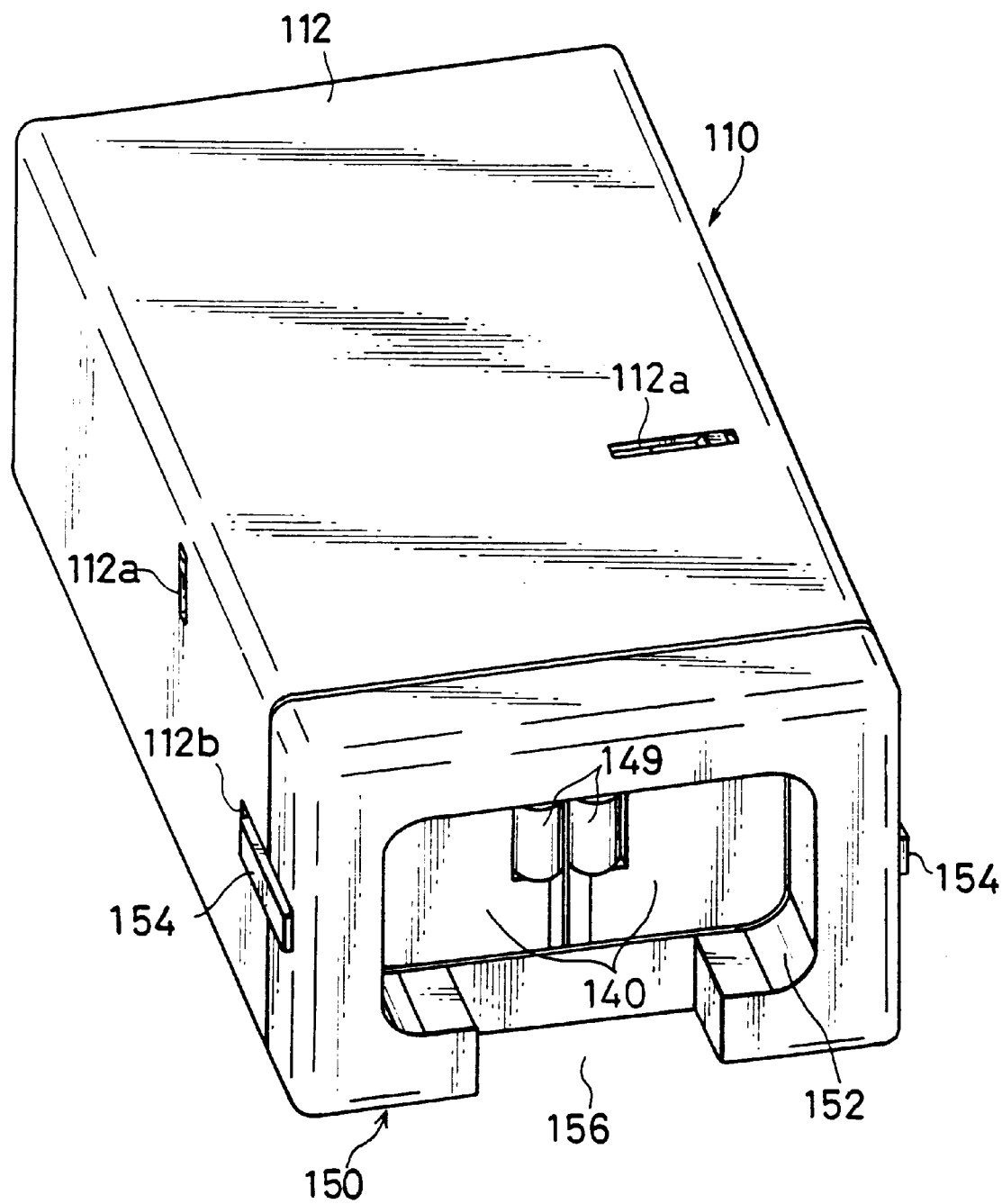
FIG. 38 is a perspective view showing an altered form of the third phone holder.
Figure 39:
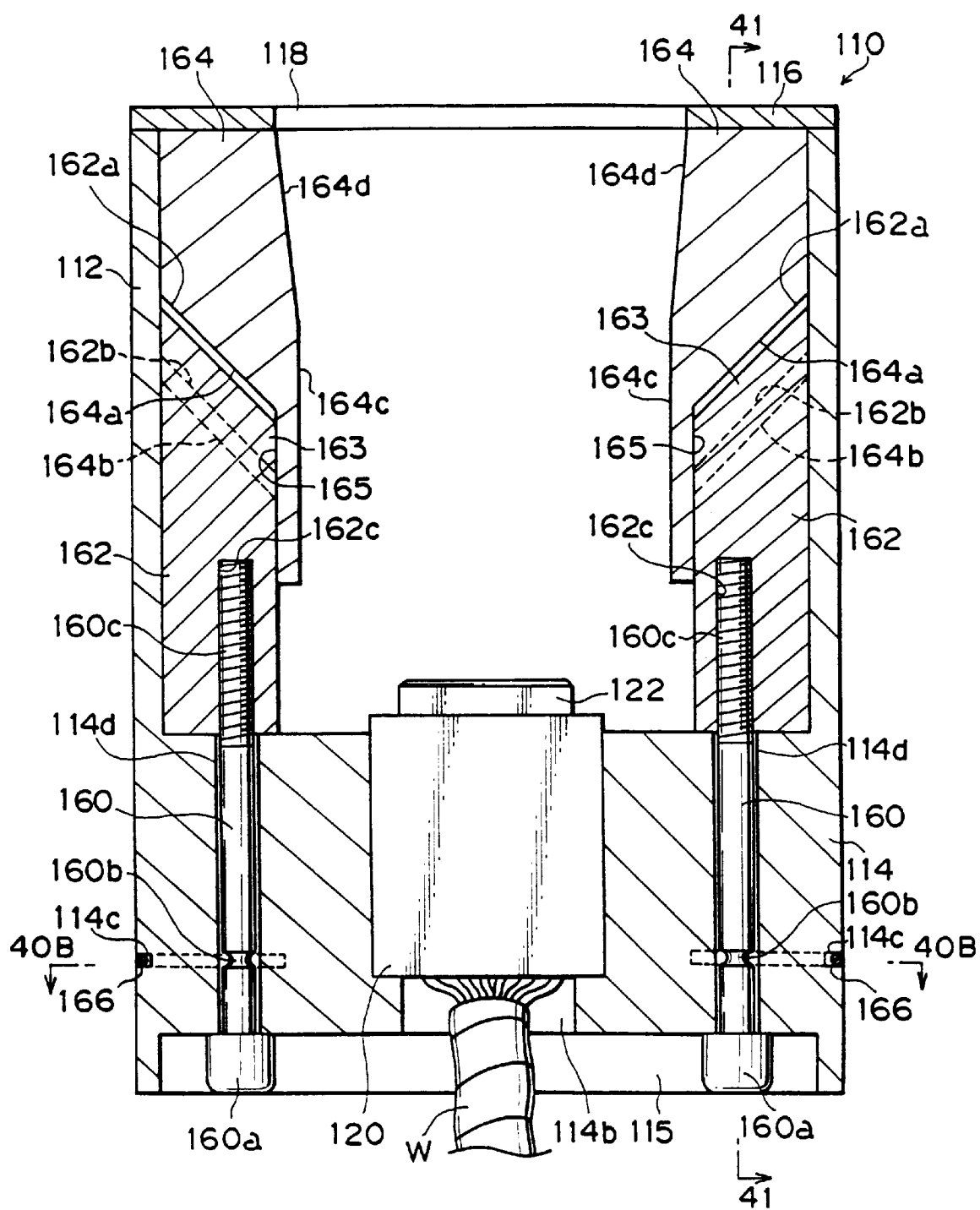
FIG. 39 is a cross sectional front view of a phone holder as a fourth embodiment according to this invention.
Figure 40A:
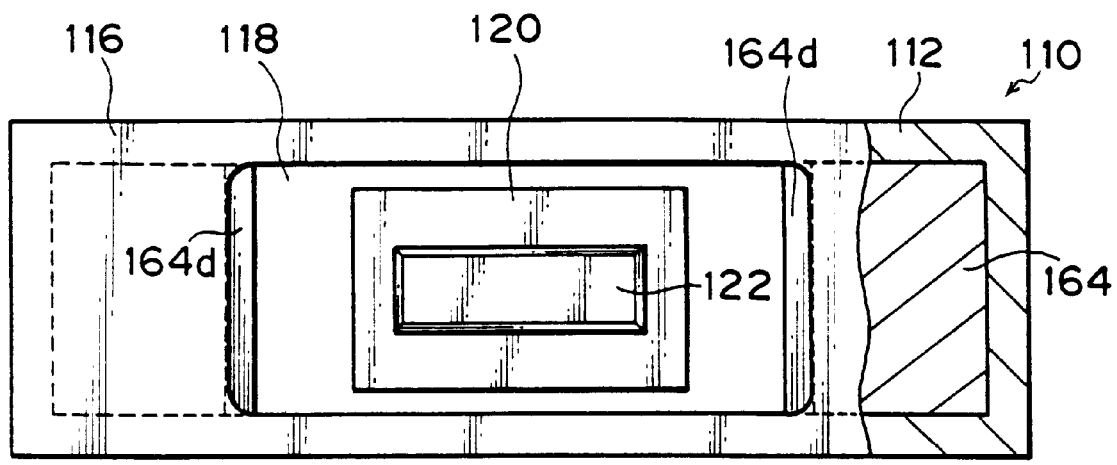
FIG. 40A is a partially cross sectional plan view of the fourth phone holder.
Figure 40B:
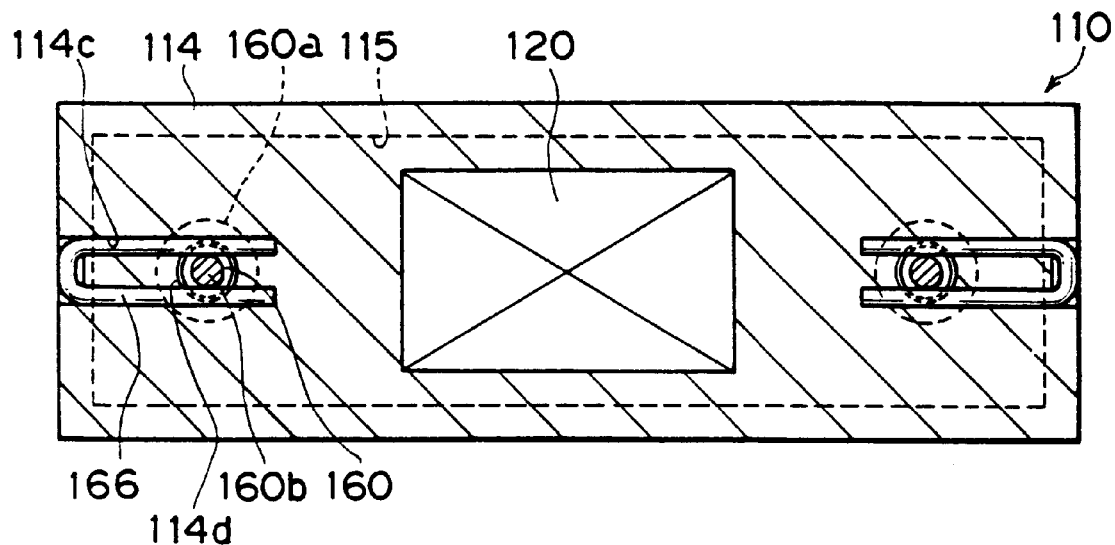
FIG. 40B is a cross sectional view of the fourth phone holder taken along the line 40B—40B in FIG. 39.

In the case where the phone holder is installed in a horizontal posture, as shown in FIG. 38, part of the periphery of the through hole 152 of the cover 150 located at the lower part of the through hole 152 is cut away to form a cutaway portion 156 to prevent accumulation of dusts and the like.

[Fourth Embodiment]

Next, a fourth embodiment of this invention is described with reference to FIGS. 39 to 42.

In this embodiment, in place of the four phone guide members in the third embodiment, a pair of phone guide members opposing to each other along width direction of the mobile phone T (transverse direction in FIG. 39) are provided in a holder main body 110. Namely, in this embodiment, the phone guide members opposing to each other along thickness direction of a mobile phone T (forward and backward directions in FIG. 39) are omitted. Each of the phone guide members includes a screw shaft 160, an operation moving member (or "operation moving element") 162, and a guide moving member (or "guide moving element") 164.

The screw shaft 160 is rotatably supported on a bottom block 114 and vertically extends through the bottom block 114 which is integrally formed with a side wall 112 of the holder main body 110 in this embodiment. Specifically, a bottom of the bottom block 114 is formed into a recess 115, and a pair of vertically extending insertion holes 114*d* are formed at right side and left side positions thereof respectively from the recess 115 to an upper surface of the bottom block 114. The screw shaft 160 is screwed into each of the insertion holes 114*d*.

The screw shaft 160 has an operation member 160*a* at a lower end thereof which has a diameter larger than the insertion hole 114*d* and which is fitted in the recess 115. An upper portion of the screw shaft 160, on the other hand, is formed into a threaded portion 160*c* which projects upward from the upper surface of the bottom block 114.

At a certain position on a lower portion of the screw shaft 160 is formed a small diametrical portion 160*b* with a diameter smaller than the rest thereof. A pair of U-shaped recesses 114*c* are formed at left and right positions in the bottom block 114 respectively corresponding to the small diametrical portions 160*b*. Each of the U-shaped recesses 114*c* is formed into such a shape as to nip the small diametrical portion 160*b* from forward and backward directions with one portion thereof communicating with left (right) side surface of the holder main body 110 (thickness direction of the mobile phone T). A U-shaped pin 166 having substantially the same shape as the recess 114*c* is fitted in the U-shaped recess 114*c* and fixed thereto. By rendering the opposite ends of the pin 166 in fitting contact with a circumference of the small diametrical portion 160*b*, the screw shaft 160 is prohibited from vertically moving along axial direction thereof and is supported in the holder main body 110 to be rotatable about the axis thereof.

Figure 41:
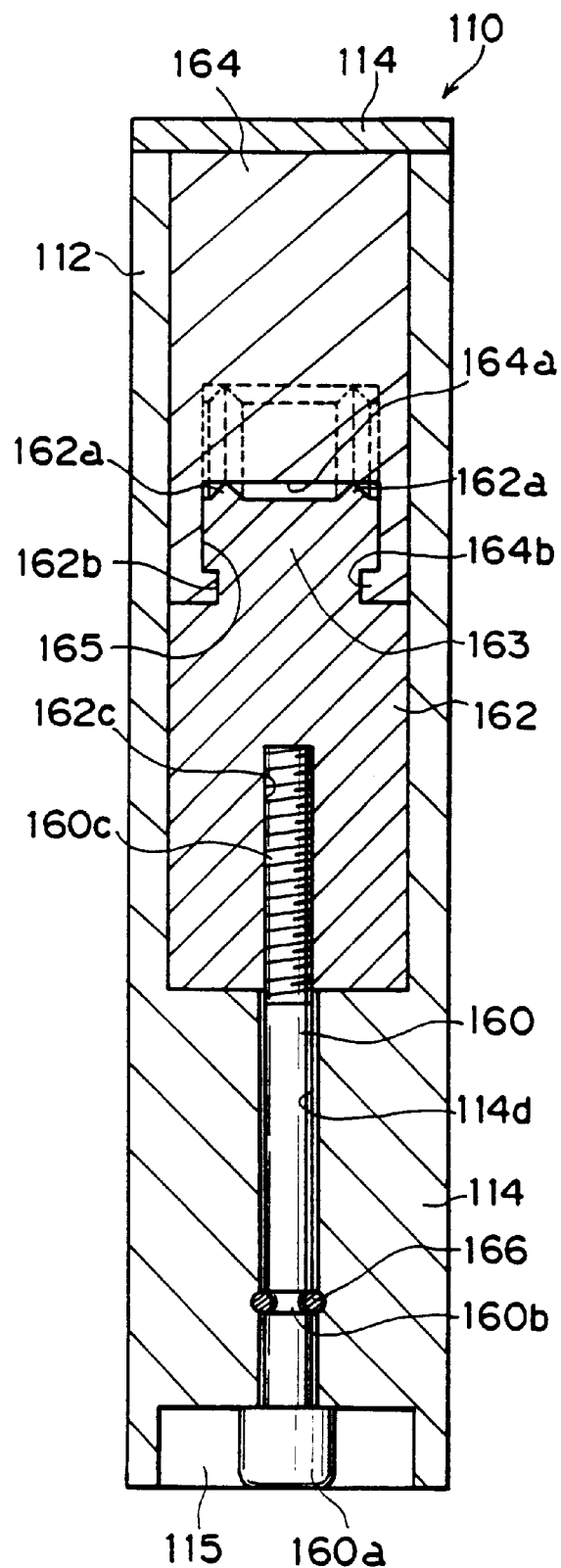
FIG. 41 is a cross sectional view of the fourth phone holder taken along the line 41—41 in FIG. 41.
Figure 42:
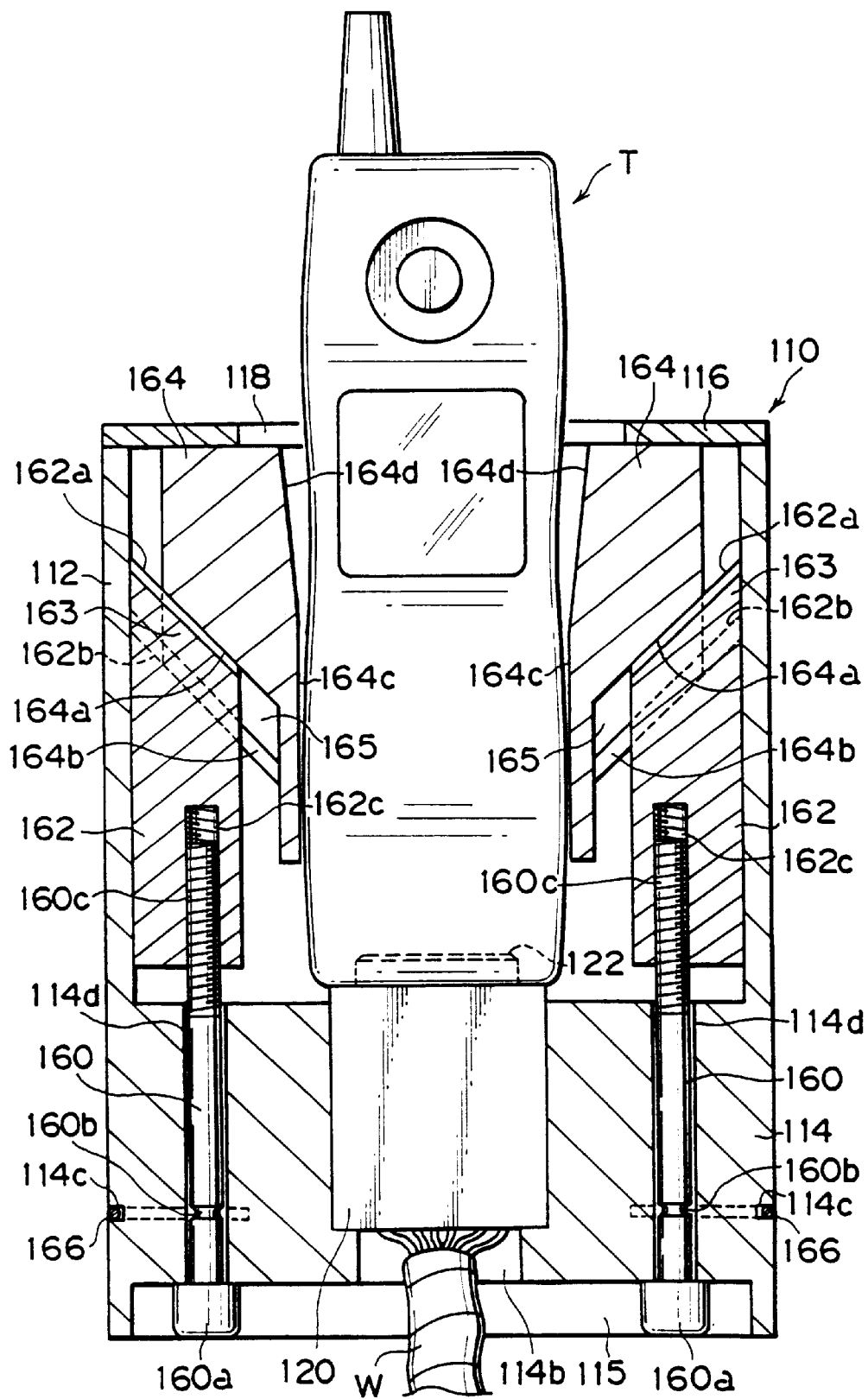
FIG. 42 is a perspective view showing a state that a mobile phone is inserted in the fourth phone holder.

The operation moving member 162 is vertically slidable along the side wall 112 in close contact with the inner side surface of the side wall 112. An upper surface of the operation moving member 162 is formed into a tapered portion (slope) having a reduced height as approaching toward the center of the holder main body 110. A projection 163 projecting upward from the rest of the tapered portion of the operation moving member 162 is formed in the middle of the tapered surface. A pair of ridges 162a opposing to each other in forward and backward directions (left and right sides in FIG. 41) inclining along the tapered surface are formed on the upper surface (tapered surface) of the projection 163. At a root on the left and right ends of the projection 163 in FIG. 41 are formed grooves 162b having a slope inclined with the same inclination as the tapered surface. A threaded hole 162c opened downward is formed at a lower portion of the operational moving member 162, and the threaded portion 160c of the screw shaft 160 is screwed into the threaded hole 162c.

The guide moving member 164 is provided in the holder main body 110 to be movable along transverse direction (width direction of the mobile phone T) in a state that it is vertically interposed between the operational moving member 162 and a ceiling plate 116. A recess 165 in which the projection 163 of the operation moving member 162 is fittable is formed at a center on a lower portion of the guiding moving member 164. A bottom of the recess 165 is formed into a tapered surface (tapered portion) 164a having a slope inclined with the same inclination as the ridge 162a. A pair of ridges 164b projecting downward are formed at a lower end of opposite sides (forward and backward directions) of the guide moving member 164 in such a manner as to sandwich the recess 165. By engaging the ridges 164b of the guide moving member 164 along the grooves 162b of the operation moving member 162, the tapered surface 164a of the guide moving member 164 is in contact with the projection 162a, thereby preventing the moving members 162, 164 from vertically displacing from each other.

A lower portion of an inner side surface (surface opposing to the mobile phone T) of each of the operation moving members 162 is formed into a vertically extended portion 164c for vertically guiding the mobile phone T, and an upper portion thereof is formed into a tapered surface 164d for smoothly guiding the mobile phone T into the holder main body 110.

With this arrangement, nipping the operable member 160a provided at the bottom of the holder main body 110 and turning the operable member 160a (i.e., screw shaft 160) move the operation moving member 162 in mesh with the screw shaft 160 upward and downward and spontaneously move the guide moving member 164 having the tapered portion 164a in fitting contact with the slanting ridges 162a of the operation moving member 162 along transverse direction of the holder main body 110.

Specifically, a rotational force of the screw shaft 160 is converted into a vertical movement of the operation moving member 162, and then into a transverse movement of the guide moving member 164. In other words, the screw shaft 160, the operation moving member 162, and the guide moving member 164 as a whole constitute a movement conversion mechanism. In association with the rotational manipulation of the operable members 160a, the guide moving members 164 slide along transverse direction. Accordingly, before the actual use of the mobile phone T in and out of the phone holder, the position adjustment of the phone holder to smoothly insert and eject the mobile phone T can be facilitated and the mobile phone T can be positioned in the holder main body 110 in a stable manner once it is held therein by adjusting the position of the guide moving members 164 to such a position as to bring the vertical extensions (guide surfaces) 164c into contact with or in close contact with the side surface of the mobile phone T.

As shown in this embodiment, in the case where the thickness of the mobile phone T is not so greatly varied from the thickness of the holder main body, the position of the holder main body 110 is adjusted easily by merely adjusting the position with respect to the width direction of the mobile phone T. Further, in this embodiment, the position adjustment is performed by projecting the operable member 160a at the side end opposite to a through hole (opening) 118, i.e., a bottom surface (lower end in FIG. 42) near a holder connector 120. This bottom surface is also formed with an opening considering the necessity that a cord W for the holder connector 120 is inserted in the opening. Accordingly, also in this embodiment where the operable members 160a are provided at the bottom surface, the operable members 160a can be operated in a state that the phone holder is installed in a vehicle body.

However, the arrangement shown in the third embodiment in which all of the operable members are arranged on the periphery of the through hole 118 (phone insertion opening) is advantageous, because this arrangement is applicable to the altered phone holder shown in FIG. 37 where the mobile phone T is horizontally insertable in the holder main body 110 with the phone insertion opening opened forward.

In this altered form, the holder connector 120 located at the rear side of the holder main body 110 is positioned on the backside of the instrumental panel IP when the altered phone holder is set in the vehicle body to prevent the holder connector 120 from being exposed outside. Accordingly, the arrangement in the third embodiment contributes to freedom of the mounting position of the phone holder.

Further, the through hole 118 is generally opened in a direction most convenient for an operator (upward direction or forward direction) to facilitate insertion and ejection of the mobile phone T. Accordingly, the concentrated arrangement of the operable members around the periphery of the through hole 118 is most desirable in the aspect of operability.

In the third embodiment, all of the phone guide members 130 are moved along the moving direction of the operable members by linearly moving the operable members, while in the fourth embodiment, all of the phone guide members are moved along width direction of the movable phone T by turning the operable members. As an altered form, the linear operating type in the third embodiment and the rotational operating type in the fourth embodiment may be combined.

In this fourth embodiment, further, some of the operable members may be arranged on the side opposite to the through hole 118. However, the arrangement that all of the operable members are arranged on the same side is advantageous for the operator to adjust the position of the holder main body 110, thereby contributing to an improvement of the operability of the position adjustment.

[Fifth Embodiment]

A fifth embodiment of this invention is described with reference to FIGS. 43 to 56.

The phone holder according to this embodiment comprises a base 210, a connector module 220, and a phone guiding unit 240. The base 210 and the phone guiding unit 240 constitute a holder main body.

The connector module 220 is constructed in such a manner that a holder connector 223 is held in a casing 221.

A connecting portion 223a which is connectable with a phone connector TC provided at a rear end of a mobile phone T is formed at a forward end of the holder connector 223. A phone ejector 222 is provided along a periphery of the holder connector 223. The phone ejector 222 is mounted on the casing 221 in such a manner that the connecting portion 223a of the holder connector 223 is rendered into contact with the rear end of the mobile phone T to connect the phone connector TC (see FIGS. 54 to 56) provided at the rear end of the mobile phone T (an end along longitudinal direction of the phone T) with the holder connector 223. When the mobile phone T is further pressed rearward against the phone ejector 222 from this state, the phone ejector 222 pushes the mobile phone T forward by a spring force thereof to disengage the connection between the mobile phone T and the holder connector 223.

The phone ejector 222 may be omitted in this embodiment. For instance, the mobile phone T may be manually ejected from the holder connector 223.

The connector module 220 is secured on the base 210 by a connector fixing member 231. Specifically, referring to FIG. 44, a connecting portion (formed into such a shape as an ear, hereinafter referred to as an "ear portion") 221a having a vertical through hole and projecting along sideways direction is provided on a lower portion on a right side wall of the casing 221. Likewise, an ear portion 221b having the same shape as the ear portion 221a having a vertical through hole and projecting along sideways direction is provided at such a position on an upper portion on the left side wall of the casing 221 as to correspond to the ear portion 221a. The ear portions 221a and 221b are symmetrically located with respect to a center point of the casing 221.

A pair of left and right connector support portions 211 are formed upright on a bottom wall of the base 210. Immediately rightward of the right side connector support portion 211 is formed a nut portion 212 having a threaded hole 212a opened upward. On the other hand, the connector fixing member 231 has a vertically extended main shaft, an operable head portion 231a disposed at an upper end of the main shaft, and an externally threaded portion 231c at a lower end thereof. The connector fixing member 231 is further formed with a flange portion 231b of a large diameter right above the externally threaded portion 231c.

Figure 44:
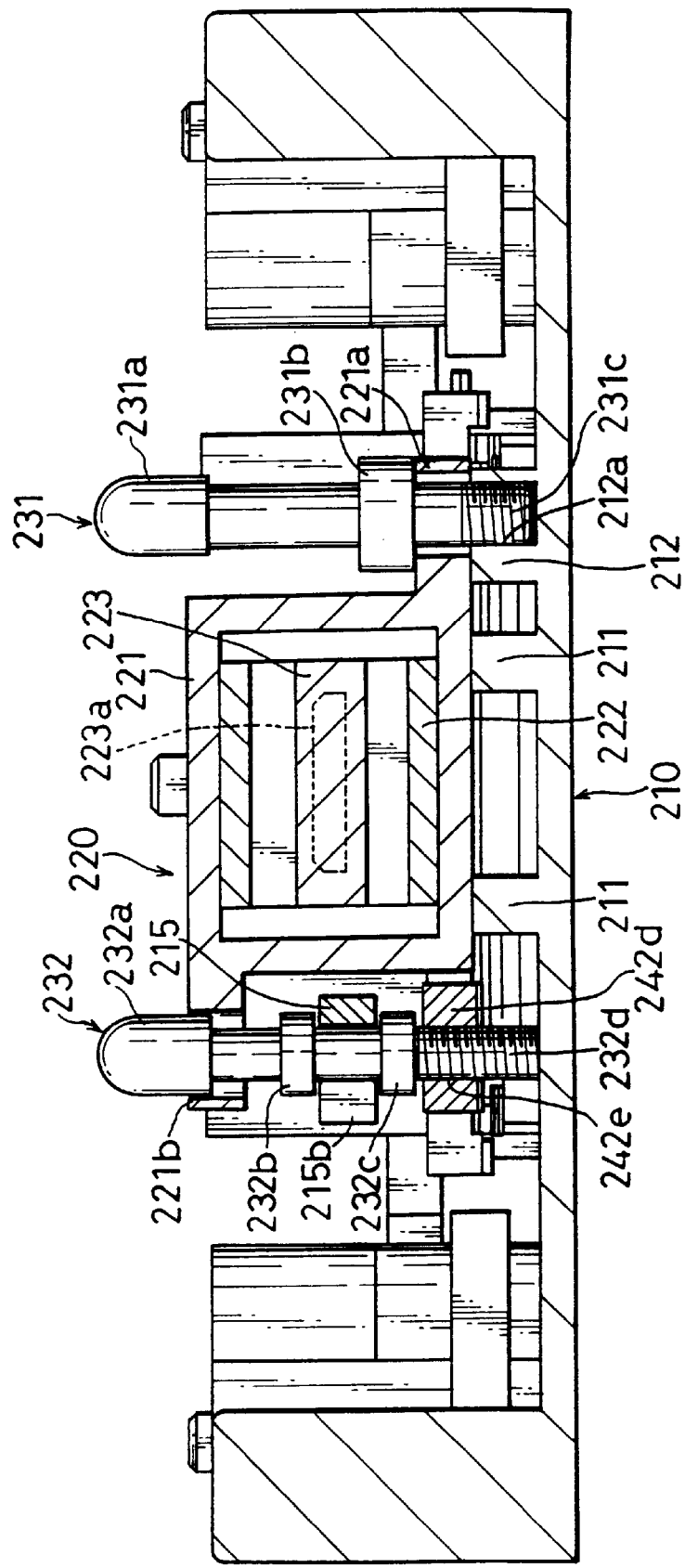
FIG. 44 is a cross sectional view of the fifth phone holder taken along the line 44—44 in FIG. 43.

Referring to FIG. 44, the connector module 220 is mounted at such a position as to match the through hole of the ear portion 221a of the casing 221 with the threaded hole 212a of the base 210. Then, the externally threaded portion 231c of the connector fixing member 231 is screwed into the threaded hole 212a and the through hole of the ear portion 221a until the upper surface of the ear portion 221a is abutted against the flange portion 231b. Thereby, the connector module 220 is secured on the connector support portion 211 of the base 210 in a state that the top thereof faces upward.

Figure 45:
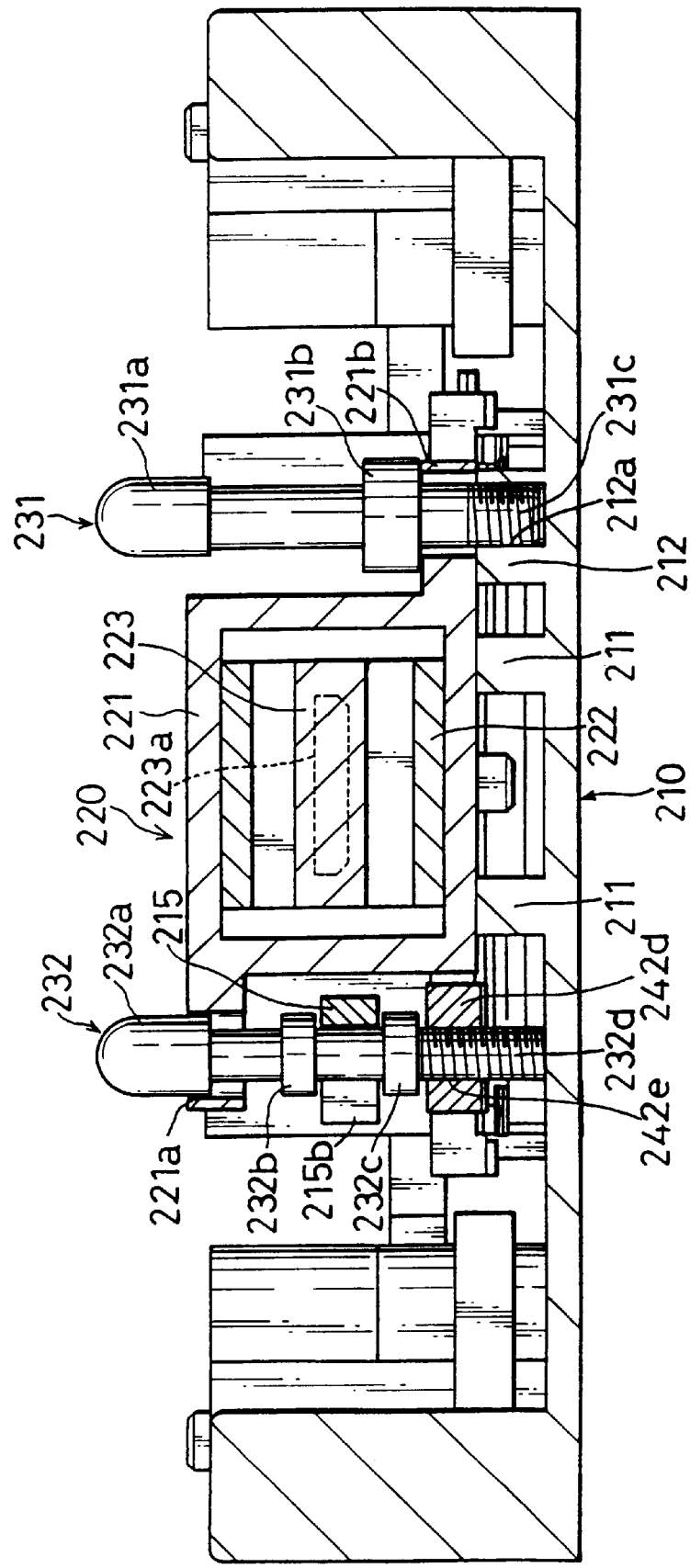
FIG. 45 is a cross sectional view showing a state that a connector module of the fifth phone holder is mounted upside down from a state in FIG. 44.

Referring to FIG. 45, the connector module 220 is mounted at such a position as to match the through hole of the ear portion 221b with the threaded hole 212a. Then, the externally threaded portion 231c of the connector fixing member 231 is screwed into the threaded hole 212a and the through hole of the ear portion 221b until the upper surface of the ear portion 221b is abutted against the flange portion 231b. Thereby, the connector module 220 is secured on the connector support portion 211 in a state that the top thereof faces downward.

In other words, in this embodiment, the connector module 220 can be selectively supported on the base 210 with the top thereof facing upward or downward.

The phone guiding unit 240 has a hollow portion opened upward at a forward side (left side in FIG. 47) of the connector module 220 to guide the mobile phone T toward the connector module 220, and includes, as shown in FIGS. 46 to 49, a pivotal bottom wall (pivotal member) 241, an elevating bottom wall or elevating frame (elevating member) 242, and a pair of left and right movable side walls 243.

Figure 46:
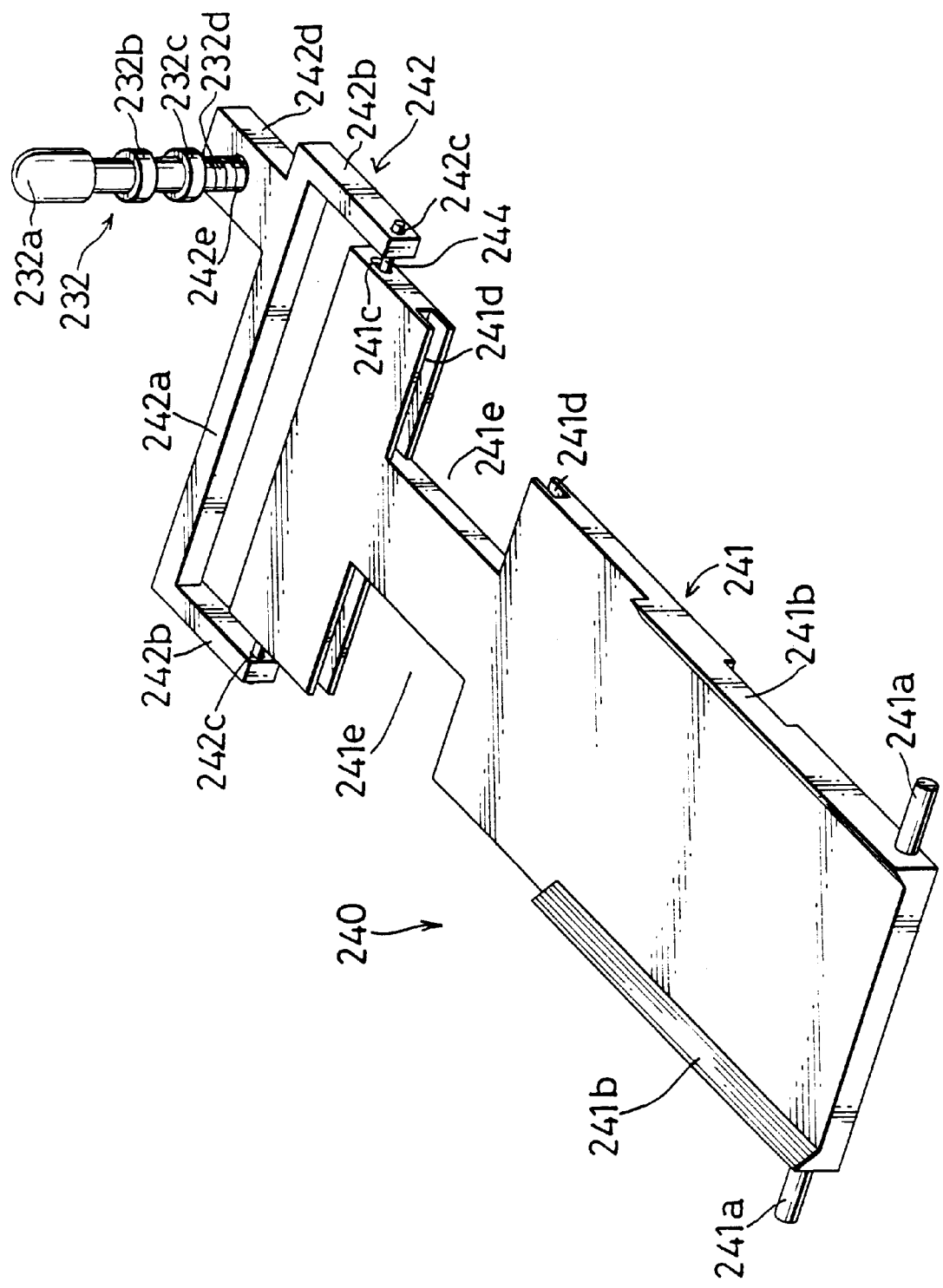
FIG. 46 is a perspective view of a pivotal bottom wall and an elevating bottom wall in the fifth phone holder.

The elevating frame 242 is integrally formed with a base frame 242a extending along left and right directions (width direction of the mobile phone T), a pair of arm portions 242b extending forward from the left and right ends of the base frame 242a, and a nut portion 242d extending rearward from a left-sided portion of the base frame 242a (rightsided portion in FIG. 46). Through holes 242c along left and right directions are formed at a front end of the arm portions 242b, and a vertical threaded hole 242e is formed in the nut portion 242d.

The base 210 is provided with a vertical position adjuster 232 to move the elevating frame 242 up and down.

The vertical position adjuster 232 is formed with a main shaft, an operable head portion 232a formed at an upper end of the main shaft, a pair of flange portions 232b, 232c at an intermediate portion thereof, and an externally threaded portion 232d at a lower end thereof. The externally threaded portion 232d is in mesh with the threaded hole 242e of the elevating frame 242.

An upper wall 215 horizontally extending at a position higher than the elevating frame 242 is formed on the base 210. A notch 215b which has a width smaller than an outer diameter of the flange portion 232b (232c) and larger than the diameter of the main shaft of the vertical position adjuster 232 is formed in the upper wall 215. By inserting the vertical position adjuster 232 into the notch 215a from sideways direction in such a manner that the portion of the position adjuster 232 between the flange portions 232b, 232c are fitted in the notch 215a, the vertical position adjuster 232 is supported on the base 210 to be rotatable about an axis of the main shaft thereof and non-movable along vertical direction. Accordingly, by turning the vertical position adjuster 232 about the axis thereof clockwise or counterclockwise, the entirety of the elevating bottom wall 242 which is engaged with the vertical position adjuster 232 is moved up and down.

In this embodiment, the casing 221 can be set upside down as shown in the state of FIG. 44 and in the state of FIG. 45. One of the states is that the operable head portion 232a of the vertical position adjuster 232 is fitted in the through hole of the ear portion 221b in a state that the ear portion 221a of the connector module 220 is secured on the nut portion 212 (see FIG. 44). The other state is that the operable head portion 232a of the vertical position adjuster 232 is fitted in the through hole of the ear portion 221a in a state that the ear portion 221b of the connector module 220 is secured on the nut portion 212 (see FIG. 45). In either case, there can be prevented an erroneous operation that the vertical position adjuster 232 (operable head portion 232a) is displaced horizontally after the vertical position adjuster 232 is fitted in the base 210.

The pivotal bottom wall 241 is positioned forward of the elevating frame 242 and extends along forward and backward directions (longitudinal direction of the mobile phone T). A horizontally extended through hole 241c is formed at the rear end of the pivotal bottom wall 241 to communicate with the opposite ends along transverse direction. A pivotal coupling rod 244 is inserted through the long through hole 241c of the pivotal bottom wall 241 and through holes 242c each formed at a lead end of the arm portion 142b of the elevating frame 242 to connect the elevating frame 242 and the pivotal bottom wall 241 in such a manner that the pivotal bottom wall 241 pivotally moves about the axis of the pivotal coupling rod 244 up and down.

A pivotal rod 241a is projected along sideways direction at a forward end on lateral sides of the pivotal bottom wall 241. A pair of left and right guiding side walls 214 are formed upright at a forward portion of the base 210 (portion away from the connector module 220 along forward direction). A through hole 213 (see FIG. 43) extending along sideways directions is formed at a lower portion on a front end of the guiding side walls 214. By inserting the pivotal shaft 241a into the through holes 213 from inward and placing the pivotal bottom wall 241 between the guiding side walls 214, a forward end of the pivotal bottom wall 241 is coupled to the base 210 to pivotally move the pivotal bottom wall 241 about the axis of the pivotal rod 241a up and down.

Figure 48:
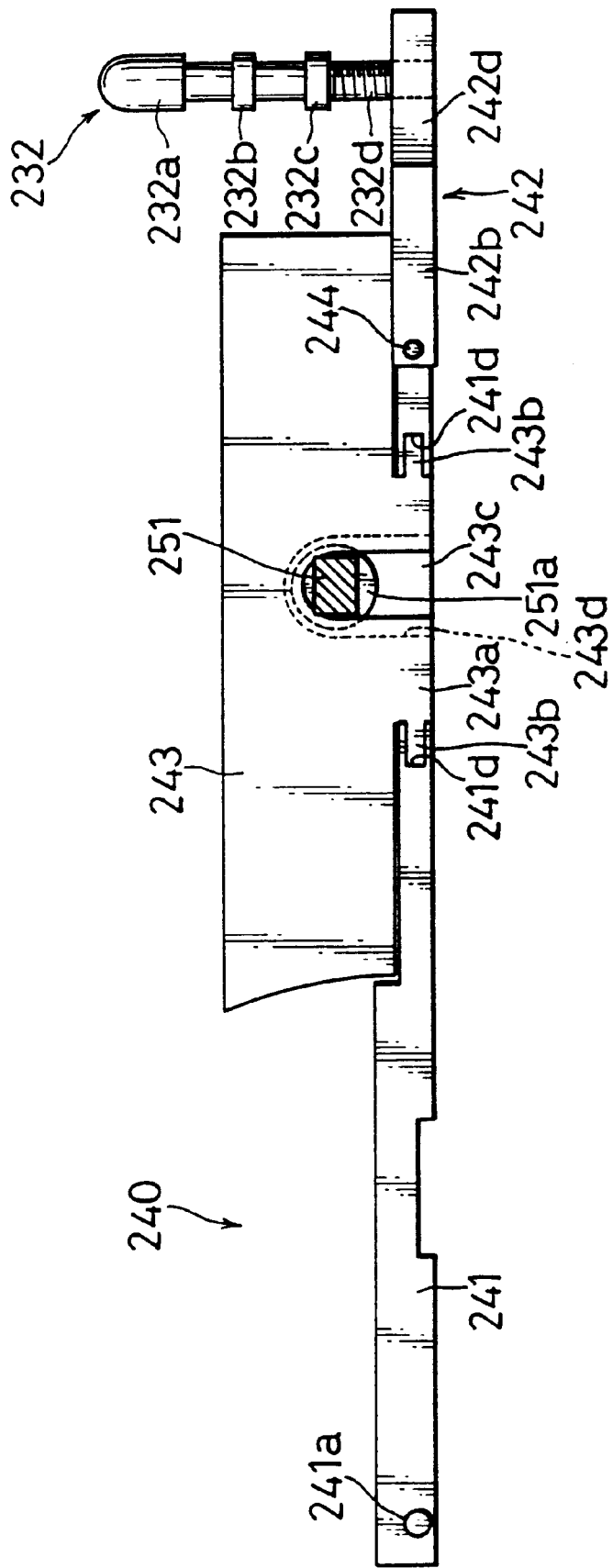
FIG. 48 is a partially cross sectional side view showing a state that the elevating bottom wall is at a lowermost position in the fifth embodiment.
Figure 49:
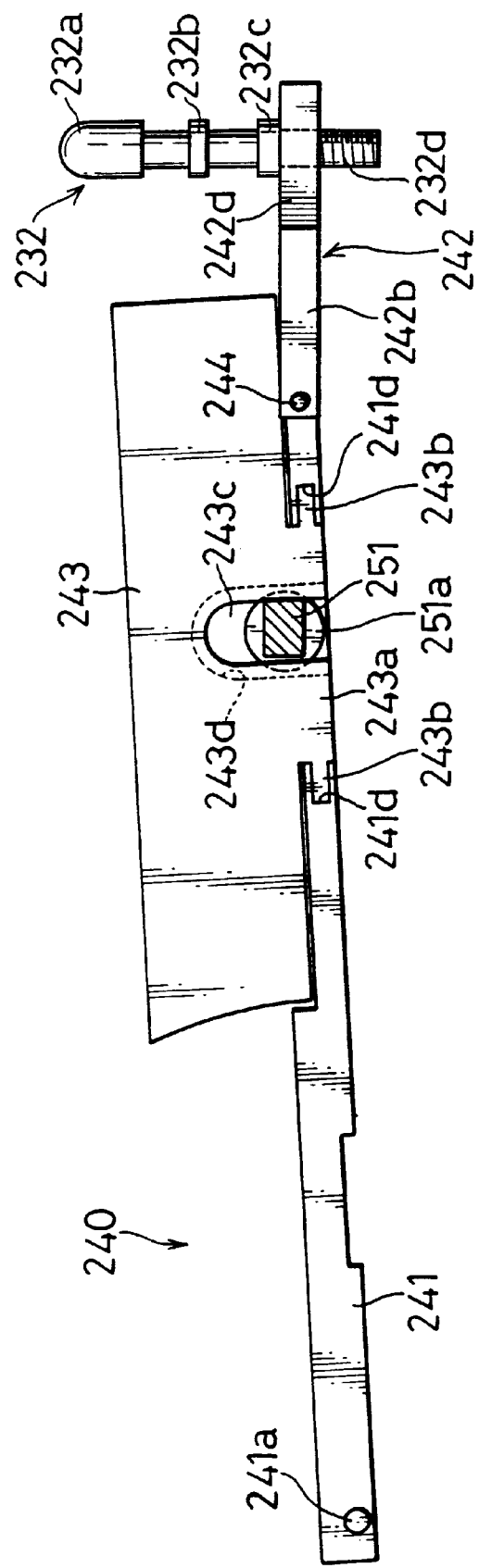
FIG. 49 is a partially cross sectional side view showing a state that the elevating bottom wall is moved upward in the fifth embodiment.

Thereby, as shown in FIG. 48, when the elevating frame 242 is set to the lowermost position, the pivotal bottom wall 241 is set substantially horizontal with the elevating frame 242, while as the elevating frame 242 is raised upward, as shown in FIG. 49, the pivotal bottom wall 241 is inclined with a downward slope as approaching forward (downward slope on the leftward in FIG. 49).

It should be noted that guiding ridges 241b formed upright along opposite lateral ends on the forward portion of the pivotal bottom wall 241 are adapted for guiding the mobile phone T along phone insertion direction.

Figure 47:
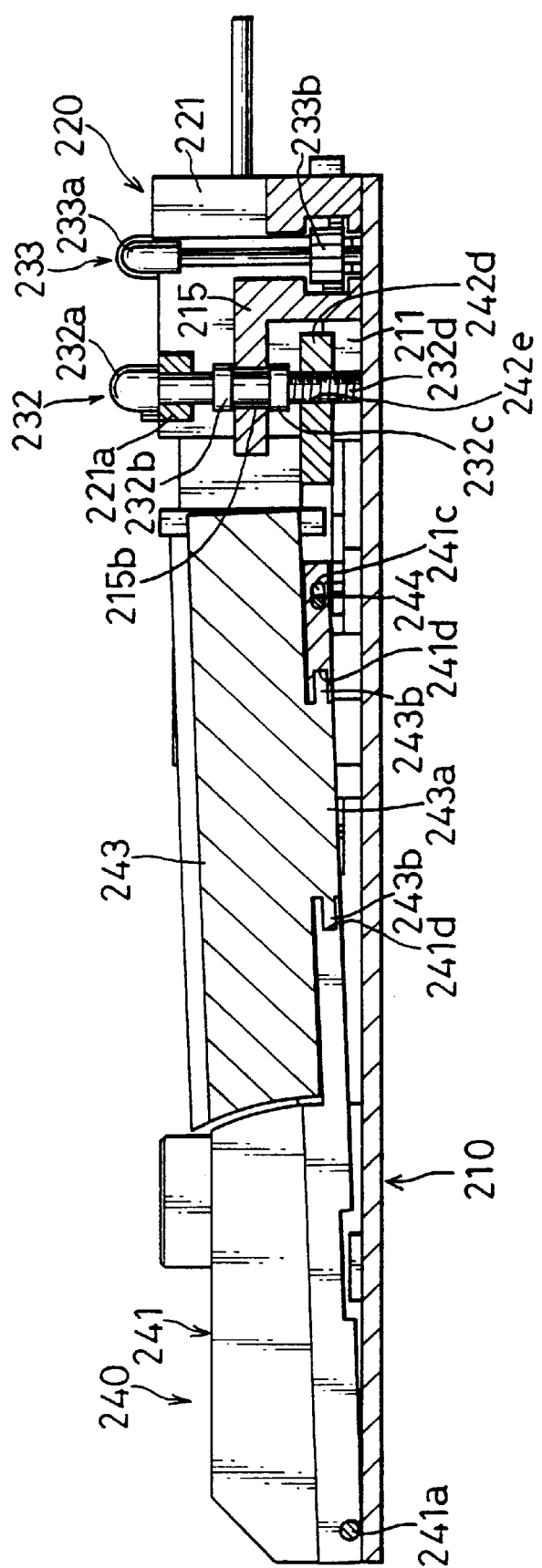
FIG. 47 is a cross sectional side view of the fifth phone holder.

Now, referring to FIGS. 46 and 47, in particular, the pair of movable side walls 243 are mounted on a rear portion of the pivotal bottom wall 241. Specifically, a pair of rectangular notches 241e cut away inward toward the center of the pivotal bottom wall 241 are formed at the rear portion of the pivotal bottom wall 241. A groove 241d is formed along front and rear peripheries of the notch 241e. An extension 243a extending toward the center of the pivotal bottom wall 241 is formed at a lower portion of the movable side wall 243. A projection 243b projecting along forward (rearward) direction is formed at the opposite ends along forward and backward directions (longitudinal direction of the mobile phone T) of the extension 243a. By fittingly inserting the forward (rearward) projections 243b (see FIG. 47) into the front (rear) grooves 241d, the movable side walls 243 are slidable along transverse directions with respect to the pivotal bottom wall 241.

A pair of right and left position adjusters (referred to as a "transverse position adjuster" or simply a "position adjuster") 233 are arranged at a position immediately behind the connector fixing member 231 and the vertical position adjuster 232 respectively. By turning the transverse position adjuster 233, the rotational force thereof is transmitted to the corresponding movable side wall 243 via a movement conversion mechanism 250 to slide the movable side wall 243 along sideways (transverse) directions individually relative to the pivotal bottom wall 241.

Figure 50:
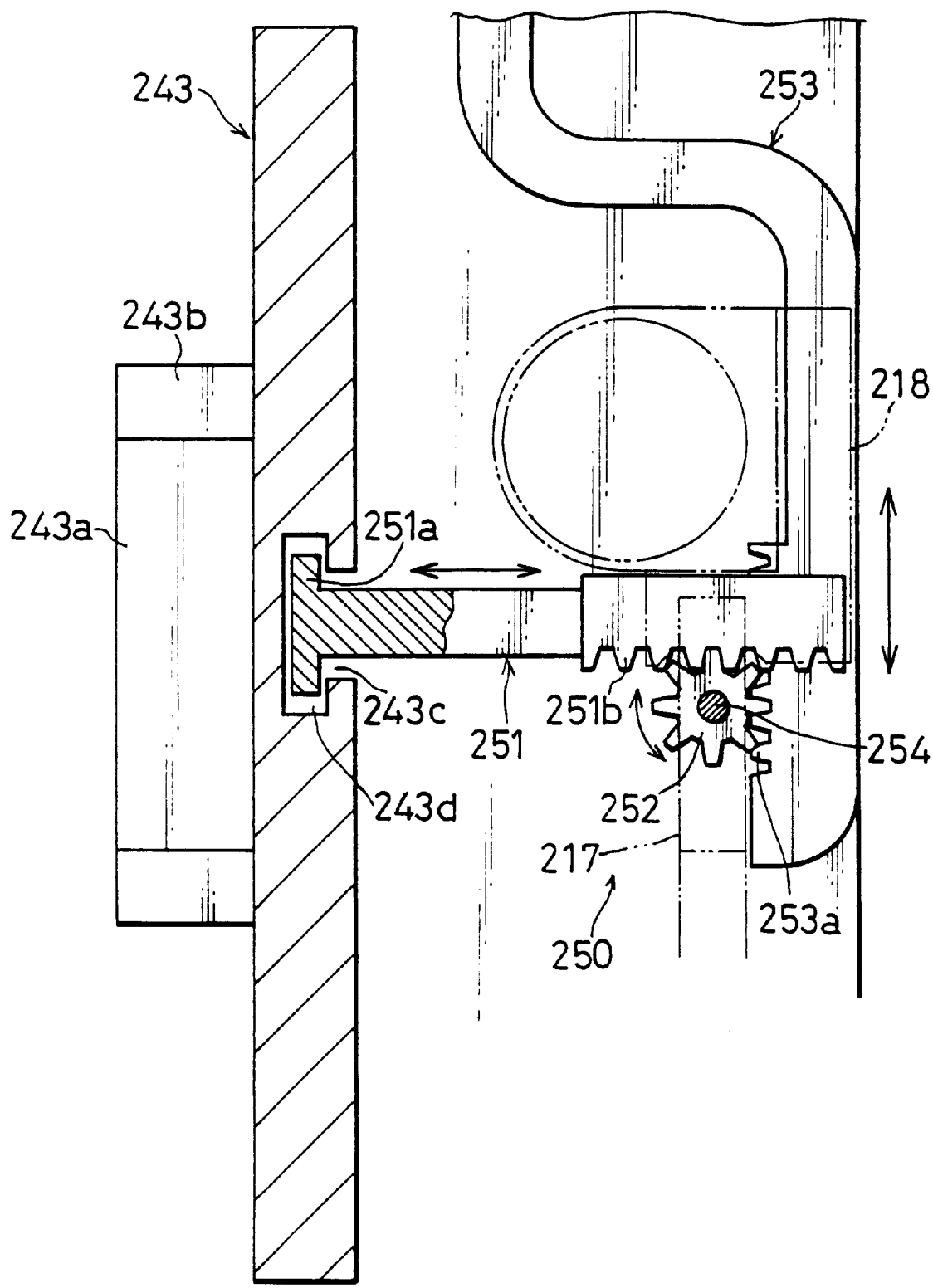
FIG. 50 is a partially cross sectional plan view showing a movement conversion mechanism of the fifth phone holder.
Figure 51:
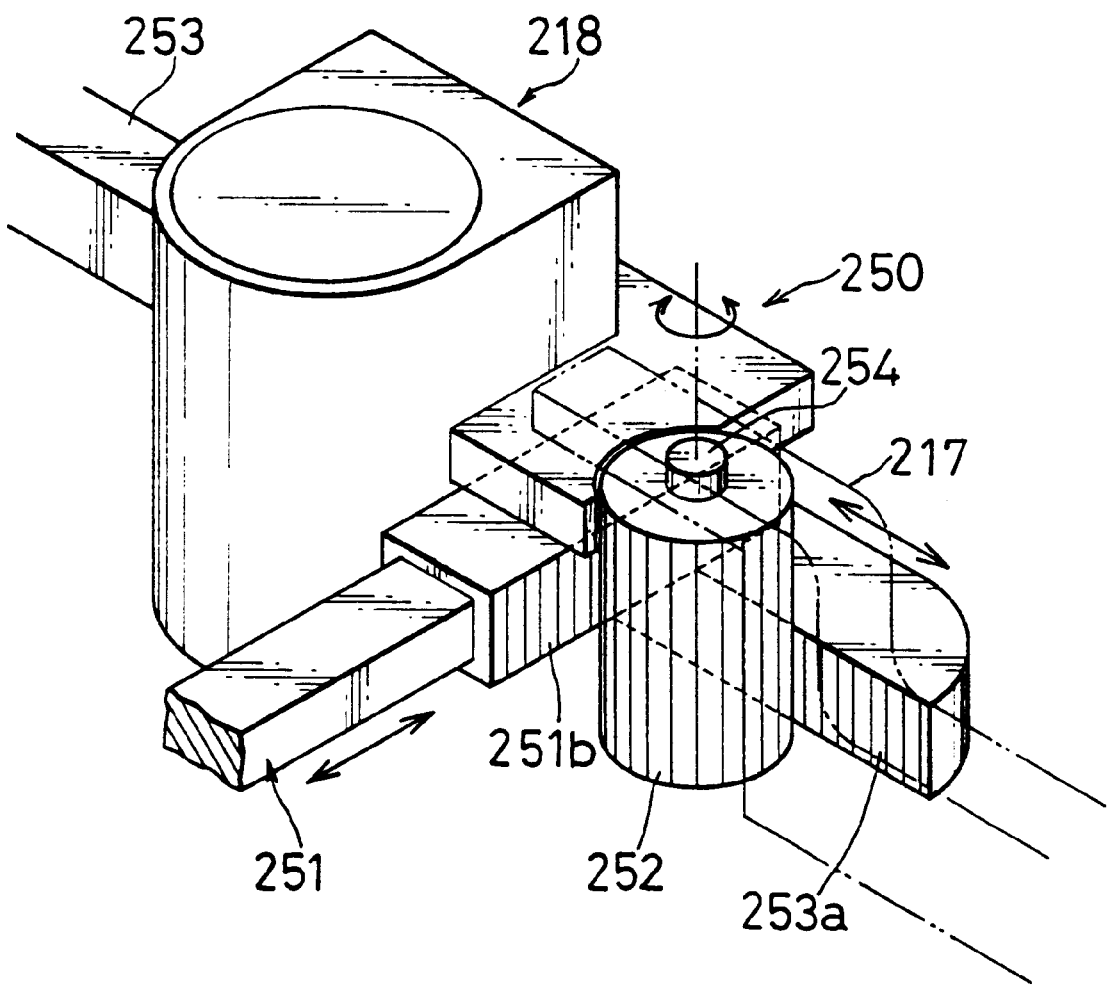
FIG. 51 is a perspective view of the movement conversion mechanism in the fifth embodiment.

The movement conversion mechanism 50 includes, as shown in FIGS. 50 and 51, a first transmitter 251, a pinion gear 252, and a second transmitter 253 each of which are disposed at left and right sides of the phone holder. A conversion mechanism supporter 218 is also formed at left and right sides of the base 210 to slidably support an outer portion of the corresponding first transmitter 251 along sideways directions and to slidably support a forward portion of the corresponding second transmitter 253 along forward and backward directions. At a position immediately before the conversion mechanism supporter 218 is provided a gear support arm 217 in such a state that one end thereof is disposed away upward from the bottom wall of the base 210. The pinion gear 252 is rotatably supported between the gear support arm 217 and the bottom wall of the base 210 via the opposite ends of a center axis (shaft) 254 thereof.

Now, referring to FIG. 50, the first transmitter 251 extends along sideways (transverse) directions of the phone holder and is formed with a flange portion 251a at an inward end thereof and a rack 251b at an outward end thereof, respectively. The rack 251b is in mesh with an upper portion of the pinion gear 252. At the outer side of the movable side wall 243 is formed an entrance groove 243c along the longitudinal direction of the phone holder with a width (height in FIG. 50) smaller than the flange portion 251a and larger than the main shaft body of the first transmitter 251. At a rear portion (leftward portion in FIG. 50) of the entrance groove 243c is formed a rear side groove 243d with a width (height in FIG. 50) larger than the flange portion 251a. The grooves 243c, 243d are continuous and opened downward. By inserting the flange portion 251a of the first transmitter 251 into the rear side groove 243d from the bottom, the inner side end of the first transmitter 251 is coupled to the movable side wall 243 to be movable in the transverse direction.

Again, referring to FIGS. 50 to 53, in particular, the second transmitter 253 has such a shape as to extend from the arrangement position of the conversion mechanism supporter 218 to the left (right) position adjuster 233.

Racks 253a, 253b extending along forward and rearward directions are formed respectively at a forward end and a rearward end of the second transmitter 253. The front rack 253a is in mesh with a lower portion of the pinion gear 252, and the rear rack 253b is connected to the transverse position adjuster 233.

Figure 52:
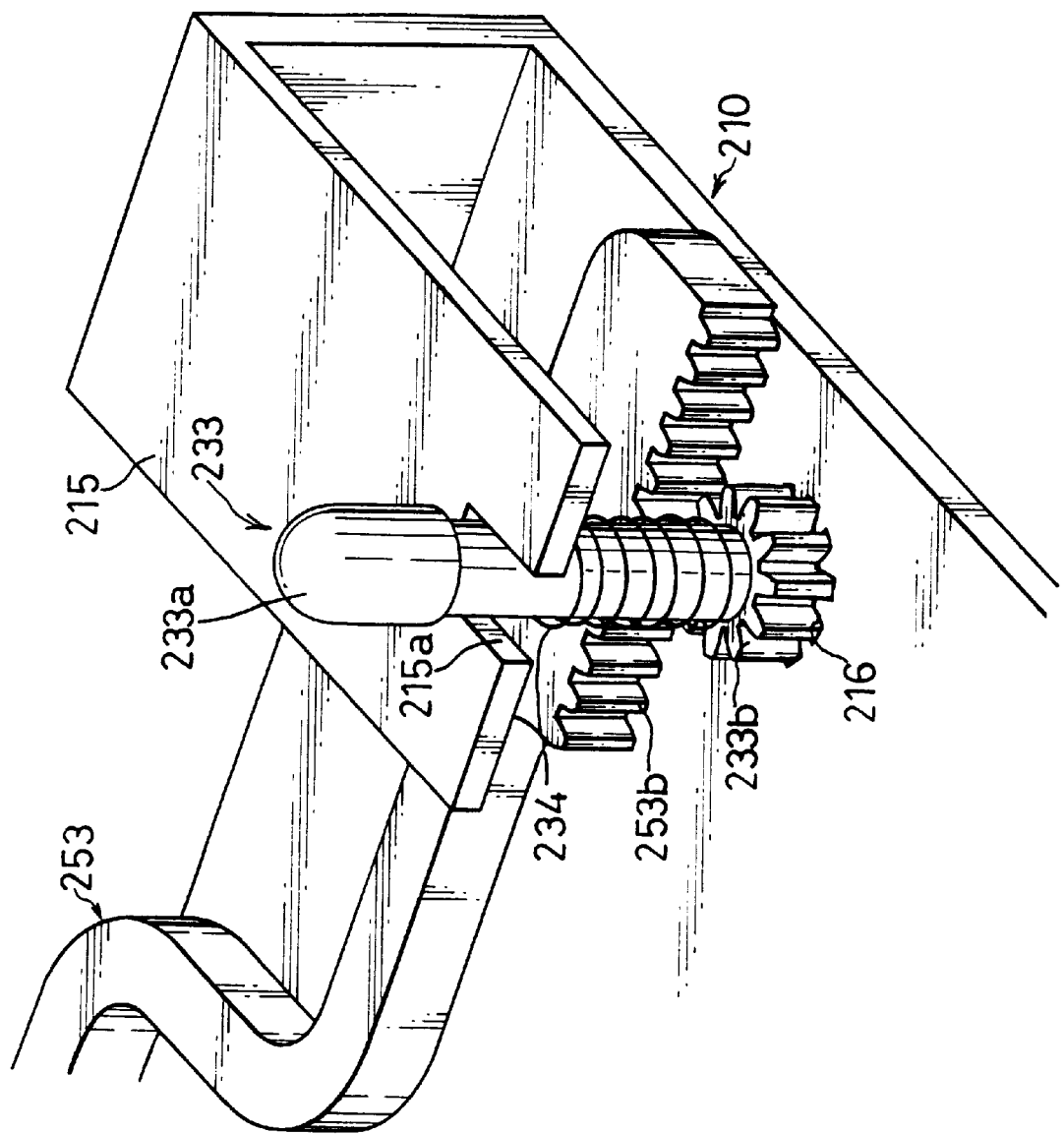
FIG. 52 is a perspective view showing a state that a transverse position adjuster of the fifth phone holder is set to a rotation prohibited position.
Figure 53:
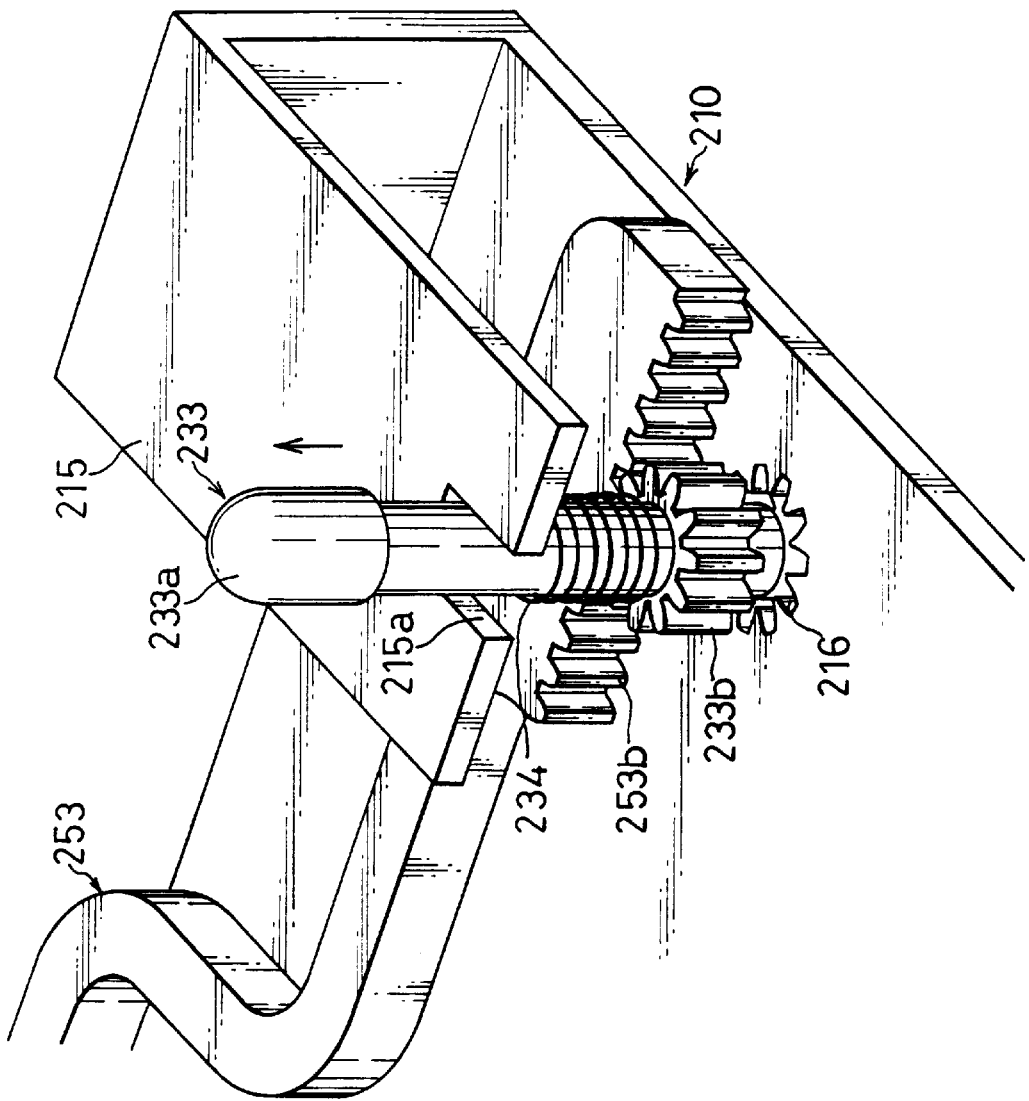
FIG. 53 is a perspective view showing a state that the transverse position adjuster is set to a rotation allowed position in the fifth embodiment.
Figure 54:
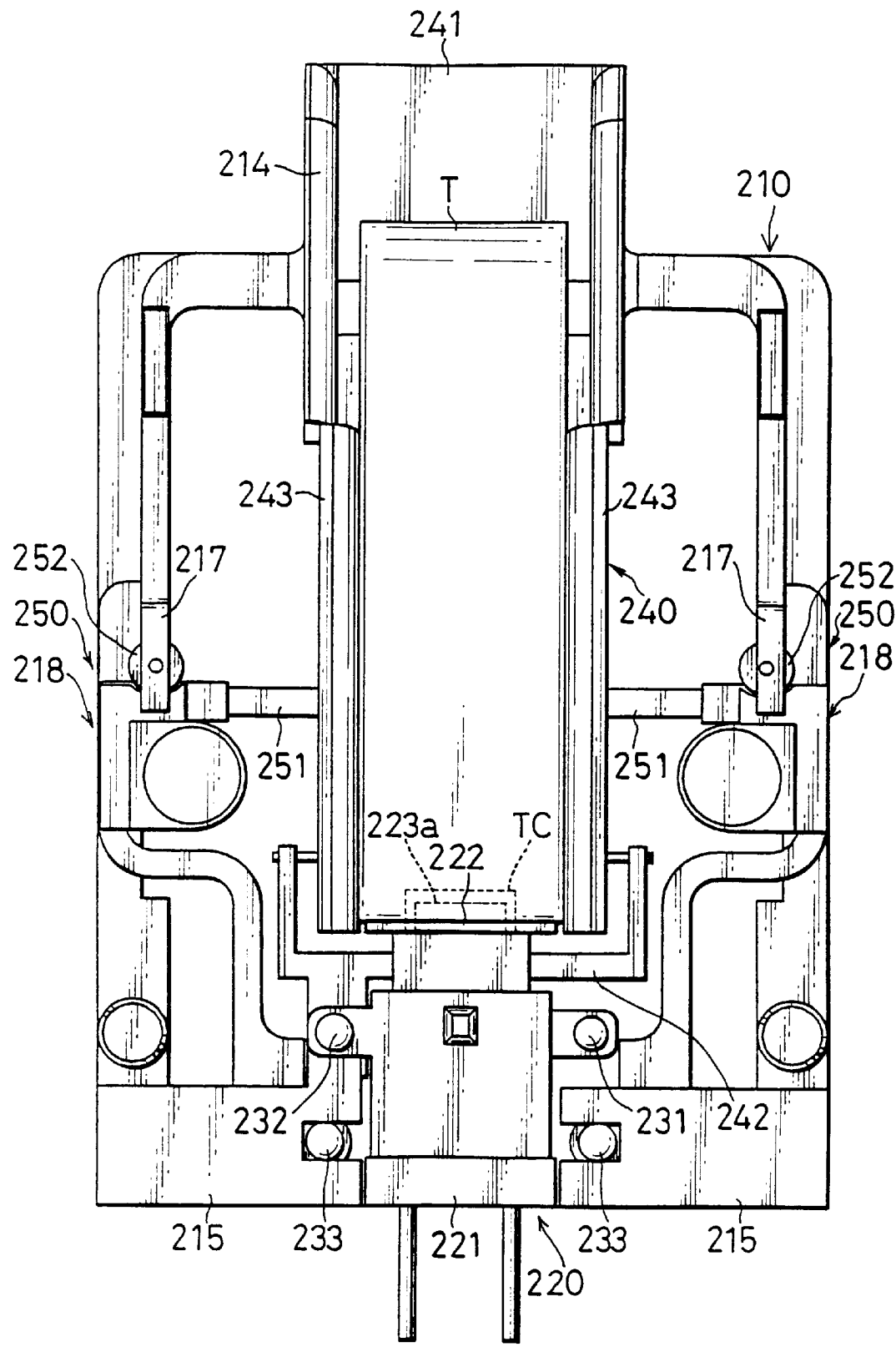
FIG. 54 is a plan view showing a state that a mobile phone with a phone connector at a center position thereof is held in the fifth phone holder.

As shown in FIGS. 52 and 53, the transverse position adjuster 233 includes a vertically extended main shaft, an operable head portion 233a formed at an upper end of the main shaft and a pinion gear 233b provided at a lower end thereof to be in mesh with the rear rack 253b. At the upper wall 215 of the casing 210 is formed a rectangular notch 215a opened toward the center. By inserting the main shaft of the transverse position adjuster 233 in the notch 215a from inward direction, the transverse adjuster 233 is supported on the upper wall 215 to be rotatable about an axis of the main shaft thereof and vertically movable in the notch 215a.

At the arrangement position of the transverse position adjuster 233, a hole 216 having such a shape as to fittingly accommodate the pinion gear 233b is formed in the bottom wall of the base 210. When the transverse position adjuster 233 is set to such a position that the pinion gear 233b is fitted in the hole 216 (state that the transverse position adjuster 233 is shifted to the lowermost position), a turning of the transverse position adjuster 233 is prohibited (rotation prohibited position) (see FIG. 52). Thereby, the transverse position adjuster 233 is set to a locked state. On the other hand, when the transverse position adjuster 233 is set to such a position that the pinion gear 233b is disengaged from the hole 216 and located above the hole 216, a turning of the transverse position adjuster 233 is allowed (rotation allowed position, a locked state is released) (see FIG. 53).

When the transverse position adjuster 233 is shifted upward to the rotation allowed position (lock released state), a rotational movement of the position adjuster 233 is converted into a forward or a backward movement of the second transmitter 253, a rotational movement of the pinion gear 252, and sideways movement of the first transmitter 251 to finally push the movable side wall 243 coupled to the first transmitter 251 along sideways (transverse) directions.

In other words, by turning the position adjuster 233 when it is set to the rotation allowed position, the corresponding movable side wall 243 is slid along sideways directions to adjust the position of the phone holder along transverse directions.

A compressed coil spring (bias member) 234 is wound around the main shaft of the transverse position adjuster 233 between the upper surface of the pinion gear 233b and the lower surface of the upper wall 215 to set the position adjuster 233 at the lowermost position (a locked state) by a bias force of the compressed coil spring 234 in a normal state of the phone holder.

Next, an operation of the adjustment in this embodiment and an action after the adjustment are described.

1) An operator determines whether the phone holder is used in a state that the connector module 220 faces upward or downward in accordance with the mounting position of the phone connector TC of a mobile phone T to be used with the phone holder. When the mounting direction is determined, the connector module 220 is secured on the base 210 in the determined direction.

For instance, in the case where the holder connector 223 and the phone connector TC of the mobile phone T are connectable in a state that the connector module 220 faces upward as shown in FIG. 44, the ear portion 221a is matched with the threaded hole 212a and is secured together with the threaded hole 212a on the base 210 by the connector fixing member 231.

Conversely, in the case where the holder connector 223 and the phone connector TC of the mobile phone T are connectable in a state that the connector module 220 faces downward as shown in FIG. 45, the ear portion 221b is matched with the threaded hole 212a and is secured together with the threaded hole 212a on the base 210 by the connector fixing member 231.

Figure 43:
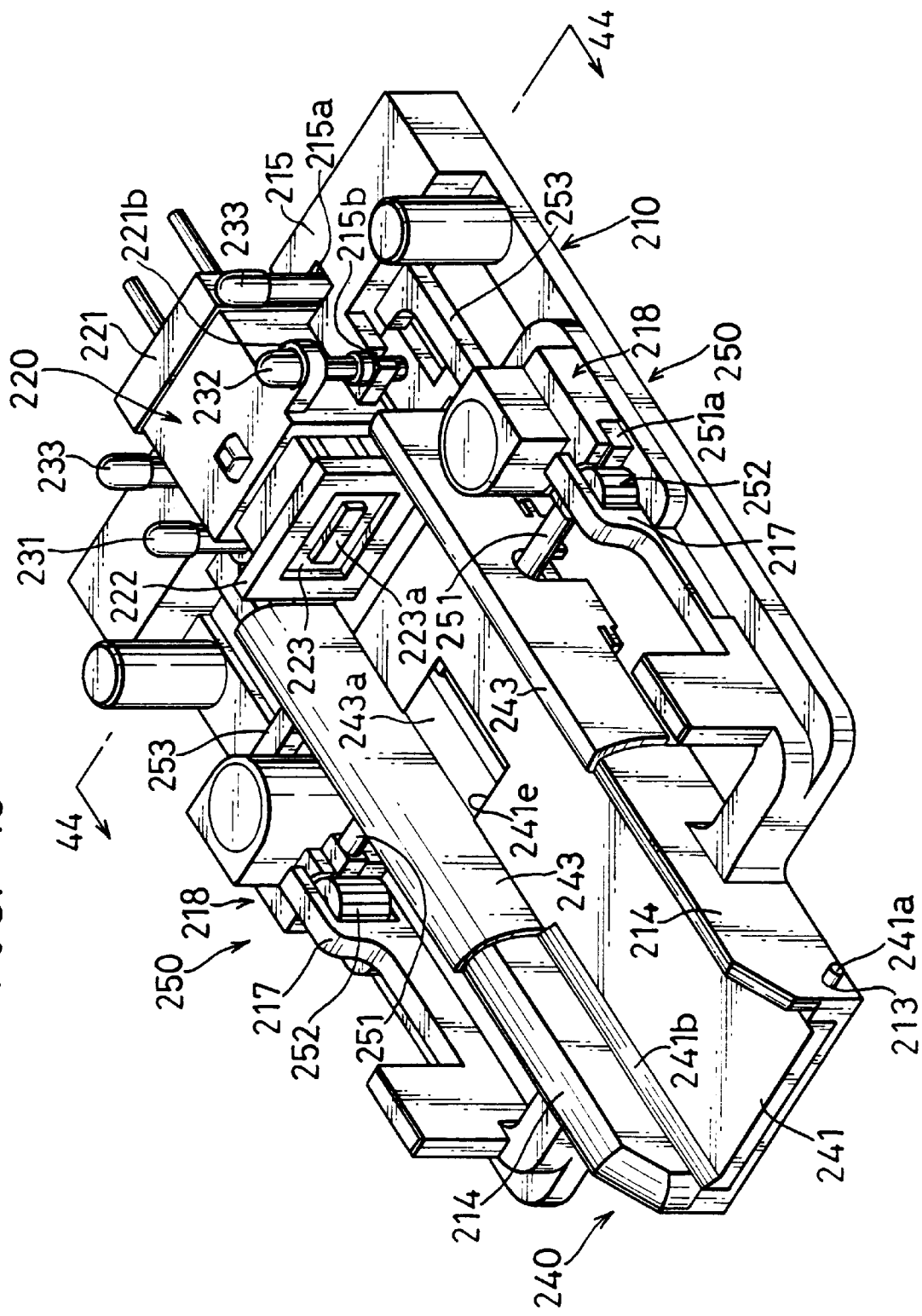
FIG. 43 is a perspective view showing an entirety of a phone holder as a fifth embodiment according to this invention.

2) Then, the elevating bottom wall or elevating member 242 is lowered to the lowermost position shown in FIG. 48, and the mobile phone T held substantially in a horizontal state is inserted in the hollow portion of the phone holder defined by the movable side walls 243 from above in a state that the movable side walls 243 are located farthest away from each other along transverse directions shown in FIG. 43, while connecting the phone connector TC with the holder connector 223. At this stage, the mobile phone T is set away above the elevating frame 242 and the pivotal bottom wall 241 with a clearance.

3) The vertical position adjuster 232 is manipulated to raise the elevating frame 242 upward, and the turning of the vertical position adjuster 232 is stopped when the upper surface of the elevating frame 242 is in fitting contact with the bottom surface of the mobile phone T. Thereby, the elevating frame 242 (and the pivotal bottom wall 241) is positioned in contact with the bottom surface of the mobile phone T in a state that the phone connector TC is connected with the holder connector 223.

4) While nipping the operable head portion 233a of one (left or right) of the transverse position adjusters 233, the operator raises the transverse position adjusters 233 upward overcoming the bias force of the compressed coil spring 234 to change the transverse position adjuster 233 from the rotation prohibited position (locked position) shown in FIG. 52 (position where the pinion gear 233b is fitted in the hole 216) to the rotation allowed position (lock released position) shown in FIG. 53 (position where the pinion gear 233b is away above the hole 216).

Then, at the rotation allowed position, the position adjuster 233 is manipulated to slide the corresponding movable side wall 243 along transverse direction toward the center, i.e., toward the mobile phone T which has been halfway set in the holder main body in 3). When the inner surface of the movable side wall 243 is in fitting contact with the side surface of the mobile phone T, the turning of the position adjuster 233 is stopped.

Similarly, the same operation is performed for the other one of the transverse position adjusters 233 to allow the inner surface of the opposite movable side wall 243 in fitting contact with the other side surface of the mobile phone T. Thereby, the movable side walls 243 are positioned in contact with the side surfaces of the mobile phone T in a state that the phone connector TC is connected with the holder connector 223.

5) After the position adjustment of 4), the operator stops turning of the operable head portion 233a, and pushes the operable head portion 233a downward to set the transverse position adjuster 233 to the rotation prohibited position (the position where the pinion gear 233b is engaged in the hole 216 by the bias force of the compressed coil spring 234). As a result, the transverse position adjuster 233 is kept at the rotation prohibited position in a state that the pinion gear 233b is in mesh with the rear rack 253b, while retaining the movable side wall 243 at the position adjusted in 4). In this way, the position adjustment of the phone holder is completed.

When the mobile phone T is to be inserted in the phone holder after the position adjustment, merely placing the mobile phone T on the bottom walls 241, 242 in a state that the side surfaces thereof are in fitting contact with the movable side walls 243 of the phone guiding unit 240, and sliding the mobile phone T rearward along the side walls 243 and the bottom walls 241, 242 enable the phone connector TC of the mobile phone T to be connected with the holder connector 223.

More specifically, in the phone holder of this embodiment, the bottom walls 241, 242 and the side walls 243 which define the hollow portion of the phone holder are movable to adjust the position of the respective walls in conformity with the shape of the mobile phone T. Accordingly, irrespective of the shape and the size of the mobile phone T, the phone connector TC of the mobile phone T can be reliably guided to the connecting position with the holder connector 223 to improve the operability of inserting and ejecting the mobile phone T. Further, since the outer surface of the mobile phone T is in substantially fitting contact with the elevating frame 242, the pivotal bottom frame 241 and the movable side walls 243, the mobile phone T can be held in the phone holder in a stable manner.

[Sixth Embodiment]

A sixth embodiment of this invention is described with reference to FIGS. 57 and 58.

In this embodiment, an operable head portion 233a is vertically movable relative to a main shaft 235 of a transverse position adjuster 233 to prevent an erroneous operation of the position adjuster 233. For this purpose, the operable head portion 233a is formed with a hollow portion comprising a spring housing chamber 236a and an outlet hole 236b formed below the spring housing chamber 236a.

The main shaft 235 is formed with a top disc member 235a, a column portion (rotation transmitting portion) 235b having a rectangular shape in cross section with an area smaller than the disc member 235a, and a round shaft 235c (rotation non-transmitting portion) having an area larger than the rectangular cross section of the column portion 235b and a diameter smaller than the disc member 235a.

The spring housing chamber 236a has such a size as to accommodate the disc member 235a, and the outlet hole 236b has such a shape as to fittingly match the rectangular column portion 235b. A compressed coil spring (bias member) 237 is wound around the main shaft 235 between a bottom wall of the spring housing chamber 236a and the disc member 235a to retain the operable head portion 233a of the position adjuster 233 at such a height as to set the outlet hole 236b staying around a top part of the round shaft 235c. In this state, a downward bias force is exerted to the operable head portion 233a by the compressed coil spring 237, and the position adjuster 233 is set to a non-operable state to be described below.

Figure 57A:
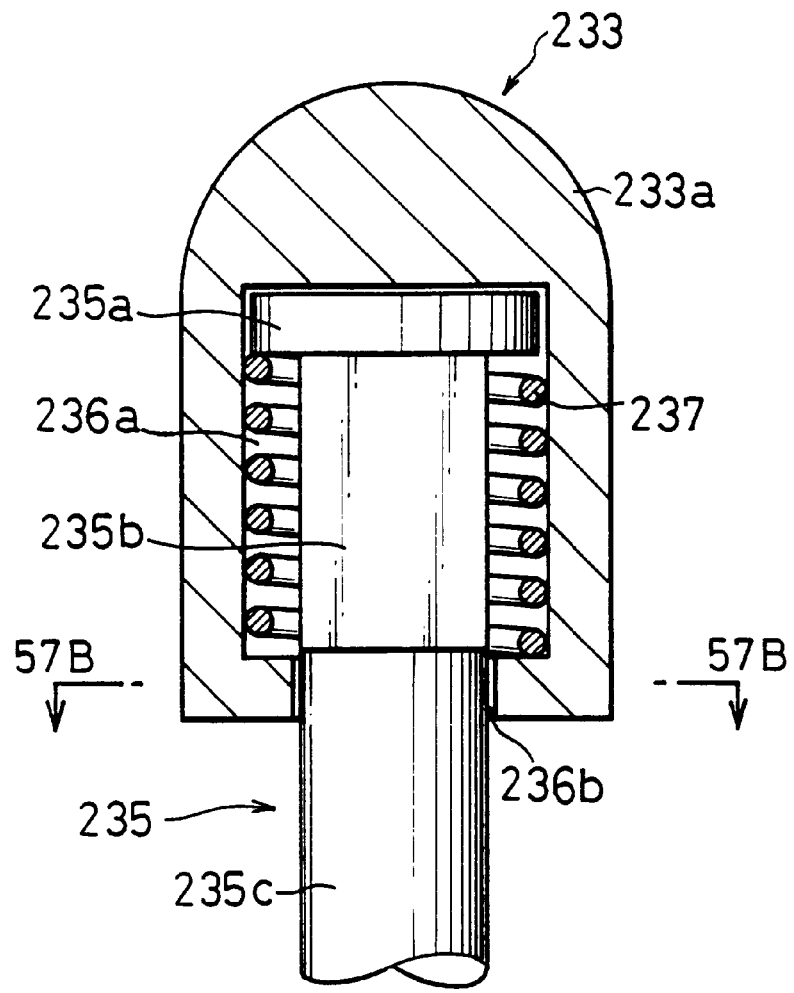
FIG. 57A is a cross sectional front view showing a state that a transverse position adjuster of a phone holder as a sixth embodiment is set in a normal state (locked state)
Figure 57B:
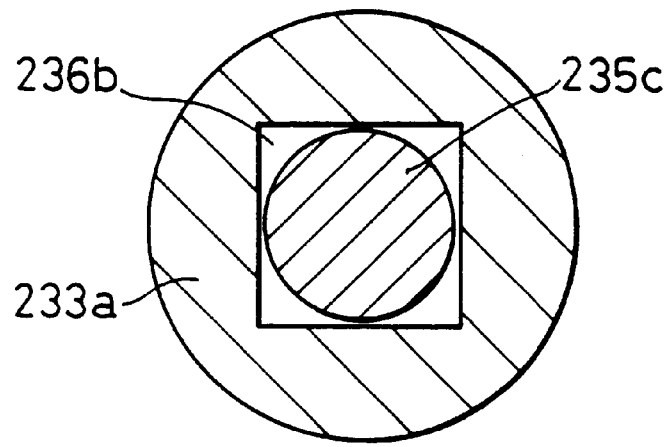
FIG. 57B is a cross sectional view taken along the line 57B—57B in FIG. 57B.

In the position adjuster 233 having the above arrangement, the operable head portion 233a idly rotates about the axis of the main shaft 235 (see the states shown in FIGS. 57A and 57B where the operable head portion 233a is biased downward). Accordingly, a rotational force of the operable head portion 233a is not transmitted to the movable side wall 243, thus preventing the side wall 243 from shifting from the adjusted position even if the operable head portion 233a is turned (non-operable state of the position adjuster 233). When in a used state of the phone holder, i.e., when a position adjustment is not required, the position adjuster 233 is set to this non-operable state (locked state).

Figure 58A:
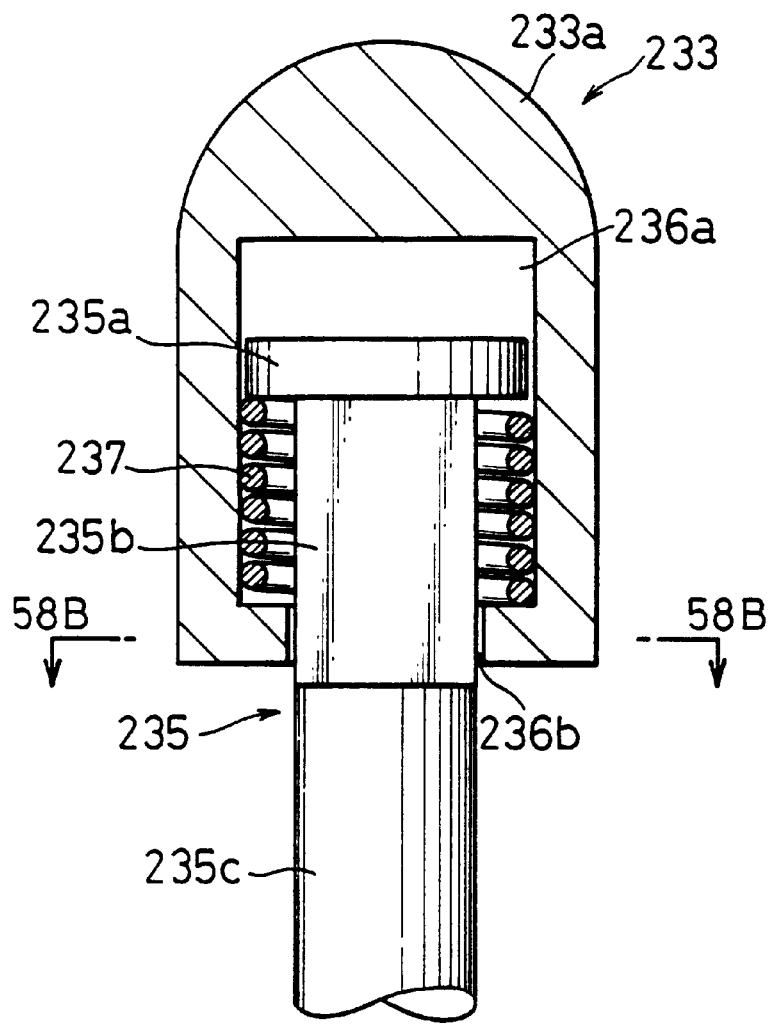
FIG. 58A is a cross sectional front view showing a state that a head portion of the transverse position adjuster in the sixth phone holder is lifted up to a lock released state.
Figure 58B:
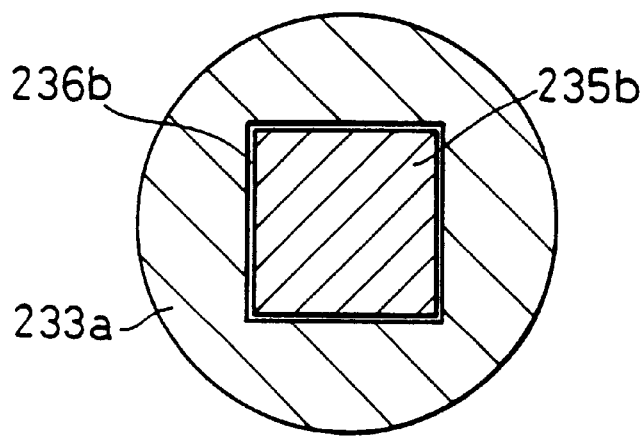
FIG. 58B is a cross sectional view taken along the line 58B—58B in FIG. 58A.
Figure 59:
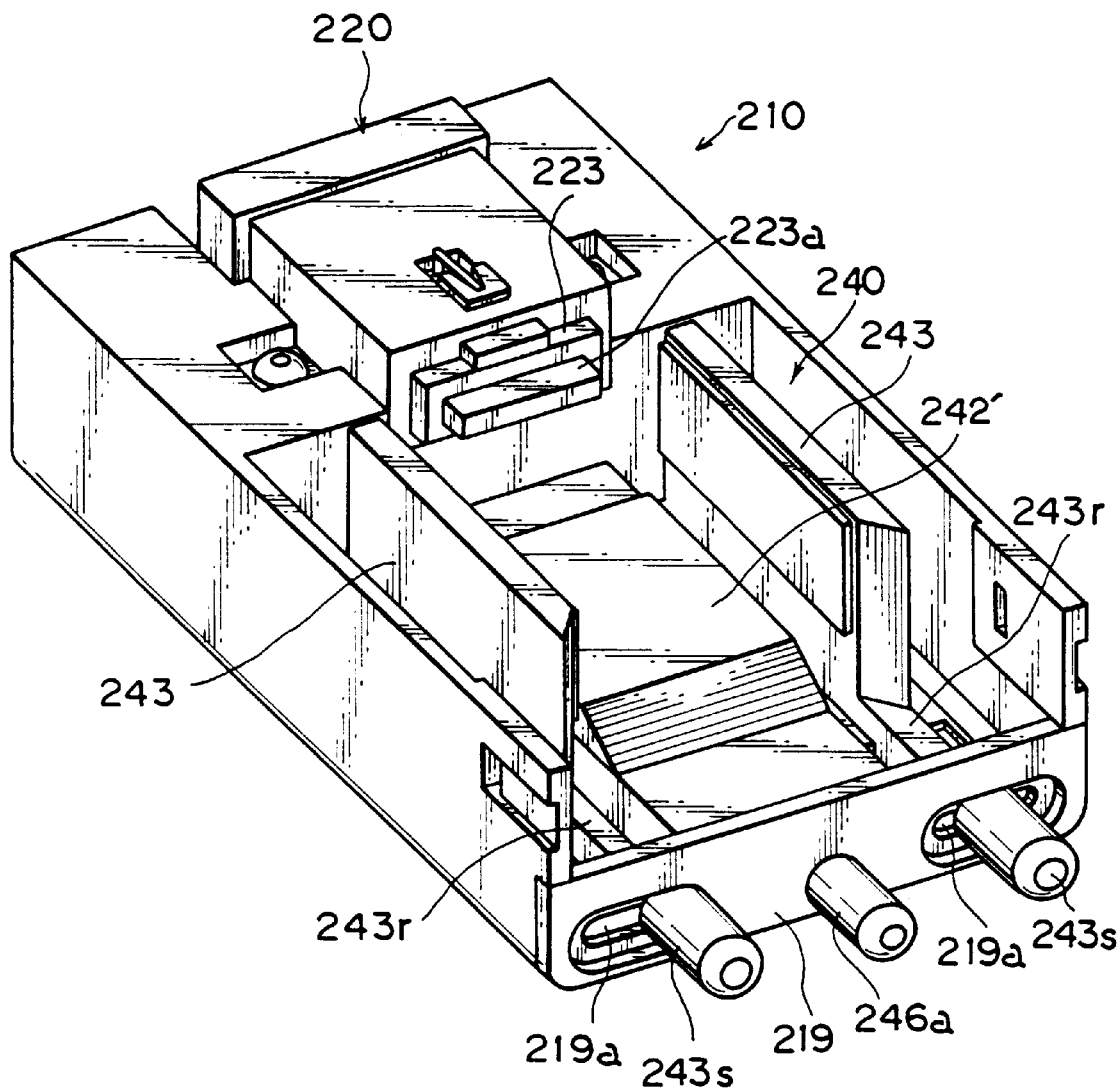
FIG. 59 is a perspective view of a phone holder as a seventh embodiment according to this invention when viewed obliquely from forward direction of the seventh phone holder.
Figure 60:
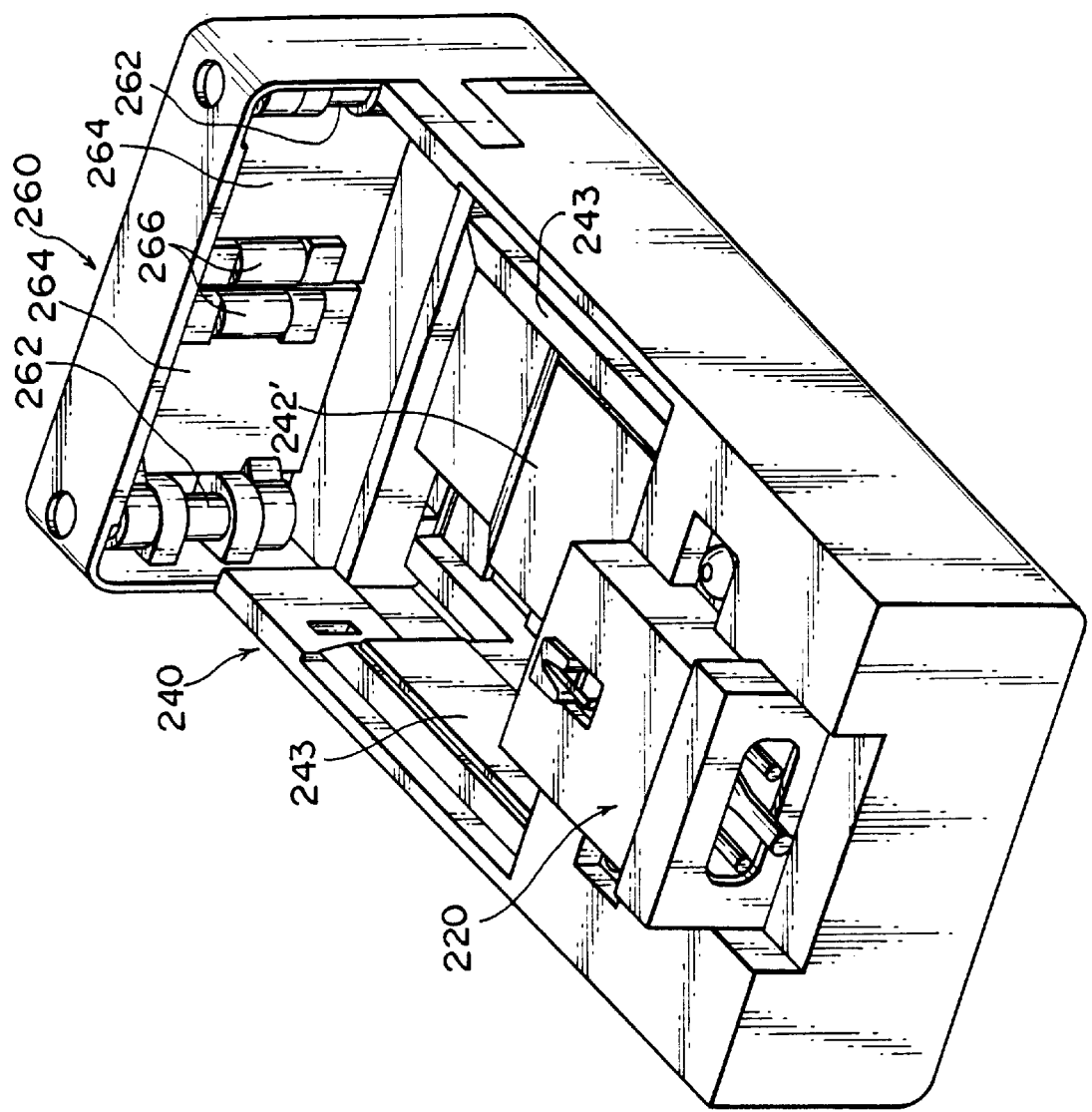
FIG. 60 is a perspective view of the seventh phone holder when viewed obliquely from rearward direction of the seventh phone holder.
Figure 61:
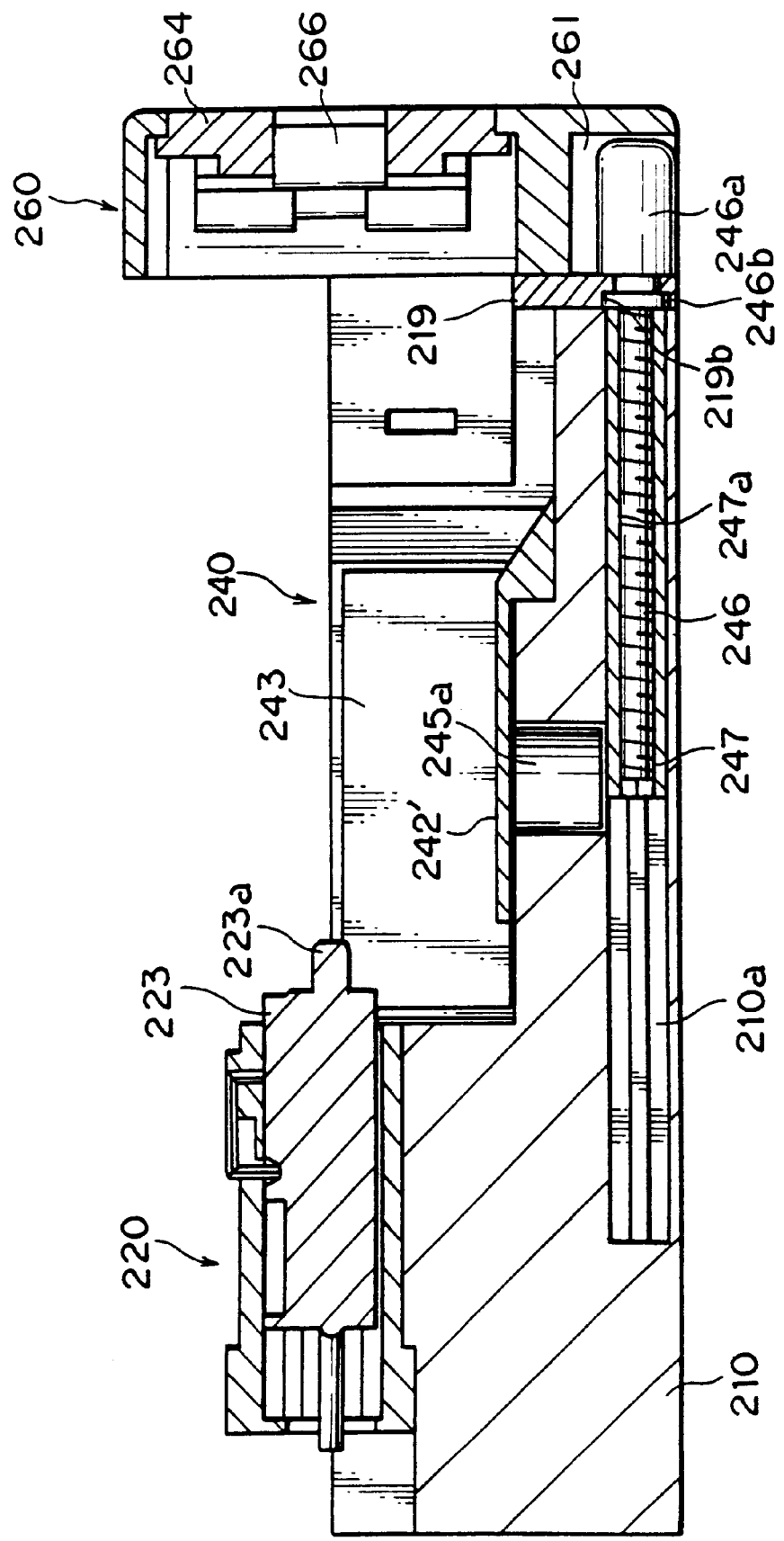
FIG. 61 is a cross sectional side view of the seventh phone holder.
Figure 62:
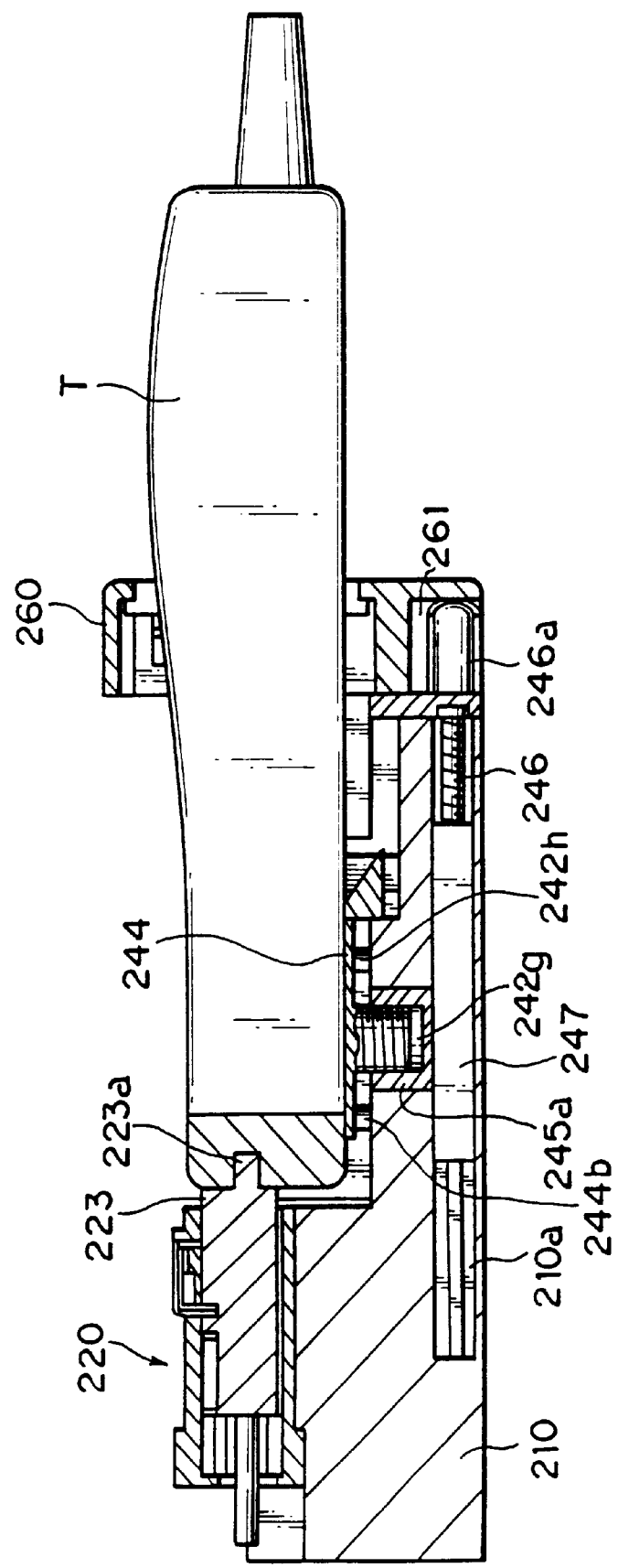
FIG. 62 is a cross sectional side view showing a state that a mobile phone is inserted in the seventh phone holder.
Figure 63:
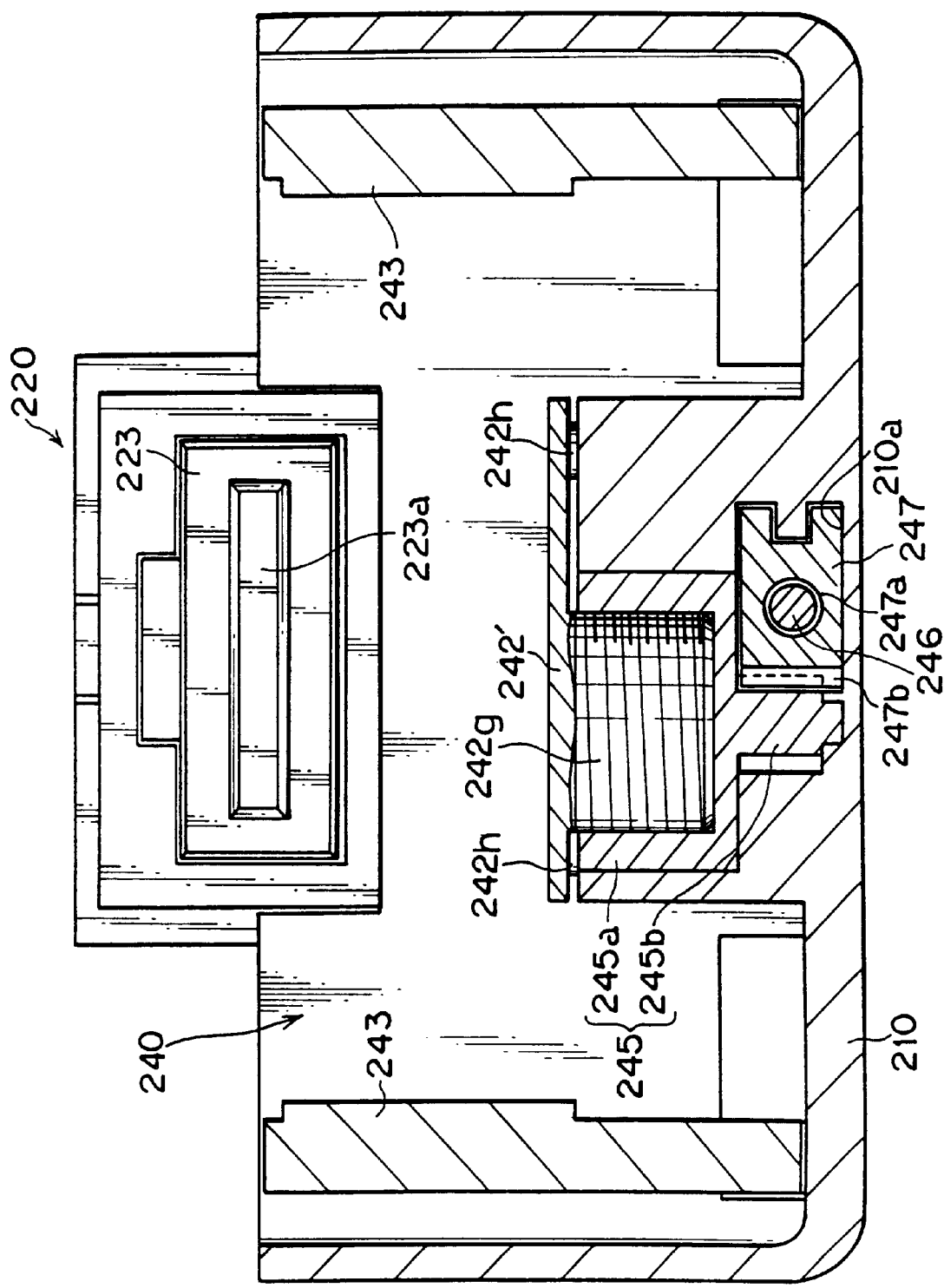
FIG. 63 is a cross sectional front view of the seventh phone holder.

On the contrary, when an operator pulls the operable head portion 233a upward to the position shown in FIGS. 58A and 58B overcoming the bias force of the compressed coil spring 237 to raise the rectangular outlet hole 236b to the same level as the rectangular column portion 235b, then, the locked state of the position adjuster 233 is released, and the rotational force of the operable head portion 233a is transmitted to the main shaft 235, i.e., the main shaft 235 is rotated together with the operable head portion 233a in a matched state of the rectangular column portion 235b in the rectangular outlet hole 236b to enable position adjustment of the movable side wall 243 (operable state of the position adjuster 233).

Accordingly, since the position adjuster 233 can be changeably set to an operable state and an non-operable state, there can be prevented a possibility that the movable side wall 243 is displaced from the adjusted position by an erroneous operation of the position adjuster 233.

In this embodiment, the rotation transmitting portion 235b may be formed into a shape other than the rectangular column shape (such as polygonal shape). Further, the round shaft 235c and the rectangular column portion 235b may be replaced one over the other, i.e., the rectangular column portion may be formed below the round shaft. In this case, the same effect as mentioned above can be obtained by allowing the operable head portion 233a to be urged upward in a state that the compressed coil spring 237 is wound around the main shaft 235 between the upper surface of the disc member 235a and the ceiling wall of the spring housing chamber 236a.

The arrangement in this embodiment may be also applicable to the vertical position adjuster 232. Specifically, in the vertical position adjuster 232, separately forming the operable head portion 232a and the main shaft of the vertical position adjuster 232 and making the construction of the operable head portion and the main shaft equivalent to those as shown in FIGS. 57A, 57B, 58A, and 58B can prevent a height displacement of the elevating frame 242 due to an erroneous operation of the vertical position adjuster. 232.

[Seventh Embodiment]

A seventh embodiment is described with reference to FIGS. 59 to 64.

In this embodiment, a transmission shaft 243r extends forward from each of a pair of left and right movable side walls 243 of a phone guiding unit 240 in such a manner that it protrudes forward while passing through a long hole 219a which is formed in a front wall 219 of a casing 210 and extends along transverse directions (left and right directions). An operable knob 243s is formed at the projected portion of the transmission shaft 243r to be operable from outside. Nipping the operable knob 243s and moving the same transversely along the extension of the through long hole 219a enable a direct adjustment of the position of the movable side wall 243 along transverse directions. The position of the movable side wall 243 can be optimally set by an unillustrated fixing means step-wise.

The phone guiding unit 240 has only an elevating bottom wall 242' as a bottom wall which is mounted on a base 210. On a lower surface of the elevating bottom wall 242' a large diametrical screw shaft 242g and a plurality of guiding shafts 242h protrude downward. Inserting each of the guiding shafts 242h into an upward opened guide hole (not shown) formed in the base 210 enables mounting of the elevating bottom wall 242' to be vertically movable on the base 210.

A first transmitter 245, a second transmitter 247, and a screw shaft 246 are mounted on the base 210.

Figure 64:
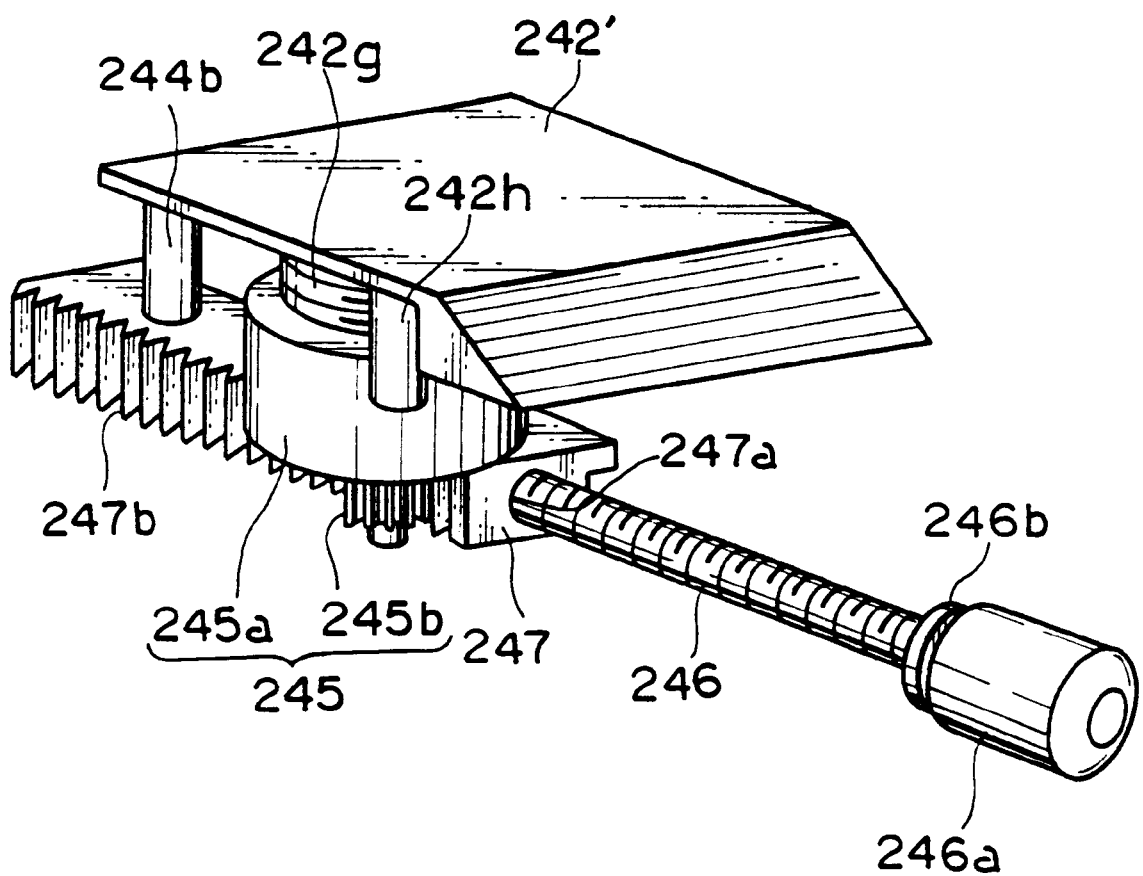
FIG. 64 is a perspective view of a movement conversion mechanism provided in the seventh phone holder.

Now referring to FIG. 64, the first transmitter 245 is integrally formed with a nut portion 245a formed with a threaded hole opened upward and a pinion gear 245b projecting downward from the nut portion 245a. The entirety of the first transmitter 245 is housed in the base 210 to be rotatable about a vertical axis of the screw shaft 242g in a state that the threaded hole of the nut portion 245a is in mesh with the screw shaft 242g of the elevating bottom wall 242'.

The second transmitter 247 extends along forward and backward directions of a holder main body, and is accommodated in the base 210 to be slidable along forward and backward directions. At a center axis of the second transmitter 247 is formed a threaded hole 247a opened forward, and at a side thereof is formed a rack 247b extending along the axial direction of the screw shaft 246. The rack 247b is in mesh with the pinion gear 245b of the first transmitter 245, and the screw shaft 246 is inserted in the threaded hole 247a.

The screw shaft 246 has a head portion 246a at a lead end thereof. A flange member 246b is formed between the head portion 246a and a main shaft of the screw shaft 246. In the front wall 219 of the casing 210 is formed a through hole to insert the screw shaft 246 along forward and backward directions. A large diametrical portion 219b is formed at a part of the through hole shown in FIG. 61. Fitting the flange portion 246b in the large diametrical portion 219b sets the screw shaft 246 to a non-movable position along forward and backward directions (axial direction of the screw shaft 246) in a state that the head portion 246a projects forward from the front wall 219.

In this state, nipping the head portion 246a and turning the screw shaft 246 about a horizontal axis thereof slide the second transmitter 247 in mesh with the screw shaft 246 along forward and backward directions, rotates the first transmitter 245 in a state that the pinion gear 245b is in mesh with the rack 247a of the second transmitter 247, and finally raises the elevating bottom wall 242' in a state that the screw shaft 242g is in mesh with the first transmitter 245 upward and downward.

Specifically, the first transmitter 245 and the second transmitter 247 constitute a movement conversion mechanism for converting a rotational movement of the screw shaft 246 into a vertical movement of the elevating bottom wall 242' to facilitate a vertical position adjustment of the elevating bottom wall 242' merely by manipulation of the screw shaft 246.

The phone holder in this embodiment further has a cover 260 which is mounted further forward of the front wall 219. At a lower end of the cover 260 is formed a recess 261 for accommodating the knobs 243s and the operable head portion 246a therein. When the cover 260 is mounted on the front wall 219, these knobs 243s and the operable head portion 246a are covered by the cover 260. An opening is formed at a center portion of the cover 260 to insert a mobile phone T from forward direction, and a pair of left and right lids 264 to openably close the opening are mounted on the cover 260 to be pivotally movable about vertical shafts 262 disposed at left and right ends thereof. A roller 266 is mounted at a free end of each of the lids 264 to be rotatable about an axis thereof.

With this arrangement, after transversely adjusting the position of the movable side walls 243 and vertically adjusting the position of the elevating bottom wall 242' by sliding the knobs 243s and turning the head portion 246a and then merely mounting the cover 260 enable covering of these projections (knobs 243s and head portion 246a) to protect these operable projections, prevent an erroneous operation of these projections and make the external appearance of the phone holder better.

In this seventh embodiment, the movable side wall 243 is moved in the same direction as the moving direction of the position adjuster 243s. However, as an altered form, making the arrangement of the transverse position adjuster 243s to transversely move the side wall 243 similar to the arrangement of the vertical position adjuster 246 in which a rotational movement is converted into a vertical movement by the movement conversion mechanism enables downsizing of the phone holder because an operation stroke of sliding the transverse position adjuster 243s is not required, while realizing a minute adjustment of the transverse position of the movable side wall 243.

The following is some of the modifications of this embodiment.

(1) The holder connector 223 may be constructed in such a manner that it is directly secured on the holder main body without the casing 221.

(2) In this embodiment, the left and right movable side walls 243 are individually moved. Alternatively, a single manipulation of a screw shaft may simultaneously move the side walls 243 toward and away from each other. This arrangement can be attained by arranging the screw shaft formed with an externally threaded portion oriented in the opposite directions at the opposite ends thereof to be rotatable in the base 210 and providing a nut potion at a lower portion of each of the movable side walls 243 to be in mesh with each of the externally threaded portions of the screw shaft.

Alternatively, only one of the movable side walls 243 may be movable, and the position of the side walls 243 is adjusted while pushing the mobile phone T toward the other fixed side wall 243 along with the movable one side wall 243. However, both of these altered modifications (simultaneous position adjustment and one side moving/the other side fixing adjustment) can cope merely with the variation of the width of the mobile phone T to be inserted.

Figure 55:
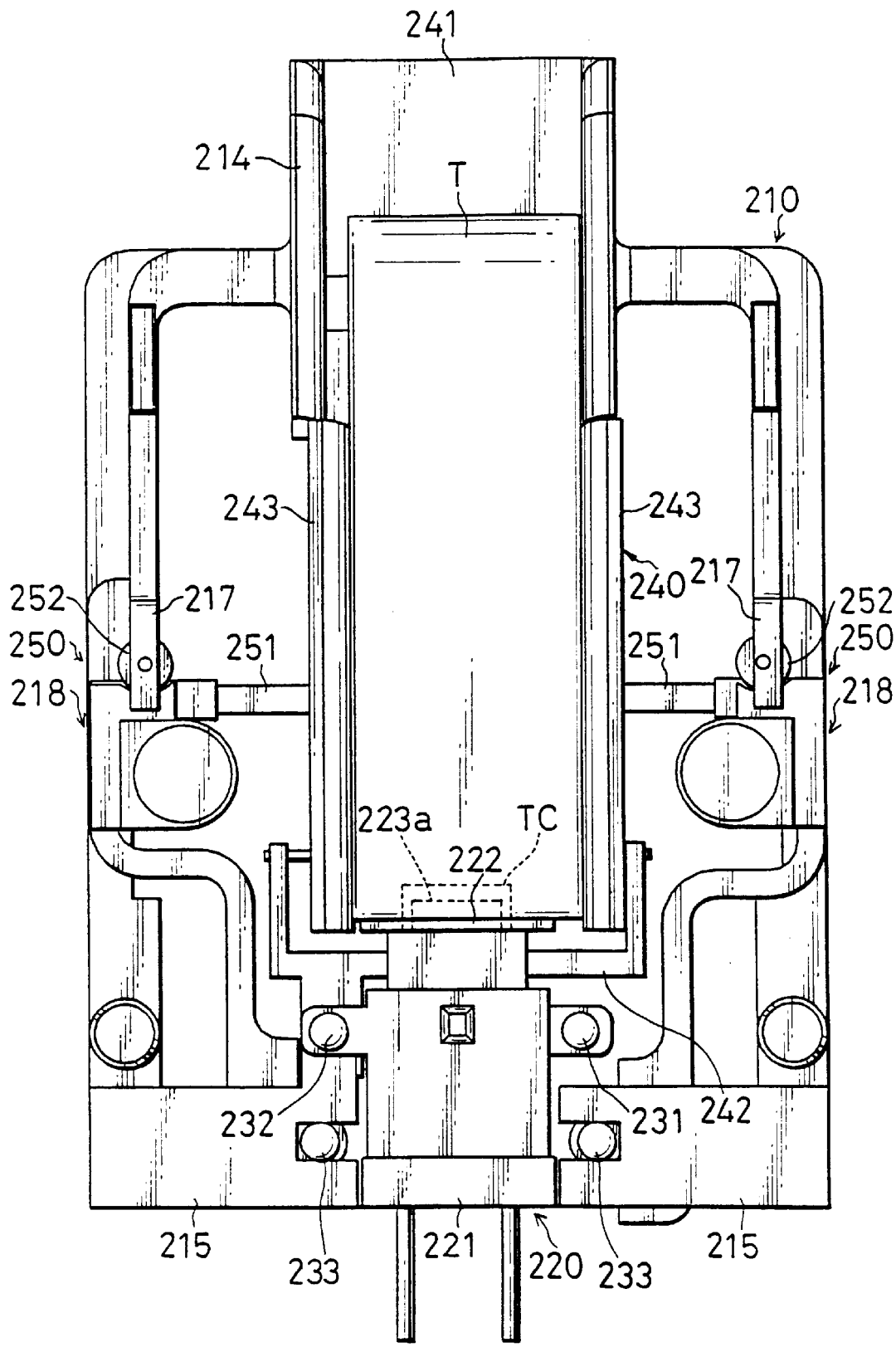
FIG. 55 is a plan view showing a state that a mobile phone with a phone connector at a position rightward in FIG. 55 is held in the fifth phone holder.
Figure 56:
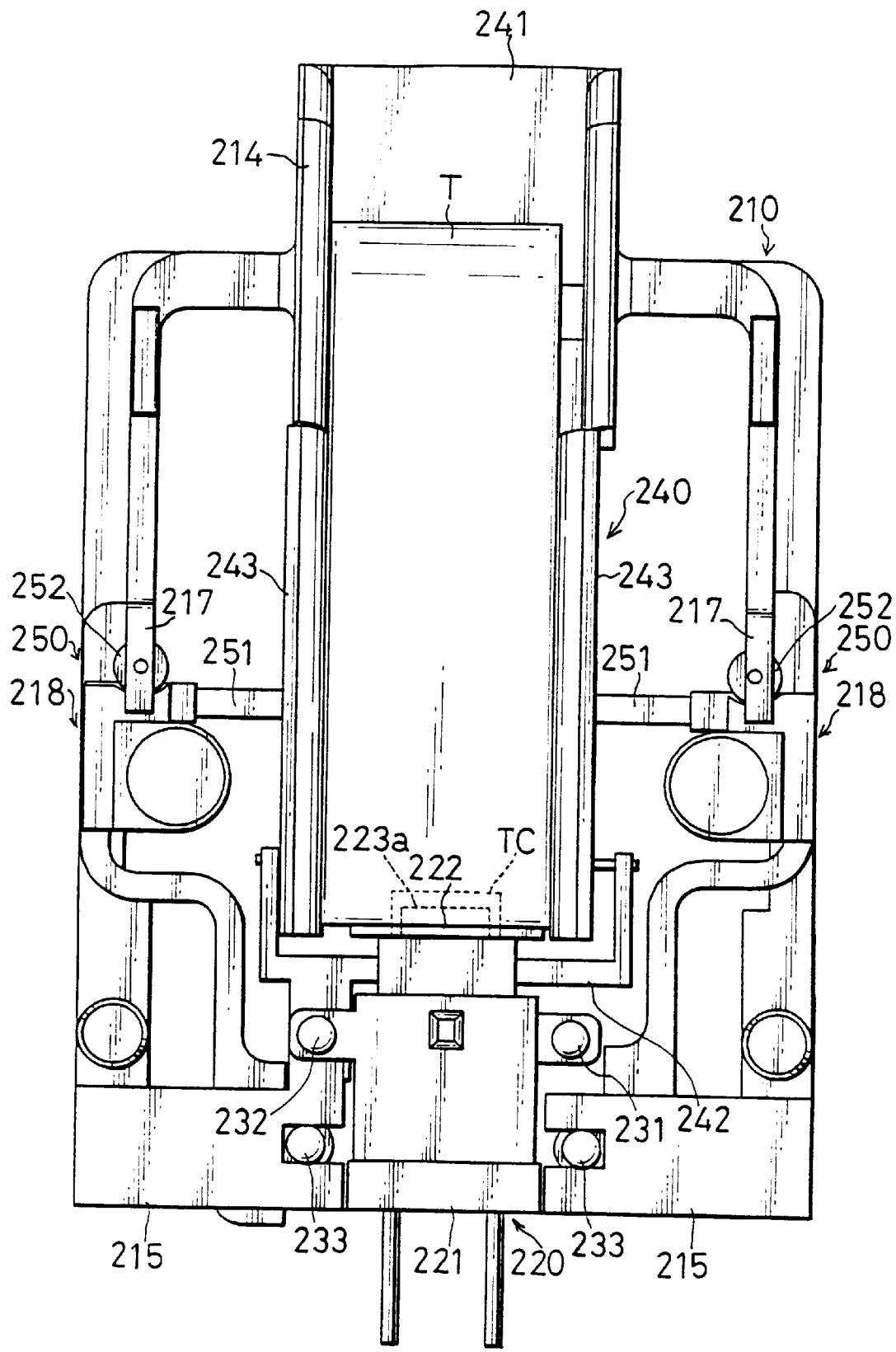
FIG. 56 is a plan view showing a state that a mobile phone with a phone connector at a position leftward in FIG. 56 is held in the fifth phone holder.

On the other hand, the individual position adjustment of the side walls 243 as shown in this embodiment enables not only insertion of the mobile phone T in which the phone connector TC is located in a center along transverse directions of the phone main body but also insertion of a mobile phone T in which a phone connector TC is shifted leftward or rightward from the center as shown in FIGS. 55 and 56. Accordingly, the phone holder of the arrangement in this embodiment can hold various types of mobile phone T.

(3) In this embodiment, the side walls and the bottom wall are movable. Alternatively, in the case where the height position of the phone connector TC of the mobile phone T is not so greatly different from the height position of the holder main body, only the side wall(s) may be movable. Conversely, if the width dimension of the mobile phone T is not so greatly different from the width of the holder main body, or the transverse position of the phone connector TC is not so greatly varied from the position of the holder connector, merely the bottom wall may be movable.

(4) The movable side walls 243 may be mounted on the pivotal bottom wall 241 to be transversely movable as shown in the fifth embodiment, or alternatively, they may be directly mounted on the base 210 to be transversely movable.

The former arrangement where the movable side walls 243 are mounted on the pivotal bottom wall 241 (and the elevating bottom wall 242) makes the height adjustment of the side walls 243 possible in accordance with the vertical movement of the bottom wall 241, 242. Accordingly, it is advantageous in rendering the side walls 243 in fitting contact with the side surfaces of the mobile phone T which is raised together with the bottom walls 241, 242, thereby holding the mobile phone T in a stable manner.

(5) In the case where the transverse position adjuster 233 is constructed in such a manner that turning of the operable head portion thereof adjusts transverse position of the side wall 243 as shown in the fifth embodiment, the movement conversion mechanism 250 may, for example, have a gear train arrangement instead of the rack-pinion mechanism.

(6) In this seventh embodiment, the entirety of the bottom wall (i.e., the entirety of the elevating bottom wall 242') is moved up and down. Alternatively, as shown in the fifth embodiment, merely the elevating bottom wall 242 provided at the rear portion of the holder main body may be moved up and down. In the latter case where the elevating bottom wall or elevating frame 242 which is vertically movable is formed at the rear portion, i.e., near the holder connector 223, the vertically moved portion can be made lightweighted to facilitate raising operation of the bottom frame. In addition, this arrangement is advantageous in smoothly guiding the mobile phone T along the continued relatively large plane of the bottom walls 241, 242 by connecting the elevating bottom wall 241 with the pivotal bottom wall 242 in such a way as to pivotally move (raise) the pivotal bottom wall 241 along with the elevating frame 242. Thereby, the mobile phone T can be guided smoothly no matter how high the elevating bottom wall 242 may be raised.

(7) In the fifth and sixth embodiments, the rotation prohibited position (locked position) and the rotation allowed position (lock released position) are set such that the lower position of the transverse position adjuster 233 is the rotation prohibited position, and the upper position is the rotation allowed position. Conversely, the rotation prohibited position may be set at the upper side, and the rotation allowed position may be set at the lower side. For instance, the ceiling wall 215 may be formed with a hole to fit the pinion gear 233b to set the fitting state of the pinion gear 233b in the hole as the rotation prohibited position, and the transverse position adjuster 233 may be urged upward to retain the position adjuster 233 at the upper side rotation prohibited position. In this case, when a user pulls the position adjuster 233 downward against the upward bias force of the position adjuster 233, the position adjuster 233 is set at the rotation allowed position, thereby enabling position adjustment of the movable side wall 243 along transverse directions.

(8) In this embodiment, the entire area of the hollow portion of the phone holder is opened upward. Alternatively, part of the hollow portion may be opened upward to such an extent as to enable insertion of the mobile phone T, while closing the remaining part of the hollow portion with a ceiling wall of the phone holder or its equivalent.

Further, this invention is applicable to any arrangement where a mobile phone T is held in the phone holder in a state that a phone connector is connected with a holder connector regardless of any specific use or purpose. For instance, this invention is applicable to a case where a mobile phone T is connected with an electronic device such as a personal computer for radio communication, as well as a case where a mobile phone T is connected with a speaker in a passenger compartment of a vehicle.

Although the present invention has been fully described by way of example with reference to the accompanying drawings, it is to be understood that various changes and modifications will be apparent to those skilled in the art. Therefore, unless otherwise such change and modifications depart from the scope of the invention, they should be construed as being included therein.

What is claimed is:

1. A phone holder adapted for detachably holding a mobile phone, comprising:

a holder main body formed with a hollow portion inside thereof with a phone insertion opening and setting the mobile phone therein;

at least one pair of adjustable side walls movable toward and away from a plane parallel to a direction of inserting the mobile phone set in the holder main body in a direction orthogonal to the phone inserting direction;

a position adjuster for adjusting a position of the at least one movable member;

an adjustable connector for powering the phone;

and means for adjust the adjustable connector.

2. The phone holder according to claim 1, wherein the at least one pair of adjustable side walls is formed into a tapered portion inclined in such a direction as to be tapered away from a plane parallel to the inserting direction of the mobile phone.

3. The phone holder according to claim 1, wherein the inner side surface of the at least one pair of adjustable side walls is made of an elastic material.

4. The phone holder according to claim 1, wherein the at least one pair of adjustable side walls includes a plurality of movable members which are provided on outer lateral sides of the mobile phone set in the holder main body.

5. The phone holder according to claim 4, wherein the position adjuster is constructed in such a manner as to move the plurality of movable members simultaneously toward and away from each other.

6. The phone holder according to claim 5, wherein each of the plurality of movable members is formed with a threaded hole extending in a widthwise direction of the mobile phone in such a manner as to be directed in such a manner as to be directed in the opposite direction, and a screw shaft is formed with an externally threaded portion at opposite ends of thereof to respectively engage with the threaded holes of the plurality of movable members, having a manually operable portion extending out of the holder main body.

7. The phone holder according to claim 1, wherein the opening is formed at one end of the holder main body in a lengthwise direction of the mobile phone.

8. The phone holder according to claim 7, wherein the holder main body has a holder connector at a bottom end of the holder main body relative to the phone inserting direction in such a manner that the mobile phone is connectable with the holder connector when the mobile phone is inserted in the hollow portion of the holder main body along the phone inserting direction.

9. The phone holder according to claim 8, wherein the at least one pair of adjustable side walls is provided at a position next to the holder connector in the phone ejecting direction.

10. The phone holder according to claim 1, wherein the at least one pair of adjustable side walls is provided at two different positions, a first position being next to the holder connector in the phone ejecting direction and a second position being further away from the first position in the phone ejecting direction.

11. The phone holder according to claim 7, wherein the at least one pair of adjustable side walls includes a sub movable member movable in a direction orthogonal to the moving direction of the movable member and orthogonal to the phone inserting direction, and the position adjuster includes a sub position adjuster for adjusting a position of the sub movable member.

12. The phone holder according to claim 9, wherein the at least one pair of adjustable side walls includes a sub movable member which is movable toward and away from a plane parallel to the phone inserting direction in a direction orthogonal to the moving direction of the movable member, the sub movable member having an inner shape continued from an inner side surface of the movable member along with an outer contour of the mobile phone, and the position adjuster includes a sub position adjuster for adjusting a position of the sub movable member.

13. The phone holder according to claim 7, wherein the at least one pair of adjustable side walls is provided on outer lateral sides of the mobile phone set in the holder main body, a leading end of the at least one pair of adjustable side walls on the phone insertion opening side is pivotally connected to the holder main body, an inner side of the at least one pair of adjustable side walls is formed into a tapered portion inclined in such a direction as to be tapered away from a plane parallel to the phone inserting direction of the mobile phone to pivotally move the at least one pair of adjustable side walls toward and away from the mobile phone about the leading end of the at least one pair of adjustable side walls, and a pair of V-shaped link members having respective one ends thereof fastened or loosed by a fastening member and the respective other ends thereof are pivotally connected to a rear end of the at least one pair of adjustable side walls are provided in such a way that an angle defined by the link members and an angle defined by the tapered portion of the at least one pair of adjustable side walls and the holder main body are simultaneously adjusted by operating the fastening member.

14. The phone holder according to claim 8, wherein the at least one pair of adjustable side walls includes a plurality of phone guide members provided in the holder main body for guiding the mobile phone to a connectable position with the adjustable connector, the phone guide member is movable in a direction orthogonal to the phone inserting direction, and an operable member is provided at least one end wall of the opposite ends in the lengthwise direction of the holder main body to adjust a position of the phone guide member.

15. The phone holder according to claim 14, wherein all of the operable members are provided at the one end wall of the holder main body.

16. The phone holder according to claim 15, wherein all of the operable members are arranged in a periphery of the phone insertion opening of the holder main body.

17. The phone holder according to claim 16, further comprising a cover formed with an opening having a substantially same size as the phone insertion opening, the cover is detachably mounted on the holder main body in such a manner as to cover all the operable members from above.

18. The phone holder according to claim 16, wherein the one end wall of the holder main body is formed with a slit extending in the same direction as the moving direction of the phone guide member, the phone guide member passes through the slit in such a manner that one end of the phone guide member protrudes out of the holder main body, and the operable member is mounted on the protruding end of the phone guide member to integrally move a main body of the phone guide member and the operable member together in the same direction.

19. The phone holder according to claim 18, wherein the phone guide member is provided at four sides of the holder main body in such a way as to encase the mobile phone, and the slits corresponding to the respective phone guide members are formed along the periphery of the phone insertion opening.

20. The phone holder according to claim 18, wherein the projected end of the phone guide member is formed with an externally threaded portion, the operable member is formed with an internally threaded hole engageable with the externally threaded portion, and the phone guide member is positioned in the holder main body in a state that the operable member and the main body of the phone guide member sandwich the one end wall of the holder main body formed with the slits from the opposite directions by fastening the operable member on the projected end of the phone guide member.

21. The phone holder according to claim 14, wherein the phone guide member includes a guide moving element, an operation moving element, and a threaded shaft, the guide moving element is provided inside the holder main body having a tapered portion formed in at least one side surface thereof in the lengthwise direction of the mobile phone inclined in such a direction as to be away from a plane parallel to the phone inserting direction of the mobile phone as approaching toward the phone insertion opening to be movable in a direction orthogonal to the phone inserting direction, the operation moving element is provided inside the holder main body, including a tapered portion in contact with the tapered portion of the guide moving element to be movable in a direction parallel to the phone inserting direction, formed with a threaded hole therein at a side opposite to the tapered portion thereof, the threaded shaft including an externally threaded portion engageable in the threaded hole and extending in a direction parallel to the lengthwise direction of the mobile phone to be rotatably supported on the holder main body, an end of the threaded shaft is projected out of the holder main body to form an operable member, the tapered portion of the guide moving element and the tapered portion of the operation moving element are formed in such a shape as to move the guide moving element in the direction orthogonal to the phone inserting direction by operating the operable member.

22. The phone holder according to claim 1, wherein the holder main body if formed with a hollow portion therein with at least one part thereof opened upward having such a shape as to hold a mobile phone in a substantially horizontal state, the at least one pair of adjustable side walls includes a portion of opposite lateral side walls of the holder main body which is movable in a widthwise direction of the mobile phone, and the position adjuster includes a transverse position adjuster for adjusting a position of the at least one pair of adjustable side walls in the widthwise direction of the mobile phone.

23. The phone holder according to claim 22, wherein the at least one pair of adjustable side walls includes an adjustable member which is provided at lateral sides of the mobile phone, and the transverse position adjuster individually adjusts the position of the movable members.

24. The phone holder according to claim 22, further comprising a rotational operable member provided upright on the holder main body to rotate about an axis substantially parallel to the phone inserting direction thereof, and a movement conversion mechanism for converting a rotational movement of the rotational operable member into a transverse movement of the movable means.

25. The phone holder according to claim 24, wherein the rotational operable member is movable in the lengthwise direction of the holder main body between a rotation prohibited position and a rotation allowed position, the rotation prohibited position being a position to prohibit a rotation of the rotational operable member where the rotational operable member is engaged with the holder main body, the rotation allowed position being a position vertically away from the rotation prohibited position to release the engagement of the rotational operable member with the holder main body, and a bias member is provided for biasing the rotational operable member toward the rotation prohibited position.

26. The phone holder according to claim 24, wherein the rotational operable member includes a head portion and a main body in the form of a shaft, the shaft main body is formed with a rotation transmitting portion and a rotation non-transmitting portion lengthwisely disposed one over the other, the rotation transmitter having a cross section to transmit a rotational force of the head portion to the shaft main body by engagement with the head portion, the rotation non-transmitting portion having a cross section to be rotatable relative to the head portion, and a bias member is provided for biasing the head portion toward the side of the rotation non-transmitting portion.

27. The phone holder according to claim 1, wherein the holder main body is formed with a hollow portion therein with at least one part thereof opened upward having such a shape as to hold a mobile phone in a substantially horizontal state, a portion of a bottom wall of the holder main body at a lower portion of the hollow portion located at least near the adjustable connector is formed into an elevating member to be movable up and down, and a vertical position adjuster is provided for adjusting a position of the elevating member in a vertical direction.

28. The phone holder according to claim 27, wherein the bottom wall includes the elevating member and a pivotal member provided in the holder main body located forward away of the elevating member with respect to the holder connector to be pivotable about a horizontal axis extending in a direction substantially orthogonal to the lengthwise direction of the mobile phone, the pivotal member and the elevating member are connected to be pivotable about the horizontal axis relative to each other.

29. The phone holder according to claim 27, wherein an operable member is provided in the holder main body to be rotatable about a horizontal axis, and a movement conversion mechanism is provided for converting a rotational movement of the operable member into a vertical movement of the elevating member.

30. The phone holder according to claim 27, wherein the elevating member is formed with a threaded hole in a substantially vertical direction, and an operable screw member formed with an externally threaded portion engageable with the threaded hole is provided on the holder main body to be rotatable about a substantially vertical axis thereof.

31. The phone holder according to claim 27, wherein the at least one pair of adjustable side walls includes at least a portion of each of the opposite lateral side walls of the holder main body which is movable toward and away from a plane parallel to the phone inserting direction, and the position adjuster includes a transverse position adjuster for adjusting a position of the at least one pair of adjustable side walls in the widthwise direction of the mobile phone.

32. The phone holder according to claim 30, wherein the at least one pair of adjustable side walls includes at least a portion of each of the opposite lateral side walls of the holder main body which is movable toward and away from a plane parallel to the phone inserting direction, a rotational operable member is provided upright on the holder main body to be rotatable about the substantially vertical axis, and a movement conversion mechanism is provided for converting a rotational movement of the rotational operable member into the vertical movement of the at least one pair of adjustable side walls, the rotational operable member and the operable screw member are arranged in a mutually close position.

33. The phone holder according to claim 30, wherein the operable screw member includes a head portion and a main body in the form of a shaft, the shaft main body is formed with a rotation transmitting portion and a rotation non-transmitting portion lengthwisely disposed one over the other, the rotation transmitting portion having a cross section to transmit a rotational force of the head portion to the shaft main body by engagement with the head portion, the rotation non-transmitting portion having a cross section to be rotatable relative to the head portion, and a bias member is provided for biasing the head portion toward the side of the rotation non-transmitting portion.

* * * * *